United States Patent
Chamieh et al.

(10) Patent No.: US 7,865,872 B2
(45) Date of Patent: Jan. 4, 2011

(54) PRODUCER GRAPH ORIENTED PROGRAMMING FRAMEWORK WITH UNDO, REDO, AND ABORT EXECUTION SUPPORT

(75) Inventors: Fady Chamieh, Paris (FR); Elias Eddé, Paris (FR)

(73) Assignee: Murex S.A.S., Paris (FR)

( * ) Notice: Subject to any disclaimer, the term of this patent is extended or adjusted under 35 U.S.C. 154(b) by 944 days.

(21) Appl. No.: 11/607,216

(22) Filed: Dec. 1, 2006

(65) Prior Publication Data

US 2008/0134161 A1 Jun. 5, 2008

(51) Int. Cl.
G06F 9/44 (2006.01)
(52) U.S. Cl. .................. 717/108; 717/155; 717/156; 717/157; 719/331; 719/332
(58) Field of Classification Search ......... 717/100–116, 717/124–158; 719/315–318, 328–332
See application file for complete search history.

(56) References Cited

U.S. PATENT DOCUMENTS

| | | |
|---|---|---|
| 4,558,413 A | 12/1985 | Schmidt et al. |
| 5,133,063 A | 7/1992 | Naito et al. |
| 5,313,387 A | 5/1994 | McKeeman et al. |
| 5,410,696 A | 4/1995 | Seki et al. |
| 5,524,205 A | 6/1996 | Lomet et al. |
| 5,659,747 A | 8/1997 | Nakajima |
| 5,819,293 A | 10/1998 | Comer et al. |
| 5,883,623 A | 3/1999 | Cseri et al. |
| 5,893,123 A | 4/1999 | Tuinenga et al. |
| 5,966,072 A * | 10/1999 | Stanfill et al. ............... 340/440 |
| 5,990,906 A | 11/1999 | Hudson et al. |
| 6,003,037 A | 12/1999 | Kassabgi et al. |

(Continued)

FOREIGN PATENT DOCUMENTS

EP 0777181 A1 6/1997

(Continued)

OTHER PUBLICATIONS

Mohan et al., Efficient commit protocols for the tree of processes model of distributed transactions, ACM New York, NY, USA, vol. 19, Issue 2, Apr. 1985, pp. 40-52.*

(Continued)

*Primary Examiner*—Wei Y Zhen
*Assistant Examiner*—Satish Rampuria
(74) *Attorney, Agent, or Firm*—Blakely Sokoloff Taylor & Zafman LLP

(57) ABSTRACT

A method and apparatus for providing native undo, redo, and abort execution abilities of a runtime is disclosed. In one embodiment, a system includes a runtime to execute object-oriented source code with producer dependency declarations for methods, wherein a producer is a runtime instantiatable construct that includes at least an instance and a method associated with that instance, wherein each producer dependency declaration for a given method identifies a set of zero or more producers with outputs that are an input to the given method. According to one embodiment of the invention, the runtime includes a client code tracking module to track the client code commands being run by the runtime. Furthermore, in one embodiment, the runtime also includes a runtime tracking module to track processes of the runtime performed in response to the client code commands being tracked and run by the runtime.

44 Claims, 37 Drawing Sheets

U.S. PATENT DOCUMENTS

| | | | |
|---|---|---|---|
| 6,026,235 | A | 2/2000 | Shaughnessy et al. |
| 6,067,415 | A | 5/2000 | Uchihira |
| 6,111,575 | A * | 8/2000 | Martinez et al. ............ 715/810 |
| 6,145,121 | A | 11/2000 | Levy et al. |
| 6,223,171 | B1 | 4/2001 | Chaudhuri et al. |
| 6,385,770 | B1 | 5/2002 | Sinander et al. |
| 6,407,753 | B1 | 6/2002 | Budinsky et al. |
| 6,493,868 | B1 | 12/2002 | DaSilva et al. |
| 6,571,388 | B1 | 5/2003 | Venkatraman et al. |
| 6,618,851 | B1 * | 9/2003 | Zundel et al. ............... 717/103 |
| 6,826,523 | B1 | 11/2004 | Guy et al. |
| 6,889,227 | B1 | 5/2005 | Hamilton et al. |
| 6,957,191 | B1 | 10/2005 | Belcsak et al. |
| 6,959,429 | B1 | 10/2005 | Hatcher et al. |
| 6,966,013 | B2 | 11/2005 | Blum et al. |
| 7,299,450 | B2 * | 11/2007 | Livshits et al. .............. 717/121 |
| 2001/0001882 | A1 | 5/2001 | Hamilton et al. |
| 2002/0184401 | A1 | 12/2002 | Kadel et al. |
| 2002/0188616 | A1 | 12/2002 | Chinnici et al. |
| 2003/0014464 | A1 | 1/2003 | Deverill et al. |
| 2003/0033132 | A1 | 2/2003 | Algieri et al. |
| 2003/0084063 | A1 | 5/2003 | DelMonaco et al. |
| 2003/0084425 | A1 | 5/2003 | Glaser |
| 2003/0106040 | A1 | 6/2003 | Rubin et al. |
| 2003/0145125 | A1 | 7/2003 | Horikawa |
| 2004/0073892 | A1 * | 4/2004 | Fallah et al. ................ 717/135 |
| 2004/0143819 | A1 | 7/2004 | Cheng et al. |
| 2004/0172626 | A1 | 9/2004 | Jalan et al. |
| 2004/0205524 | A1 | 10/2004 | Richter et al. |
| 2004/0221262 | A1 | 11/2004 | Hampapuram et al. |
| 2004/0230770 | A1 | 11/2004 | Odani et al. |
| 2004/0258187 | A1 | 12/2004 | Jeong et al. |
| 2004/0268327 | A1 | 12/2004 | Burger et al. |
| 2005/0015353 | A1 | 1/2005 | Kumar et al. |
| 2005/0081105 | A1 | 4/2005 | Wedel et al. |
| 2005/0097464 | A1 | 5/2005 | Graeber et al. |
| 2005/0114842 | A1 * | 5/2005 | Fleehart et al. ............. 717/126 |
| 2005/0125776 | A1 | 6/2005 | Kothari et al. |
| 2005/0182782 | A1 | 8/2005 | Anderson |
| 2005/0246681 | A1 | 11/2005 | Little et al. |
| 2005/0273773 | A1 | 12/2005 | Gold et al. |
| 2006/0004851 | A1 | 1/2006 | Gold et al. |
| 2006/0015857 | A1 | 1/2006 | Gold et al. |
| 2006/0053414 | A1 | 3/2006 | Bhandari et al. |
| 2006/0059461 | A1 | 3/2006 | Baker et al. |
| 2006/0074866 | A1 | 4/2006 | Chamberlain et al. |
| 2006/0075383 | A1 | 4/2006 | Moorthy et al. |
| 2008/0134138 | A1 | 6/2008 | Chamieh et al. |
| 2008/0134152 | A1 | 6/2008 | Edde et al. |
| 2008/0134207 | A1 | 6/2008 | Chamieh et al. |

FOREIGN PATENT DOCUMENTS

| | | |
|---|---|---|
| EP | 0 883 057 A2 | 1/2001 |
| EP | 1942411 A2 | 7/2008 |
| EP | 1942411 A3 | 7/2008 |
| EP | 1 952 216 A0 | 8/2008 |
| EP | 1 958 062 B1 | 7/2009 |
| WO | 98/00791 A1 | 1/1998 |
| WO | WO 01/01206 A2 | 5/1998 |
| WO | 02/01359 A2 | 1/2002 |
| WO | 2008/064899 A2 | 6/2008 |
| WO | 2008/064900 A2 | 6/2008 |
| WO | 2008/064901 A2 | 6/2008 |
| WO | 2008/064901 A3 | 6/2008 |
| WO | 2008064902 A2 | 6/2008 |
| WO | 2008064902 A3 | 6/2008 |
| WO | WO 2008/064899 A3 | 6/2008 |
| WO | WO 2008/064900 A3 | 6/2008 |

OTHER PUBLICATIONS

Jagadish et al., Recovering from main-memory lapses, Citeseer, 1993, pp. 1-16.*
Invitation to Pay Additional Fees (includes Partial International Search Report), PCT/EP2007/010407, dated Jun. 10, 2008, 5 pages.
ISR and Written Opinion, PCT/EP2007/010407, dated Oct. 24, 2008, 19 pages.
ISR and Written Opinion, PCT/EP2007/010408, dated Jun. 10, 2008, 13 pages.
ISR and Written Opinion, PCT/EP2007/010409, dated Jun. 5, 2008, 23 pages.
Partial European Search Report, Application No. 07254672.4 dated Jun. 12, 2008, 17 pages.
International Preliminary Report on Patentability, PCT/EP2007/010409, dated Jun. 3, 2009, 15 pages.
International Preliminary Report on Patentability, PCT/EP2007/010407, dated Jun. 3, 2009, 13 pages.
International Preliminary Report on Patentability, PCT/EP2007/010410, dated Jun. 3, 2009, 9 pages.
International Preliminary Report on Patentability, PCT/EP2007/010408, dated Jun. 3, 2009, 9 pages.
Finn Haugen, "Introduction to LabVIEW Simulation Module 2.0," Oct. 29, 2006, 28 pages, downloaded from http://techteach.no/publications/labview/sim_module/2_0/index.htm on Nov. 29, 2006.
International Search Report and Written Opinion, Application No. PCT/EP2007/010410, dated Jun. 4, 2008, 14 pages.
Hibernate Annotations, Reference Guide, Version: 3.2.0 CR1, May 13, 2006, 57 pages.
Hibernate EntityManager, User Guide, Version: 3.2.0 CR1, May 13, 2006, 52 pages.
Hibernate Reference Documentation, Version: 3.1.1, Jan. 18, 2006, 223 pages.
Hibernate Tools, Reference Guide, Version: 3.1.0.beta5, Aug. 22, 2005, 43 pages.
Hibernate 3.0, 2005, 4 pages, JBoss Inc.
NHibernate Reference Documentation, Version: 1.0.2, Jan. 15, 2006, 151 pages.
James Gosling et al., "The Java Language Specification, Third Edition," May 2005, 684 pages, Addison-Wesley.
"javadoc—The Java API Documentation Generator," 2002, 54 pages, Sun Microsystems, Inc., downloaded from http://java.sun.com/j2se/1.5.0/docs/tooldocs/windows/javadoc.html on Nov. 28, 2006.
"Autoboxing and Auto-Unboxing support for the Java Programming Language, Proposed Final Draft," Jul. 12, 2004, 7 pages, Sun Microsystems, Inc., Palo Alto, California.
"An enhanced for loop for the Java Programming Language, Proposed Final Draft," Jul. 12, 2004, 4 pages, Sun Microsystems, Inc., Palo Alto, California.
"A Typesafe Enum Facility for the Java Progamming Language: Proposed Final Draft," Jul. 12, 2004, 6 pages, Sun Microsystems, Inc., Palo Alto, California.
Seam—Contextual Components, A Framework for Java EE 5, Version: 1.0.CR2, Apr. 2006, 138 pages.
Rod Johnson, "Introduction to the Spring Framework," May 2005, 27 pages, downloaded from http://www.theseverside.com/tt/articles/content/SpingFramework/article.html on Jun. 19, 2006.
Martin Fowler, "Inversion of Control Containers and the Dependency Injection pattern," Jan. 23, 2004, 21 pages, downloaded from http://martinfowler.com/articles/injection.html on Aug. 6, 2006.
Rod Johnson et al., "Spring, java/j2ee Application Framework, Version 2.0 M5," 2004-2006, 442 pages.
"Quals: Programming Languages," Jan. 1, 2005, 43 pages, downloaded from http://www.cs.wm.edu/~coppit/wiki/index.php?title=Quals:_Programming_Languages&printable=yes on Dec. 1, 2006.

"Lucid (ID:960/luc002) dataflow language," 9 pages, downloaded from http://hopl.murdoch.edu.au/showlanguage2.prx?exp=960 on Dec. 1, 2006.

"dataflow language," 4 pages, downloaded from http://www.answers.com/main/ntquery?tname=dataflow%2Dlanguage&print=true on Nov. 29, 2006.

"Visual programming language," Nov. 29, 2006, 4 pages, downloaded from http://en.wikipedia.org/w/index.php?title=Visual_programming_language&printable=yes on Nov. 29, 2006.

"Dataflow Programming," Apr. 24, 2005, 2 pages, downloaded from http://c2.com/cgi/wiki?DataflowProgramming on Nov. 29, 2006.

"Dataflow language," Nov. 25, 2006, 5 pages, downloaded from http://en.wikipedia.org/w/index.php?title=Dataflow_language&printable=yes on Nov. 29, 2006.

"LabVIEW," Nov. 24, 2006, 8 pages, downloaded from http://en.wikipedia.org/w/index.php?title=LabVIEW&printable=yes on Nov. 29, 2006.

"LabVIEW FAQs," 2006, 3 pages, National Instruments Corporation, downloaded from http://www.ni.com/labview/faq.htm on Nov. 29, 2006.

Command pattern, Nov. 18, 2006, 7 pages, downloaded from http://en.wikipedia.org/w/index.php?title=Command_pattern&printable=yes on Nov. 29, 2006.

Memento pattern, Nov. 20, 2006, 3 pages, downloaded from http://en.wikipedia.org/w/index.php?title=Memento_pattern&printable=yes on Nov. 29, 2006.

Gilad Bracha et al., "Adding Generics to the Java Programming Language: Participant Draft Specification," Apr. 27, 2001, 18 pages.

"JSR175: A Program Annotation Facility for the Java™ Programming Language: Proposed Final Draft," Aug. 12, 2004, 12 pages, Sun Microsystems, Inc., Palo Alto, California.

1st Examination Report, European Patent Application No. 07254672.4, dated May 19, 2009, 8 pages.

Result of Consultation, European Patent Application No. 07254672.4, dated Sep. 24, 2010, 15 pages.

Summons to Attend Oral Proceedings, European Patent Application No. 07254672.4, dated Jun. 28, 2010, 11 pages.

1st Examination Report, European Patent Application No. 07856310.3, dated May 15, 2009, 9 pages.

Result of Consultation, European Patent Application No. 07856310.3, dated Sep. 24, 2010, 3 pages.

Summons to Attend Oral Proceedings, European Patent Application No. 07856310.3, dated Jun. 29, 2010, 10 pages.

1st Examination Report, European Patent Application No. 07856311.1, dated May 28, 2009, 8 pages.

Result of Consultation, European Patent Application No. 07856311.1, dated Sep. 24, 2010, 3 pages.

Summons to Attend Oral Proceedings, European Patent Application No. 07856311.1, dated Jun. 29, 2010, 11 pages.

Bill Venners, "The Linking Model", Inside the Java Virtual Machine, Chapter 8, 1999, pp. 1-61, reprinted from http://www.artima.com/insidejvm/ed2/linkmodP.html on Sep. 20, 2010, Tata McGraw-Hill.

Bill Venners, "Thread Synchronization", Inside the Java Virtual Machine, Chapter 20, pp. 1-11, reprinted from http://www.artima.com/insidejvm/ed2/threadsynchP.html on Sep. 20, 2010.

* cited by examiner

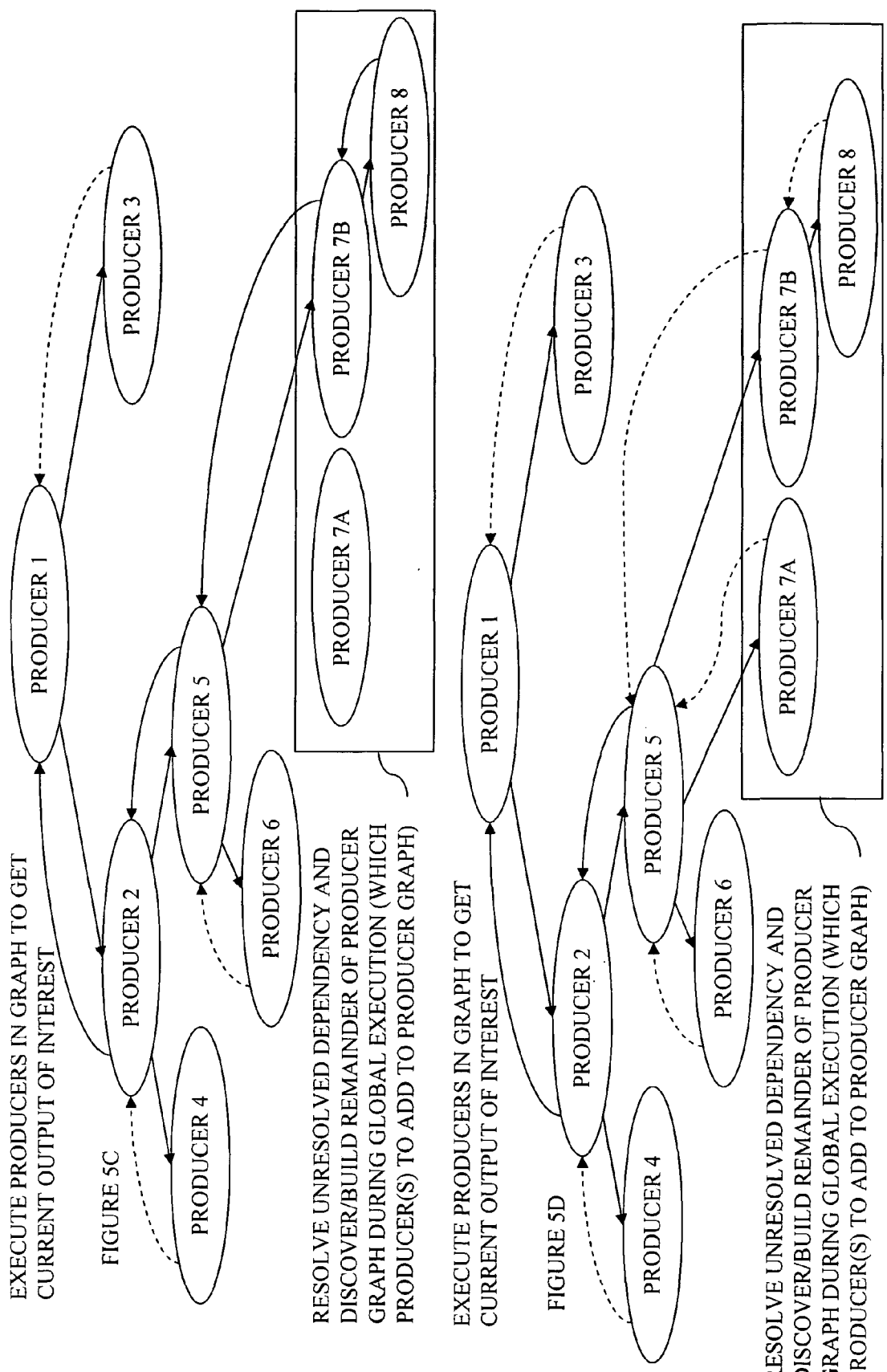

FIGURE 7A
PRODUCER DEPENDENCY DEC. STATEMENT (ARGUMENTDEP. 1; ... ARG.DEP. N; ... FIELDDEP. 1 ...M; SEQ.DEP. 1..L; UPWARDDEP. 1..P; WEAKLYCONSTRAINEDDEP. 1..Q) 705
METHOD ALPHA (ARG. 1, ... ARG. N) 710
FIGURE 7B
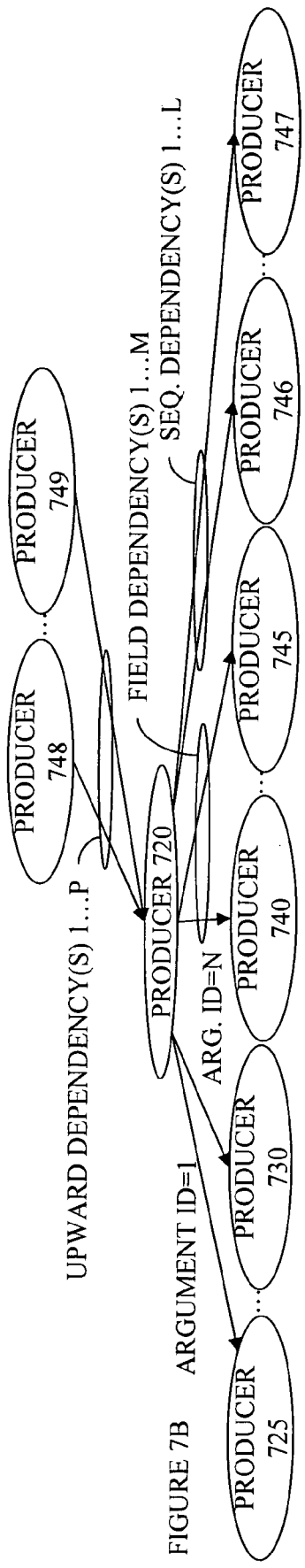
FIGURE 7C
PRODUCER DEPENDENCY DECLARATION STATEMENT (ARGUMENTDEP. 1; ...) 705
METHOD ALPHA (ARG. 1, ... ARG. N) 710
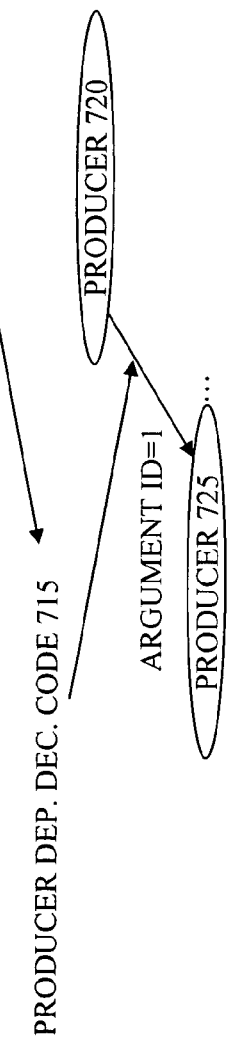

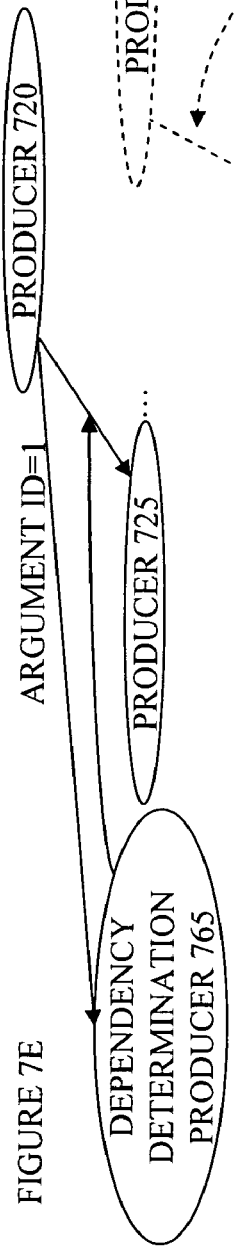
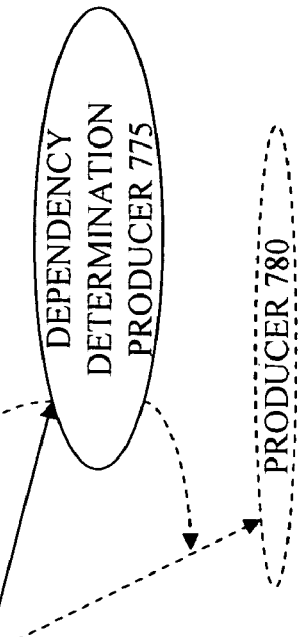
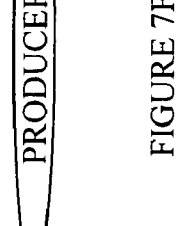
FIGURE 7D
PRODUCER DEPENDENCY DECLARATION STATEMENT (ARGUMENTDEP. 1; ....) 705
METHOD ALPHA (ARG. 1, ... ARG. N) 710
PRODUCER DEPENDENCY DECLARATION STATEMENT (...) 750
METHOD BETA (...) 755
PRODUCER DEP. DEC. CODE 760
FIGURE 7E
FIGURE 7G
FIGURE 7F

POPULATED BASED ON INSTANCE SELECTION 858

IF OVERRIDE DATE OF BIRTH, THEN WILL RESULT IN A SET AND EXECUTE AND AGE WILL RECALCULATE 860

MENU BAR 850

CONFIGURATION AND MAPPING VIEWER 854

| CLASSES WITH THEIR GET PROPERTY METHODS 852 | | | | | | | | | | | | | |
|---|---|---|---|---|---|---|---|---|---|---|---|---|---|
| PERSON | CUSTOMER | | | | | | | | | | | | |
| FIRSTNAME | FIRST NAME | JOHN | INSTANCE SELECTION 854 | | | | | | | | | | |
| LASTNAME | LAST NAME | SMITH | | | | | | | | | | | |
| GENDER | DATE OF BIRTH | 7/20/1990 | | | | | | | | | | | |
| HOMEADDRESS | AGE | 16 | | | | | | | | | | | |
| PROFESSIONAL ADDRESS | | | | | | | | | | | | | |
| DATEOFBIRTH | | | | | | | | | | | | | |
| AGE | | | | | | | | | | | | | |
| ADDRESS | | | | | | | | | | | | | |
| CITY | | | | | | | | | | | | | |
| STATE | | | | | | | | | | | | | |
| ZIPCODE | | | | | | | | | | | | | |

```
OBJECT ORIENTED SOURCE CODE WITH
PRODUCER DEPENDENCY DECLARATIONS FOR
METHODS 905
─────────────────────────────────────────
RUNTIME WITH PRODUCER GRAPH ORIENTED
PROGRAMMING SUPPORT 910

┌──────────────────────────────┐
    │ NATIVE UNDO, REDO, AND ABORT │
    │   EXECUTION ABILITIES 912    │
    └──────────────────────────────┘
─────────────────────────────────────────
RUNTIME WITH CLASS LOADING, DYNAMIC
CLASS INSTANTIATION, DYNAMIC SINGLE
METHOD INVOCATION, AND CLASS/METHOD
INTROSPECTION 915
─────────────────────────────────────────
OPERATING SYSTEM 920
```

FIGURE 9B

```
OBJECT ORIENTED SOURCE CODE WITH
PRODUCER DEPENDENCY DECLARATIONS FOR
METHODS 925
─────────────────────────────────────────
RUNTIME WITH CLASS LOADING, DYNAMIC
CLASS INSTANTIATION, DYNAMIC SINGLE
METHOD INVOCATION, AND CLASS/METHOD
INTROSPECTION, AS WELL AS WITH PRODUCER
GRAPH ORIENTED PROGRAMMING SUPPORT 930

┌──────────────────────────────┐
    │ NATIVE UNDO, REDO, AND ABORT │
    │   EXECUTION ABILITIES 932    │
    └──────────────────────────────┘
─────────────────────────────────────────
OPERATING SYSTEM 935
```

FIGURE 9C

```
OBJECT ORIENTED SOURCE CODE WITH
PRODUCER DEPENDENCY DECLARATIONS FOR
METHODS 940
─────────────────────────────────────────
OPERATING SYSTEM RUNTIME WITH CLASS
LOADING, DYNAMIC CLASS INSTANTIATION,
DYNAMIC SINGLE METHOD INVOCATION, AND
CLASS/METHOD INTROSPECTION, AS WELL AS
WITH PRODUCER GRAPH ORIENTED
PROGRAMMING SUPPORT 945

┌──────────────────────────────┐
    │ NATIVE UNDO, REDO, AND ABORT │
    │   EXECUTION ABILITIES 947    │
    └──────────────────────────────┘
```

| CLASS KEY 1110 | CLASS REFERENCE 1115 | LOG ELEMENT NUMBER 1117 | DELETION FLAG 1119 |
|---|---|---|---|
| | | | |
| | | | |

FIGURE 11A

| INSTANCE KEY 1120 | INSTANCE REFERENCE 1125 | LOG ELEMENT NUMBER 1127 | DELETION FLAG 1129 |
|---|---|---|---|
| | | | |
| | | | |

FIGURE 11B

| CLASS REF. 1135 | INSTANCE REFERENCE 1140 | METHOD REFERENCE 1145 | PARENT PRODUCER(S) LINK(S) 1150 (INCLUDING FOR EACH LINK A PARENT PRODUCER REFERENCE, A DEPENDENCY DETERMINATION PRODUCER REFERENCE, A LOG ELEMENT NUMBER, AND A DELETION FLAG) | CHILD PRODUCER LINK(S) 1160 (INCLUDING FOR EACH LINK CHILD PRODUCER REFERENCE(S), A DEPENDENCY DETERMINATION PRODUCER REFERENCE, A LINK MODE, A STICKY INDICATOR, A LOG ELEMENT NUMBER, AND A DELETION FLAG) | PRODUCER OUTPUT CACHING & OVERRIDE PRODUCER OUTPUT INDICATIONS 1170 | INCREMENTAL EXECUTION MARKING 1180 | LOG ELEMENT NUMBER 1185 | DEL. FLAG 1187 |
|---|---|---|---|---|---|---|---|---|
| | | | | | | | | |
| | | | | | | | | |

FIGURE 11C

| METHOD KEY 1190 | METHOD REFERENCE 1192 | ARG. 1194 | FIELD 1196 | SEQ. 1195 | UPWARD 1193 | WEAKLY CONSTRAINED 1199 | OUTPUT CLASS 1197 | ADDITIONAL ANNOTATIONS 1198 | LOG ELEMENT NUMBER 1188 | DELETION FLAG 1189 |
|---|---|---|---|---|---|---|---|---|---|---|
| | | | | | | | | | | |
| | | | | | | | | | | |

FIGURE 11D

| COMMAND ID 1210 | RUN ID 1214 | COMMAND NATURE 1218 |
|---|---|---|
|  |  |  |

FIGURE 12A

| COMMAND ID 1210 | INSERTION OR REMOVAL 1220 | ELEMENT NATURE 1222 | LOG ELEMENT NUMBER 1224 |
|---|---|---|---|
|  |  |  |  |

FIGURE 12B

| LOG ELEMENT NUMBER 1240 | NATURE OF ITEM MODIFIED 1245 | MODIFIED KEY 1250 | MODIFIED ITEM AFFECTED MEMBER 1255 | MODIFICATION OR RESTORE 1260 | PREVIOUS VALUE 1265 | CURRENT VALUE 1270 |
|---|---|---|---|---|---|---|
|  |  |  |  |  |  |  |

FIGURE 12C

| SUBSCRIBER'S PRODUCER KEY 1400 | SUBSCR. TYPE 1405 | SUBSCR. CRITERIA FOR TRIGGER PRODUCERS 1410 | MATCHING PRODUCERS (ABSORBING) 1415 | COMPLETED (ABSORBING) 1420 | PAR. LINK MODE 1425 | PAR. CLASS 1430 | PAR. METHOD 1435 | PAR. INST. 1437 | DEPENDENCY DET. PROD. REF. 1421 | LOG ELEMENT NUMBER 1485 | DEL. FLAG 1490 |
|---|---|---|---|---|---|---|---|---|---|---|---|
| 1450 | ABSORBING | FROM 1455 | 1460A..N INCLUDING LOG ELEMENT NUMBER(S) AND DELETION FLAG(S) 1492A..N | YES OR NO | LINK MODE OF 1450 | N/A | N/A | N/A | N/A | | |
| 1470 | STICKY | FROM 1470 | N/A | N/A | LINK MODE OF 1480 FROM 1470 | CLASS OF 1480 FROM 1470 | METHOD OF 1480 FROM 1470 | 1480 | 1470 | | |

FIGURE 14A

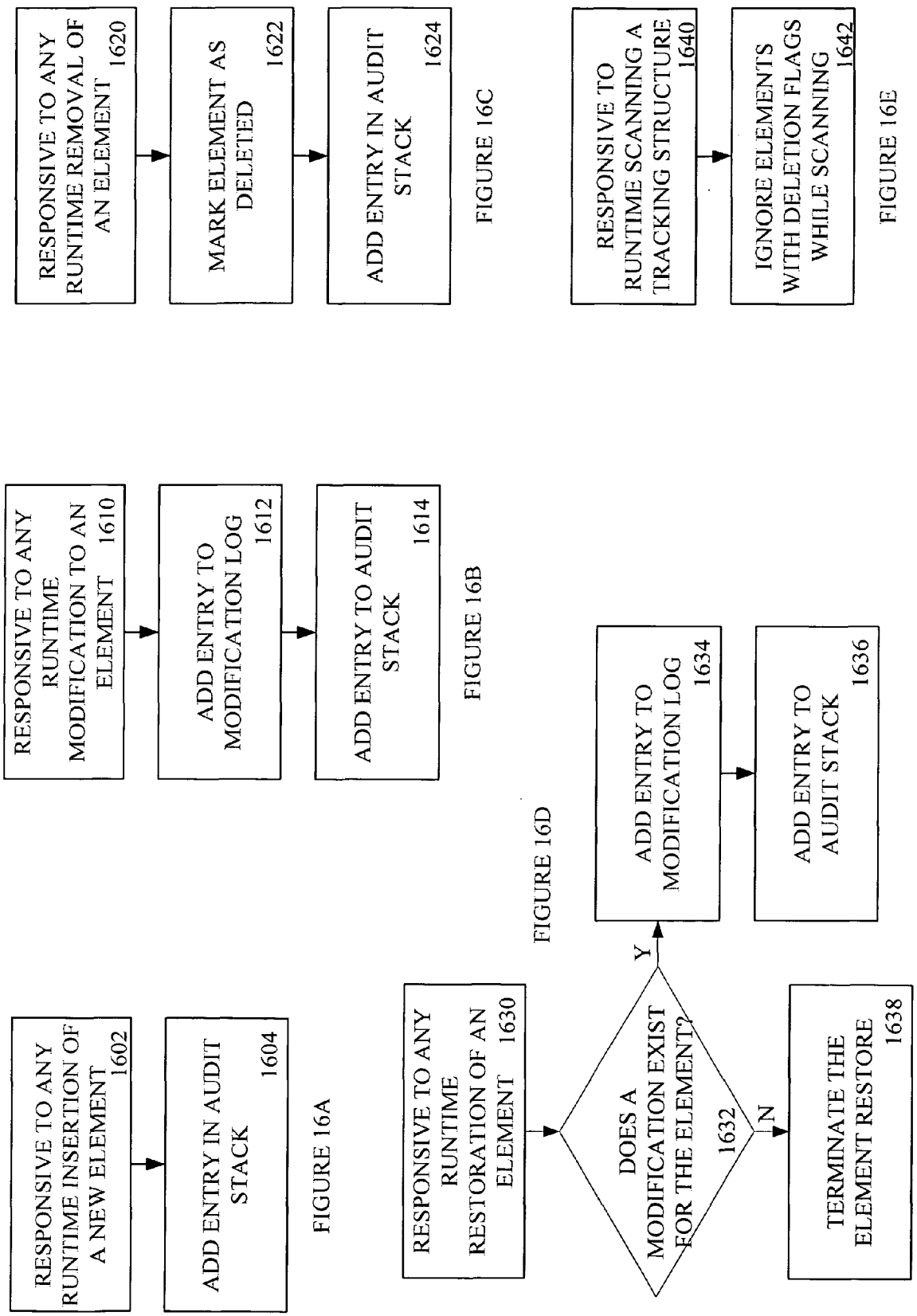

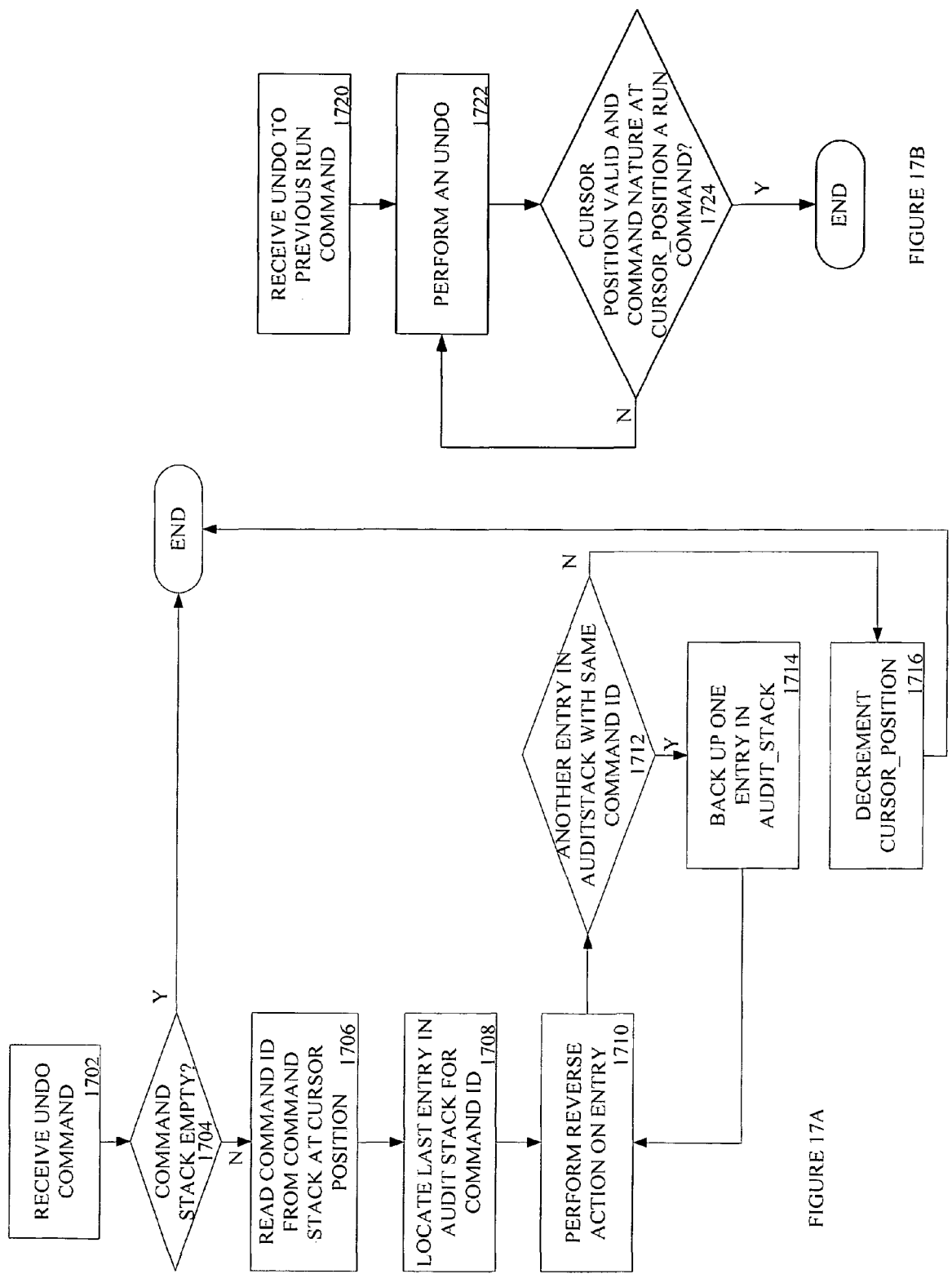

PRODUCER GRAPH ORIENTED PROGRAMMING FRAMEWORK WITH UNDO, REDO, AND ABORT EXECUTION SUPPORT

CROSS-REFERENCE TO RELATED APPLICATIONS

Not Applicable.

BACKGROUND

1. Field

Embodiments of the invention relate to the field of computers; and more specifically, to the field of running a software application with a runtime.

2. Background

Object-Oriented Programming

Object-oriented programming is a computer programming paradigm. The idea behind object-oriented programming is that a computer program may be seen as comprising a collection of individual units (called objects or instances) that act on each other, as opposed to a traditional view in which a program may be seen as a collection of functions, or simply as a list of instructions to the computer. An object is a language mechanism for binding data with methods that operate on that data. Each object is capable of being called through methods, processing data, and providing results to other objects. Each object can be viewed as an independent machine or actor with a distinct role or responsibility.

A reflective object-oriented language is a programming language that has a particular set of characteristics (e.g., classes, objects/instances, inheritance, reflection, etc.), whereas a reflective object-based language is sometimes used to label a programming language that has some subset of those characteristics (e.g., objects). For purposes of this document, the phrases "object-oriented source code" and "object-oriented code" will be used to refer to code written in a language that has such characteristics (e.g., code written in a reflective object-oriented language, code written in a reflective object-based language). While procedural languages, non-reflective object-oriented languages, and non-reflective object-based languages are programming languages that do not typically support such characteristics, transformation techniques may be used to provide such characteristics (e.g., through emulation) to code properly written in such languages; and thus, such techniques transform such languages into a reflective object-based language or reflective object-oriented language. (These techniques need not emulate all characteristics of object oriented or based languages, but may emulate only those characteristics which are of interest to the rest of this document) For purposes of this document, the phrases "object-oriented source code" and "object-oriented code" will also be used to refer to such transformed procedural, non-reflective object-oriented, and non-reflective object-based language code. By way of example, and not limitation, this document primarily describes object-oriented source code written in a reflective object-oriented language. Also, the terms object and instance are used interchangeably herein.

Used mainly in object-oriented programming, the term method refers to a piece of code that is exclusively associated either with a class (called class methods, static methods, or factory methods) or with an object (called instance methods). Like a procedure in procedural programming languages, a method usually consists of a sequence of statements to perform an action, a set of input parameters to parameterize those actions, and possibly an output value of some kind that is returned.

When programmers write a program using an object-oriented language, the resulting code can be conceptually viewed as including four basic types of code. The first type includes commands that operate on input instance(s) to provide output instance(s) (referred to herein as "transformation" code); typically written as methods (referred to herein as "transformation" methods). The second type includes instance instantiation commands that cause the runtime to instantiate instances of classes (referred to herein as "instance instantiation" code). The third type includes property manipulation commands (referred to herein as "data preparation" code) to invoke property methods (accessors, mutators, etc.) of the above instances. The fourth type includes sequences of commands that cause method invocation sequencing using the appropriate instances (where the appropriate instances include the instances to use as arguments, the instances to be used by instance methods, and the meta class instances used by class methods) to specify what transformation methods of what instances to invoke, in which order, and with which parameters of which instances responsive to the changes made by data preparation code (referred to herein as "manual invocation sequencing" code). The manual invocation sequencing code is sometimes written as methods separate from the transformation methods, and thus the manual invocation sequencing code includes sequences of invocation commands for the transformation methods. A program typically iterates between data preparation code and manual invocation sequencing code (which may also dip into the instance instantiation code), which in turn invokes transformation code (which may also dip into the instance instantiation code and data preparation code types). It should be noted that this is a conceptual representation of a program, and thus, should not be taken as an absolute with regard to how to view a program.

Runtime

The term runtime is used herein to refer to a program or library of basic code that runs other code written in the same and/or a different language. Thus, a runtime is a collection of utility functions that support a program while it is running, including working with the operating system to provide facilities such as mathematical functions, input and output. These make it unnecessary for programmers to continually rewrite basic capabilities specified in a programming language or provided by an operating system. Since the demarcation between a runtime and an operating system can be blurred, the term runtime is used herein to refer to code separate from the operating system and/or code that is part of the operating system.

Early runtimes, such as that of FORTRAN, provide such features as mathematical operations. Other languages add more sophisticated features—e.g., memory garbage collection, often in association with support for objects. More recent languages tend to have considerably larger runtimes with considerably more functionality. Many object-oriented languages also include a system known as the "dispatcher" and "class loader." The Java Virtual Machine (JVM) is an example of such a runtime: it also interprets or compiles the portable binary Java programs (byte-code) at runtime. The common language runtime (CLR) framework is another example of a runtime.

Object-oriented software applications generally have methods, data as input to those methods, and method outputs based on the input data. Changes to methods and input data may impact one, some, or all of a software application. As such the software application enters a new state based on the new and/or changed values and well as updated programming code for a method.

If a user or programmer of the software application determines that the new state of the software application is not desirable, either because there is some perceived error, an unwanted result is obtained, etc., the user may desire to undo the previous result. However, if the undo is deemed unsatisfactory the user may wish to then redo what was just undone, thus returning the program back to the state it existed in prior to the undo.

Besides undoing and redoing changes to an application which impact application states, a user may also desire to stop or terminate an application, such as when the application appears frozen. Prior Systems generally stop the entire application, i.e. a ctrl-alt-del or an exit ('X') button on a GUI. When a ctrl-alt-del or an exit button is detected, an application is ended and all data for the application is lost. When an application requires a large amount of data for a calculation, or performs a large number of operations for a calculation, ending the application can negatively impact both computation resources and time. Thus, upon re-executing the software application, all the data must be re-loaded and all the computations must be re-performed.

BRIEF SUMMARY

A system and method is disclosed herein for providing native undo, redo, and abort execution abilities in a producer graph oriented programming framework. In one embodiment, an apparatus comprises a runtime to run object-oriented source code with producer dependency declarations for methods, where a producer is an instance and a method associated with that instance, and wherein each producer dependency declaration for a given method identifies a set of zero or more producers with outputs that are an input to the given method. The runtime also includes a client code tracking module to track client code commands being run by the runtime, and a runtime tracking module to track each process of the runtime performed in response to the client code commands being tracked and run by the runtime.

Other features and advantages of the present invention will be apparent from the accompanying drawings and from the detailed description that follows below.

BRIEF DESCRIPTION OF THE DRAWINGS

The invention may best be understood by referring to the following description and accompanying drawings that are used to illustrate embodiments of the invention. In the drawings:

FIG. 5C is a block diagram illustrating the initial execution of the producer graph of FIG. 5A and/or the reexecution of the producer graph of FIG. 5B according to one embodiment of the invention;

FIG. 5D is a block diagram illustrating the initial execution of the producer graph of FIG. 5A and/or the reexecution of the producer graph of FIG. 5B or 5C according to one embodiment of the invention;

FIG. 7A illustrates pseudo code of a producer dependency declaration for a method using shortcut declared dependencies according to one embodiment of the invention;

FIG. 7B is a block diagram of exemplary producers according to one embodiment of the invention;

FIG. 7C illustrates pseudo code of a producer dependency declaration for a method using a non-shortcut declared dependency, and illustrates a block diagram of exemplary producers according to one embodiment of the invention;

FIG. 7D illustrates pseudo code of a producer dependency declaration for a method using a non-shortcut declared dependency according to one embodiment of the invention;

FIG. 7E is a block diagram of exemplary producers according to one embodiment of the invention;

FIG. 7F is a block diagram of an exemplary dependencies through use of a UpwardDependency with a dependency determination producer according to one embodiment of the invention;

FIG. 7G is a block diagram of possible exemplary dependencies through use of a WeaklyConstrainedDependency with a dependency determination producer according to one embodiment of the invention;

FIG. 8D illustrates another exemplary screenshot and usage of free cell selection with the configurable interactive producer output layout graphical user interface module 840 according to one embodiment of the invention;

FIG. 9A is a block diagram illustrating a first scheme for distributing a runtime with producer graph oriented programming support according to one embodiment of the invention;

FIG. 9B is a block diagram illustrating a second scheme for distributing a runtime with producer graph oriented programming support according to one embodiment of the invention;

FIG. 9C is a block diagram illustrating a third scheme for distributing a runtime with producer graph oriented programming support according to one embodiment of the invention;

FIG. 11A is a block diagram of an example of the class tracking structure 1092 of FIG. 10 according to one embodiment of the invention;

FIG. 11B is a block diagram of an example of the instance tracking structure 1065 of FIG. 10 according to one embodiment of the invention;

FIG. 11C is a block diagram of an example of the producer graph(s) structure 1060 of FIG. 10 according to one embodiment of the invention;

FIG. 11D is a block diagram of an example of the method tracking structure 1058 of FIG. 10 according to one embodiment of the invention;

FIG. 12A is a block diagram of an example of the command stack of undo, redo, and abort execution tracking structure(s) 1067 of FIG. 10 according to one embodiment of the invention;

FIG. 12B is a block diagram of an example of the audit stack of undo, redo, and abort execution tracking structure(s) 1067 of FIG. 10 according to one embodiment of the invention;

FIG. 12C is a block diagram of an example of the modification of undo, redo, and abort execution tracking structure(s) 1067 of FIG. 10 according to one embodiment of the invention;

FIG. 14A is a block diagram of an example of the subscription log 1250 of FIG. 12 according to one embodiment of the invention;

FIG. 16A is a flow diagram for tracking of runtime element insertions in an application according to one embodiment of the invention;

FIG. 16B is a flow diagram for tracking of runtime element modifications in an application according to one embodiment of the invention;

FIG. 16C is a flow diagram for tracking of runtime element removals in an application according to one embodiment of the invention;

FIG. 16D is a flow diagram for tracking of runtime element restorations in an application according to one embodiment of the invention;

FIG. 16E is a flow diagram for runtime scanning of tracking structures in according to one embodiment of the invention;

FIG. 17A is a flow diagram for a runtime undo process according to one embodiment of the invention;

FIG. 17B is a flow diagram for a runtime undo to previous run process according to one embodiment of the invention;

DETAILED DESCRIPTION

Figure 1A:
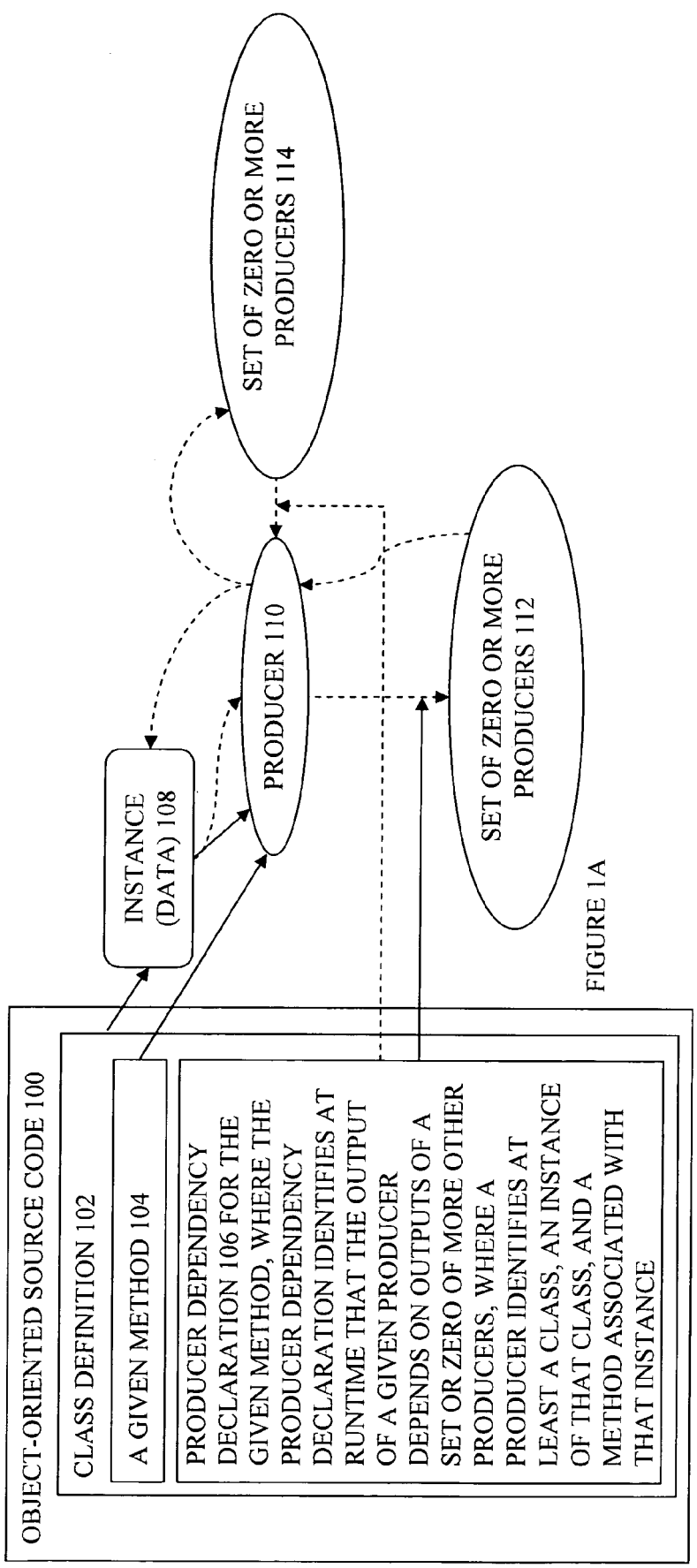
FIG. 1A is a block diagram illustrating the relationship of a producer dependency declaration for a method of a class in object oriented-source code to a producer that includes the class, a given instance of that class, and a method of that class, according to one embodiment of the invention.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the invention. It will be appreciated, however, by one skilled in the art that the invention may be practiced without such specific details. In other instances, control structures, data structures, and full software instruction sequences have not been shown in detail in order not to obscure the invention. Those of ordinary skill in the art, with the included descriptions, will be able to implement appropriate functionality without undue experimentation.

Unless otherwise specified, dashed lines in the figures (with the exception of dashed dividing lines) are used to represent optional items in the figures. However, it should not be presumed that all optional items are shown using dashed lines, but rather those shown in dashed lines were chosen for a variety of reasons (e.g., they could be easily shown, to provide greater clarity, etc.).

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct contact with each other. "Coupled" may mean that two or more elements are in direct contact. However, "coupled" may also mean that two or more elements are not in direct contact with each other, but yet still co-operate or interact with each other.

In some cases, the operations of flow diagrams are described with reference to the exemplary embodiments of the other block diagrams. However, it should be understood that the operations of the flow diagrams can be performed by embodiments of the invention other than those discussed with reference to these other block diagrams, and that the embodiments of the invention discussed with reference to these other block diagrams can perform operations different than those discussed with reference to the flow diagrams.

The techniques shown in the figures can be implemented using code and data stored and executed on one or more computers. Such computers store and communicate (internally and with other computers over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such computers typically include a set of one or more processors coupled to one or more other components, such as a storage device, a number of user input/output devices (e.g., a keyboard and a display), and a network connection. The coupling of the set of processors and other components is typically through one or more busses and bridges (also termed as bus controllers). The storage device and network traffic respectively represent one or more machine storage media and machine communication media. Thus, the storage device of a given computer system typically stores code and data for execution on the set of one or more processors of that computer. Of course, one or more parts of an embodiment of the invention may be implemented using different combinations of software, firmware, and/or hardware.

Overview

According to one aspect of the invention, a producer is at least a specific instance (or object) and a specific method, such that if the producer is executed during runtime, the specific method is executed on the specific instance. Thus, a given producer is instantiated from a given instance and a given method associated with that instance. Like classes, instances, and methods, producers are basic elements or constructs manipulated by the runtime. Thus, the instantiation of a producer is interpreted and tracked by the runtime, and thus the runtime tracks the combination of instances and methods represented by producers. In other words, a producer is a runtime instantiatable construct that is tracked by the runtime, that is executed by the runtime, and that includes at least an instance and a method associated with that instance, such that the runtimes execution of the producer results in the method of the producer being executed on the instance of the producer. Also, the method of a producer has associated with it a producer dependency declaration that identifies, with a set of zero or more producer dependencies, a set of zero or more producers for the given producer. Specifically, producer dependencies are declared for methods using producer dependency declarations, the producer dependency declaration for a given method may include zero or more producer dependencies, and each producer dependency identifies a set of zero or more producers. Thus, producer dependency declarations and the producer dependencies they define are interpreted and tracked by the runtime, and thus the runtime tracks the relationships between producers indicated by the producer dependency declarations.

Where a given producer is dependent on a set of one or more other producers, the runtime will ensure execution of the set of other producers prior to the given producer. Thus, the producer dependency declarations represent execution relationships between producers, while producers represent operations to be performed (methods) and instances. While in some embodiments of the invention allow dependencies of parent producers on child producers to be declared in the producer dependency declaration associated with the method of the parent producer (the producer dependency declaration of the parent producer identifies any child producers—referred to herein as downwardly declared), other embodiments of the invention also allow dependencies to be declared in the producer dependency declaration associated with the method(s) of child producer(s) (the producer dependency declaration of the child producer identifies one or more parent producers—referred to herein as upwardly declared).

In different embodiments of the invention a producer identifies additional things. For example, while in some embodiments of the invention a producer is at least an instance and method associated with that instance, in other embodiments of the invention a producer is a class, an instance of that class, and a method associated with that instance (e.g., a producer may directly include a class, instance, and method; a producer may directly include an instance and a method, while indirectly identifying a class of that instance through a reference (e.g., a reference in the instance)). While the invention may be used in the context of code written in different programming languages (e.g., object-oriented code written in a reflective object-oriented language; object-oriented code written in a reflective object-based language; code written in a procedural, non-reflective object-oriented, non-reflective object-based language and transformed into reflective object-oriented language code), embodiments of the invention will be described, by way of example and not limitation, with reference to reflective object-oriented programming languages and with reference to producers that directly include classes, instances and methods. Also, while in one embodiment of the invention the method of a producer is an instance method (a method that can use instance fields in addition to any inputs received as arguments), alternative embodiments of the invention may also or alternatively support the method of a producer being a class method (methods that receive all inputs as arguments and/or uses instance independent variables) (where the method of a producer is an instance method, the instance of that producer is an instance of a class; while where the method of a producer is a class method, the instance of that producer is a meta-class instance representing the class).

In different embodiments of the invention the runtime includes a client code tracking module and a runtime tracking module. In one embodiment, the client code tracking module tracks client code commands being run by the runtime, while runtime tracking module tracks processes performed by the runtime in response to the execution of the client code commands being run and tracked by the runtime.

According to another aspect of the invention, the runtime also includes a module to cause the runtime to reverse client code commands and those runtime processes consequentially performed by the runtime. In one embodiment of the invention, the module returns an application to a prior state of the application and further re-applies client code commands and consequential runtime processes to advance the state of the application back to a state prior to the runtime reversal of client code commands and consequential runtime processes. Furthermore, the runtime additionally includes an abort execution module to return an application to a prior stable state by reversing client code commands and runtime processes, as well as ceasing runtime processing of additional client code commands and consequential runtime processes. As such, according to embodiments of the present invention, as discussed herein, various embodiments of the runtime include native undo, redo, and abort execution abilities that may be utilized by any application developed for, and run by, the various runtime embodiments.

FIG. 1A is a block diagram illustrating the relationship of a producer dependency declaration for a method of a class in object oriented-source code to a producer that includes the class, a given instance of that class, and a method of that class, according to one embodiment of the invention. In FIG. 1A, object-oriented source code 100 is shown including a class 102, which in turn includes a method 104 and a producer dependency declaration 106 for the method 104. Of course, the class 102 would typically include one or more fields (not shown) and additional methods (not shown). In addition, the object-oriented source code 100 would typically include additional classes.

During runtime, an instance 108 of the class 102 is instantiated. The instance 108 includes the data of the fields of the class 102. In addition, a producer 110 is instantiated, where the producer 110 identifies the class 102, the instance 108 of the class 102 (which has associated with it the method 104 of the class 102), and the method 104 of the class 102. The producer dependency declaration 106 identifies to the runtime a set of zero or more producers 112 (referred to as child producers of the producer 110) that must be executed before execution of the producer 110. In other words, the producer 110 depends on the set of zero or more producers 112. In addition to or instead of consuming outputs of the set of producer 112, the producer 110 may consume data of the instance 108. In addition, the producer 110 provides at least one output, which output may be internal to the instance 108 (and thus, modify the data of the instance 108) and/or may be external; either way, the output of the producer 110 may be consumed by a set or zero or more other producers 114 (referred to as parent producers of the producer 110)). As indicated previously, and described in more detail later herein, the producer dependency declaration 106, in some embodiments of the invention, may also identify to the runtime zero or more of the producers 114.

It should be understood that the inputs and outputs of producers are based on the inputs and outputs of the methods on which those producers are based. As such, these input and outputs may represent multiple parameters having a variety of data structures.

The producer dependency declaration for a given method identifies at runtime the set of zero or more producers to be instantiated and executed. By way of example, where a producer dependency declaration (e.g., producer dependency declaration 106) for a given method (e.g., method 104) identifies a producer dependency on a given producer (which given producer identifies a first class, a first instance of that class, and a first method of that first class) (e.g., one of the set of producers 112), then the producer dependency declaration of the given method identifies to the runtime that the first instance is to be instantiated (if not already) and that the first method is to be used to instantiate the given producer for the first instance (in these examples, first does not mean location or order).

In operation, when, during run time, a given set of one or more producers are designated as being of interest and have producer dependencies declared for them, the runtime: 1) automatically generates (discovers, builds, and optionally resolves) a set of one or more graphs, which may be multilevel and may be of a variety of shapes (e.g., chain, tree), from the given set of producers designated as being of interest down to source producers based on the producer dependency declarations; and 2) sequences execution of producers of the set of graphs to generate the output(s) of the given set of producers designated as being of interest. Thus, the runtime uses the producer dependency declarations to determine what methods with what arguments to execute on what instances, and when for synchronization purposes.

Thus, producer dependencies represent the sequencing of execution of producers to the runtime. However, in addition to indicating the sequencing of execution, producer dependencies may represent different input to output relationships in different embodiments of the invention. For example, different embodiments of the invention may support one or more of argument producer dependencies, field producer dependencies, and sequencing only producer dependencies (sequencing only producer dependencies are referred to herein with the shorthand sequencing producer dependencies). While each of argument producer dependencies, field producer dependencies, and sequencing producer dependencies represent execution sequencing relationships between producers, argument and field producer dependencies additionally represent data of which the runtime is aware. Specifically, an argument producer dependency causes the runtime to map the output of a child producer as an input parameter to a parent producer, whereas a field producer dependency indicates use of a field of an instance. Regardless of the input to output relationship represented by a producer dependency, proper use of producer dependencies ensures that the producers accessing information are sequenced after the producers that impact that information.

Sequencing dependencies may be used for a variety of purposes, including ensuring the order of execution between producers that modify data in a manner of which the runtime is not aware and producers that consume that data (a child producer may write its outputs in a way that requires the method of the parent producer to include code to access that output (e.g., a method that impacts the environment by affecting an output that is not the regular producer output and, as such, that is not detected by the runtime—such as a method that sets a global variable, that sets a field in an instance which is not the producer output, that impacts an external data source, etc.)) Thus, a sequencing dependency reflects a dependency of a parent producer on a child producer, but requires outputs that need to be provided, if any, from one to the other occur through the writing of code (e.g., code in the method of the child producer to write an output to a given mechanism (such as set a global variable, impact an external data source, set a field of an instance which is not the producer output, etc.) and code in the method of the parent producer to read that output from the given mechanism). In this way, sequencing dependencies allow the runtime to synchronize execution of any parent producers that rely on an output that the runtime cannot detect.

In one embodiment of the invention the producer dependency declaration for a given method identifies only direct dependencies on producers (e.g., direct descendents (children), in contrast with indirect descendents (grand-children, great grand-children, etc.)). In such an embodiment, each producer dependency declaration provides only a single tier or layer of producers whose outputs may be used directly by a producer instantiated from the given method; leaving discovery/building/resolution of additional layers of the producer graph(s) to the runtime's processing of other producer dependency declarations.

Exemplary Keys

A producer can be viewed as a set of multiple identifiers, one identifier for each additional level of granularity specified (class, instance, method, etc.). In addition, some embodiments of the invention implement each identifier as a separate key, while other embodiments have certain identifiers share a key. By way of example, some embodiments of the invention implement a producer as a class, instance, and method triplet and implement keys, such that each part of the triplet is identified by a separate key (a class key, instance key, and method key) and the producer is identified by the combination of the class key, instance key, and method key (the producer key).

Embodiments of the invention that use keys may vary in the uniqueness of the keys used. For example, in one embodiment of the invention, each class key is unique, each instance key is unique across all instances of all classes, and each method key is unique across all methods of all classes. As another example, in other embodiments of the invention, each class has a unique key, each instance of a given class has a unique key (across the class instances), and each method of a class has a unique key (across the class methods); but instances of different classes may have the same instance key, and methods of different classes may have the same method key; this later approach will be used in the remainder of the document by way of example and not limitation. For example, assume a first class includes methods and has a key for each of these methods that is unique within the first class, then the instances of this class (which will each have a unique key as to each other) have the same method keys associated with them. As another example, assume a different second class includes methods (be some, all, or none the same as the methods of the first class) that have the same method keys as those used for the first class; as such, an instance of this different class may have associated with it the same method keys as associated with an instance of the first class.

The use of keys allow for a variety of features, including: 1) the tracking of each entity identified by a producer's identifiers (e.g., the tracking of each class, instance, and method); 2) several parent producers (unaware of their mutual existence) to connect to the same child producer based on their producer dependency declarations (which specify producer dependencies using the producer keys); etc. In one embodiment of the invention, the instance key is an instance of a class (InstanceKey) holding two elements: an instance key nature indicating if the key identifier is a reference to the instance or another object (such as a string), and a key identifier which can either be a reference to the instance, or another object (such as a string). The storing of an instance reference in the instance key spares the programmer from inventing a name to identify these instances.

Exemplary Relationships

In the context of the above discussion regarding a producer being viewed as a set of multiple identifiers (with one identifier for each additional level of granularity specified), in one embodiment of the invention the various supported relationships between a producer and its children and parents are those in which at least one such identifier is different between a producer and its set of zero or more parent producers and one such identifier is different between a producer and each of its set of zero or more child producers. By way of providing some exemplary relationships, assume that a first producer is instantiated, where the first producer is a first instance of a first class and a first method of that first class, and assume that the producer dependency declaration for that first method identifies at runtime a second producer as a child, then the second producer may be: 1) the first instance of the first class and a second method of that first class; 2) a second instance of the first class and a second method of that first class; 3) a second instance of the first class and the first method of the first class; or 4) an instance of a second class and a method of that second class. In such case, the first producer is dependent on the second producer—thus, representing an input to output relationship of the first producer on the second producer. Various relationships and combinations of those relationships are described below for one embodiment of the invention that uses an object-oriented language and in which a producer identifies at least a class, instance, and method.

Figure 1B:
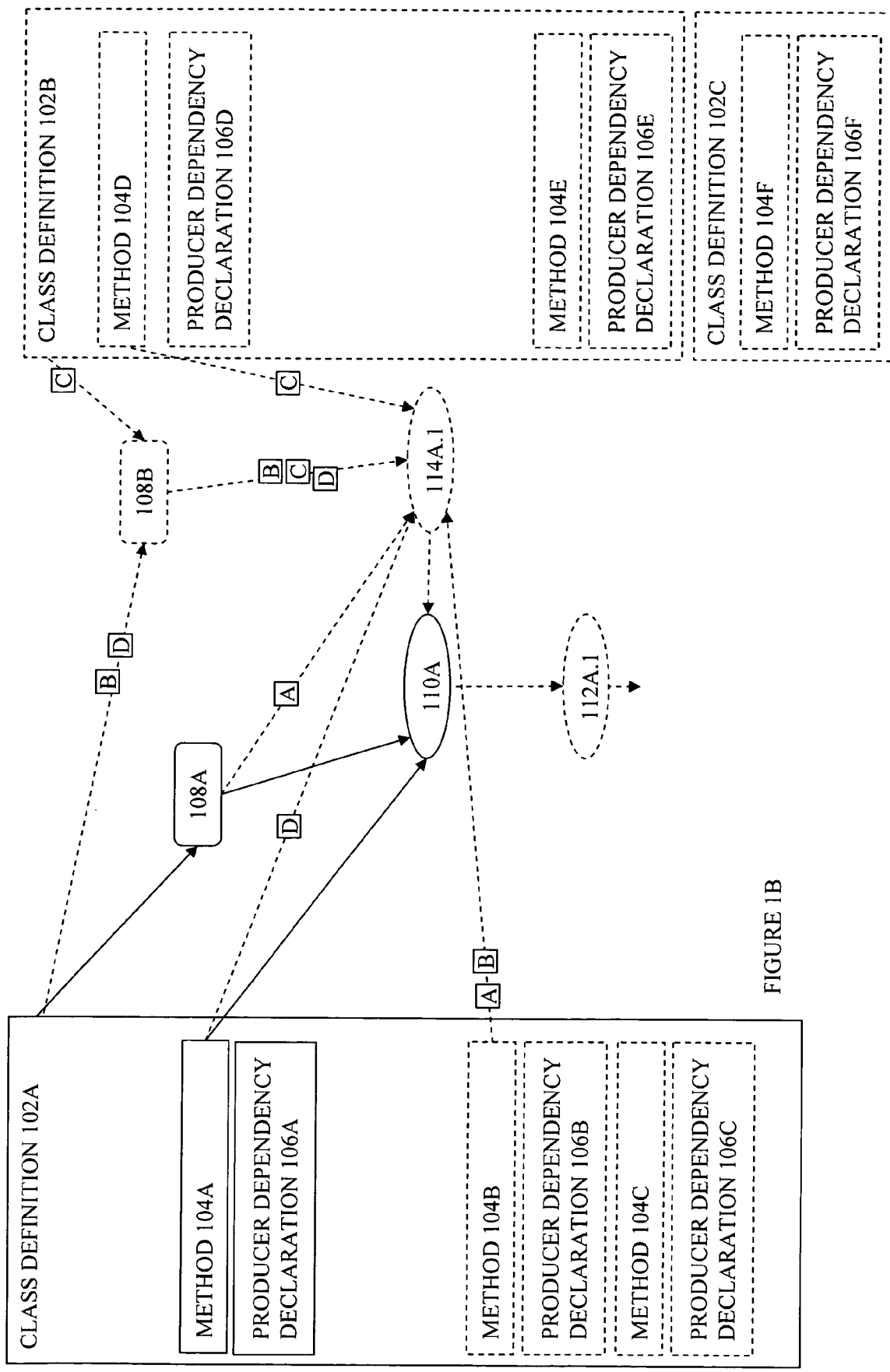
FIG. 1B illustrates exemplary relationships between the producer 110A and the parent producer 114A.1 according to one embodiment of the invention.
Figure 1C:
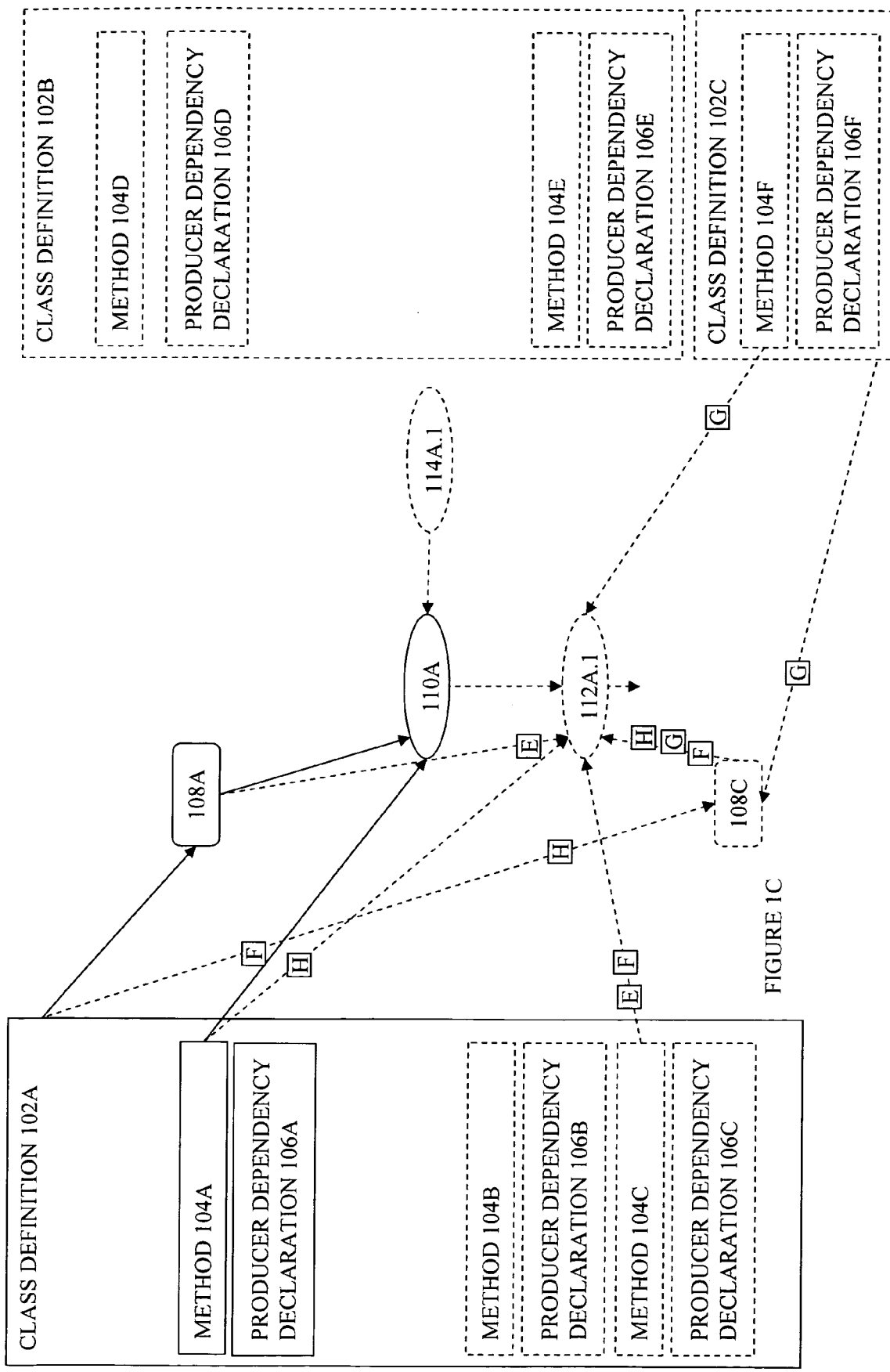
FIG. 1C illustrates exemplary relationships between the producer 110A and the child producer 112A.1 according to one embodiment of the invention.
Figure 1D:
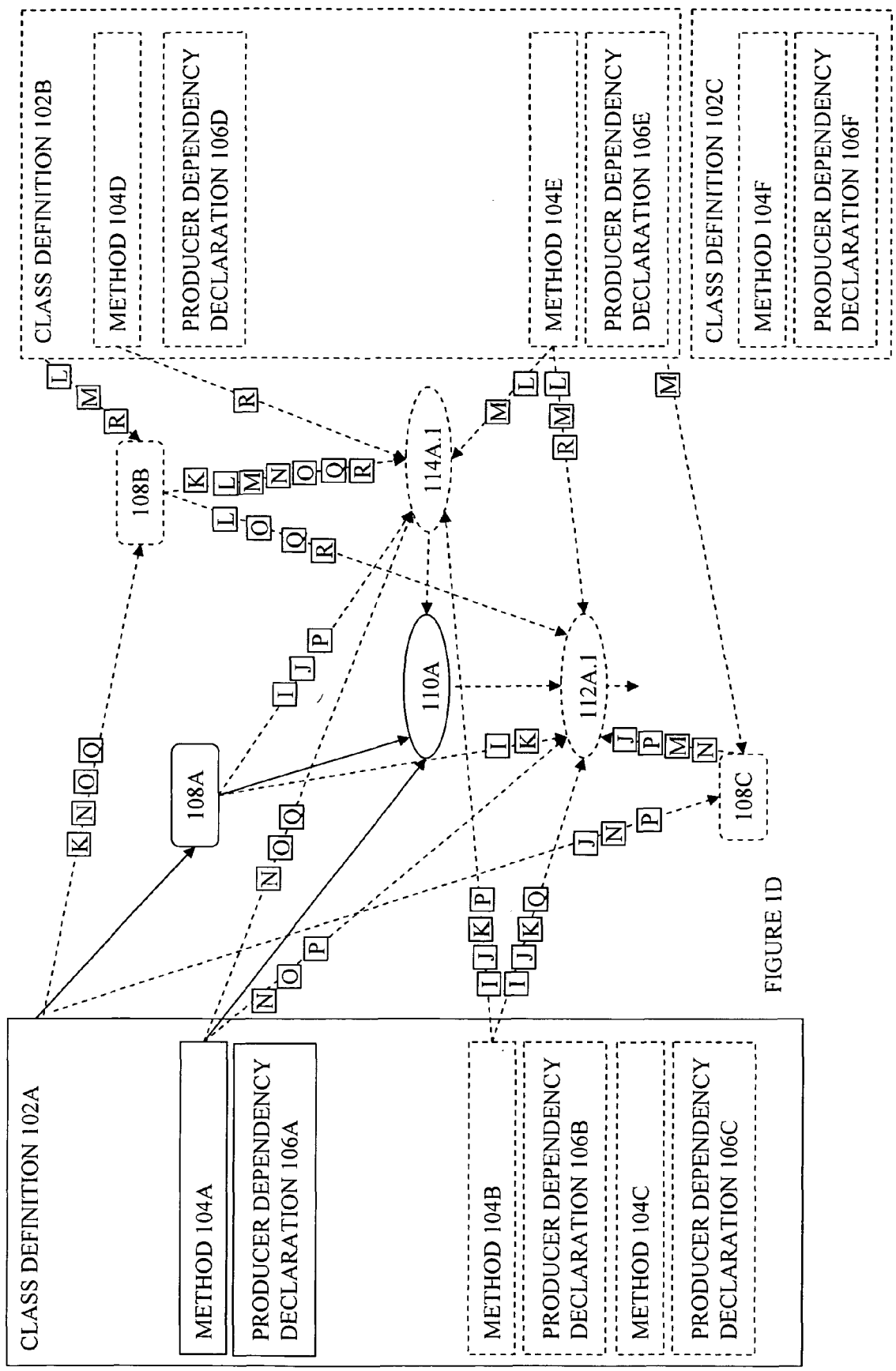
FIG. 1D illustrates some additional exemplary combinations of relationships of parent producers 114 and child producers 112 to producer 110A according to one embodiment of the invention.

FIGS. 1B-1D illustrate exemplary relationships between a given producer, its set of parent producers, and its set of child producers according to one embodiment of the invention. FIGS. 1B-1D each show the following: 1) a class definition 102A including methods 104A-C and producer dependency declarations 106A-C for each of those methods, respectively; 2) a class definition 102B including methods 104D-E and producer dependency declarations 106D-E for each of those methods, respectively; 3) a class definition 102C including method 104F and producer dependency declaration 106F for that method; 4) an instance 108A of the class 102A; 5) a producer 110A that identifies the class 102A, the instance 108A, and the method 104A; and 6) a producer 112A.1 and a producer 114A.1 respectively representing one of the set of producers 112 and 114. Dashed lines with boxed letters on them are used in FIGS. 1B-1D to illustrate the exemplary relationships. Thus, the collection of dashed lines with a boxed A on them represent one relationship. The relationships in FIG. 1B are combinable with the relationships in FIG. 1C; as such, these combinations represent combinations of relationships between parent producers 114A and child producers 112A to producer 110A. Further, FIG. 1D illustrates some additional exemplary combinations of relationships between parent producers 114A and child producers 112A to producer 110A.

FIG. 1B illustrates exemplary relationships between the producer 110A and the parent producer 114A.1 according to one embodiment of the invention. FIG. 1B additionally includes an instance 108B. The set of producers 114 is identified by other producer dependency declarations of different method(s) of the same class, different instances of the same class, and/or method(s) of a different class; and thus, each of the set of producers 114 may be: 1) of the same instance as the producer 110A (instance 108A of class 102A) and a different method associated with that instance (illustrated by the boxed A on the dashed lines from the instance 108A to the producer 114A.1 and from the method 104B to the producer 114A.1); 2) of a different instance of the class 102A and a different method associated with that instance (illustrated by the boxed B on the dashed lines from the class 102A to the instance 108B, from the instance 108B to the producer 114A.1, and from the method 104B to the producer 114A.1); 3) of an instance of a different class and a method associated with that instance (illustrated by the boxed C on the dashed lines from the class 102B to the instance 108B, from the instance 108B to the producer 114A.1, and from the method 104D to the producer 114A.1); or 4) of a different instance of class 102A (than instance 108A) and the same method (method 104A) of that instance (e.g., with a contingent dependency—described later herein) (illustrated by the boxed D on the dashed lines from the class 102A to the instance 108B, from the instance 108B to the producer 14A.1, and from the method 104A to the producer 114A.1); further, where there are multiple producers in the set of producers 114, the producers 114 themselves may be part of the same instance of the class 102A, different instances of the class 102A, an instance of a different class, and/or a mixture of the above.

FIG. 1C illustrates exemplary relationships between the producer 110A and the child producer 112A.1 according to one embodiment of the invention. FIG. 1C additionally includes an instance 108C. Each of the set of producers 112A may be: 1) of the same instance as the producer 110A (instance 108A of class 102A) and a different method associated with that instance (illustrated by the boxed E on the dashed lines from the instance 108A to the producer 112A.1 and from the method 104C to the producer 112A.1); 2) of a different instance of the class 102A and a different method associated with that instance (illustrated by the boxed F on the dashed lines from the class 102A to the instance 108C, from the instance 108C to the producer 112A.1, and from the method 104C to the producer 112A.1); 3) of an instance of a different class and a method associated with that instance (illustrated by the boxed G on the dashed lines from the class 102C to the instance 108C, from the instance 108C to the producer 112A.1, and from the method 104F to the producer 112A.1); or 4) of a different instance of class 102A (than instance 108) and the same method (method 104A) of that instance (e.g., with a contingent dependency described later herein) (illustrated by the boxed H on the dashed lines from the class 102A to the instance 108C, from the instance 108C to the producer 112A.1, and from the method 104A to the producer 112A.1). Thus, each of the set of producers 112A may be of the same instance as the producer 110A, of a different instance of the class 102A, or an instance of a different class; further, where there are multiple producers in the set of producers 112A, the producers 112A themselves may be part of the same instance of the class 102A, different instances of the class 102A, the same instance of a different class, different instances of a different class, and/or a mixture of the above.

FIG. 1D illustrates some additional exemplary combinations of relationships of parent producers 114 and child producers 112 to producer 110A according to one embodiment of the invention. FIG. 1D additionally includes the instance 108B and the instance 108C. The combinations of FIG. 1D are shown in Table 1 below:

TABLE 1

| Boxed Letter | Dashed Lines For Parent Producer 114A.1 from | Dashed Lines For Child Producer 112A.1 from |
| --- | --- | --- |
| I | From instance 108A to producer 114A.1 and from method 104B to producer 114A.1 | From instance 108A to producer 112A.1 and from method 104B to producer 112A.1 |
| J | From instance 108A to producer 114A.1 and from method 104B to producer 114A.1 | From class 102A to instance 108C, from instance 108C to producer 112A.1, and from method 104B to producer 112A.1 |
| K | From class 102A to instance 108B, from instance 108B to producer 114A.1, and from method 104B to producer 114A.1 | From instance 108A to producer 112A.1 and from method 104B to producer 112A.1 |
| L | From class 102B to instance 108B, from instance 108B to producer 114A.1, and from method 104A to producer 114A.1 | From class 102B to instance 108B, from instance 108B to producer 112A.1, and from method 104E to producer 112A.1 |
| M | From class 102B to instance 108B, from instance 108B to producer 114A.1, and from method 104E to producer 114A.1 | From class 102B to instance 108C, from instance 108C to producer 112A.1, and from method 104E to producer 112A.1 |
| N | From class 102A to instance 108B, from instance 108B to producer 114A.1, and from method 104A to producer 114A.1 | From class 102A to instance 108C from instance 108C to producer 112A.1, and from method 104A to producer 112A.1 |
| O | From class 102A to instance 108B, from instance 108B to producer 114A.1, and from method 104A to producer 114A.1 | From class 102A to instance 108B, from instance 108B to producer 112A.1, and from method 104A to producer 112A.1 |
| P | From instance 108A to producer 114A.1 and from method 104B to producer 114A.1 | From class 102A to instance 108C, from instance 108C to producer 112A.1, and from method 104A to producer 112A.1 |
| Q | From class 102A to instance 108B, from instance 108B to producer 114A.1, and from method 104A to producer 114A.1 | From class 102A to instance 108B, from instance 108B to producer 112A.1, and from method 104B to producer 112A.1 |
| R | From class 102B to instance 108B, from instance 108B to producer 114A.1, and from method 104D to producer 114A.1 | From class 102B to instance 108B, from instance 108B to producer 112A.1, and from method 104E to producer 112A.1 |

Figure 1E:
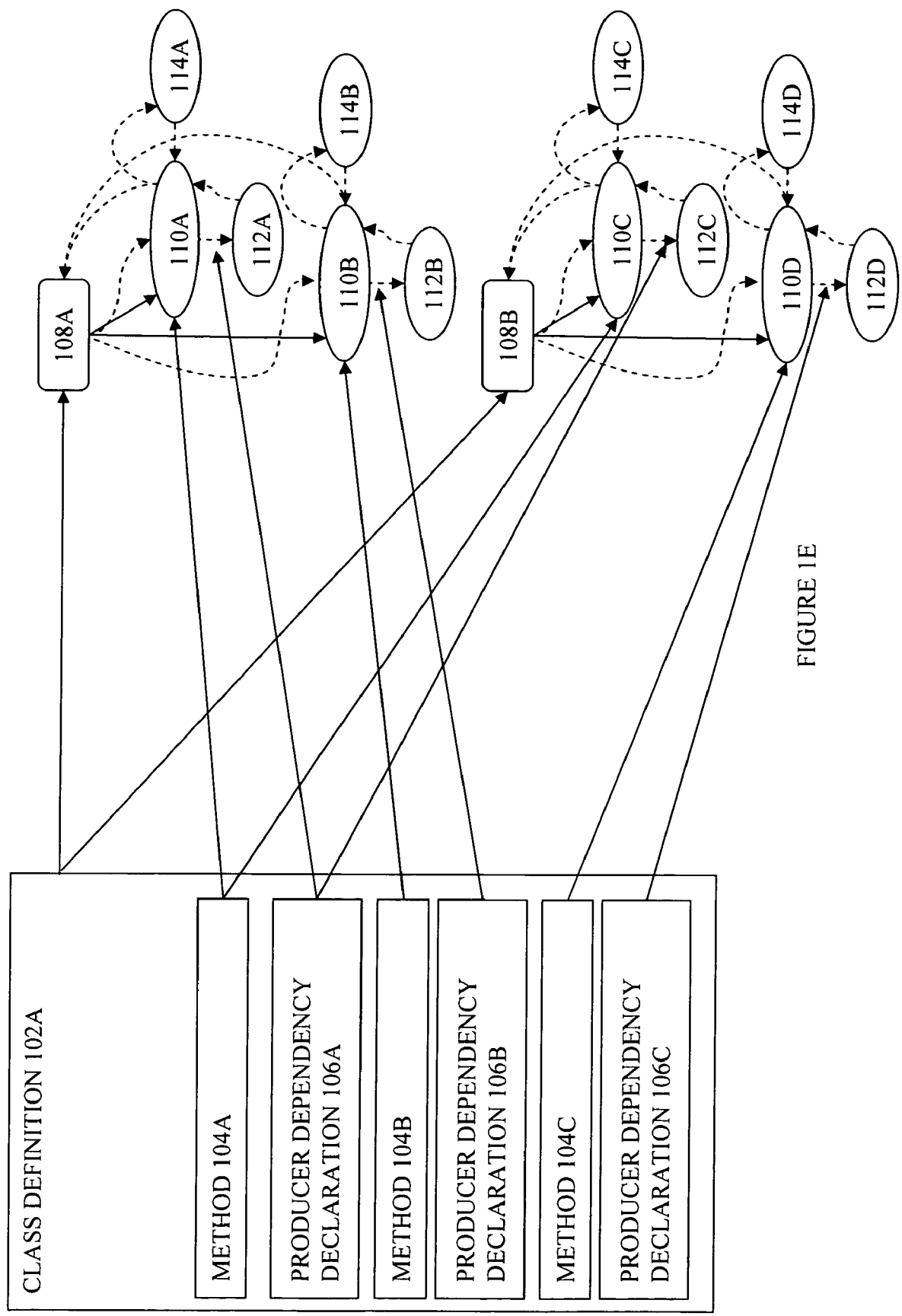
FIG. 1E illustrates that different instances of the same class can have producers based on the same and/or different methods according to one embodiment of the invention.

FIG. 1E illustrates that different instances of the same class can have producers based on the same and/or different methods according to one embodiment of the invention. FIG. 1E shows: 1) the class definition 102A including methods 104A-C and producer dependency declarations 106A-C for each of those methods, respectively; 2) the instance 108A and the instance 108B being of class 102A; 3) a producer 110A is the method 104A of the instance 108A of the class 102A; 4) a producer 110B is the method 104B of the instance 108A of the class 102A; 5) a producer 110C is the method 104A of the instance 108B of the class 102A; and 6) a producer 110D is the method 104C of the instance 108B of the class 102A. In addition, FIG. 1D shows that: 1) the producer dependency declaration 106A for method 104A identifies at runtime the child producers of both the producer 110A and the producer 110C; 2) the producer dependency declaration 106B for method 104B identifies at runtime the child producer of producer 110B; and 3) the producer dependency declaration 106C for method 104C identifies at runtime the child producer of producer 110D.

Exemplary Runtimes

Figure 2:
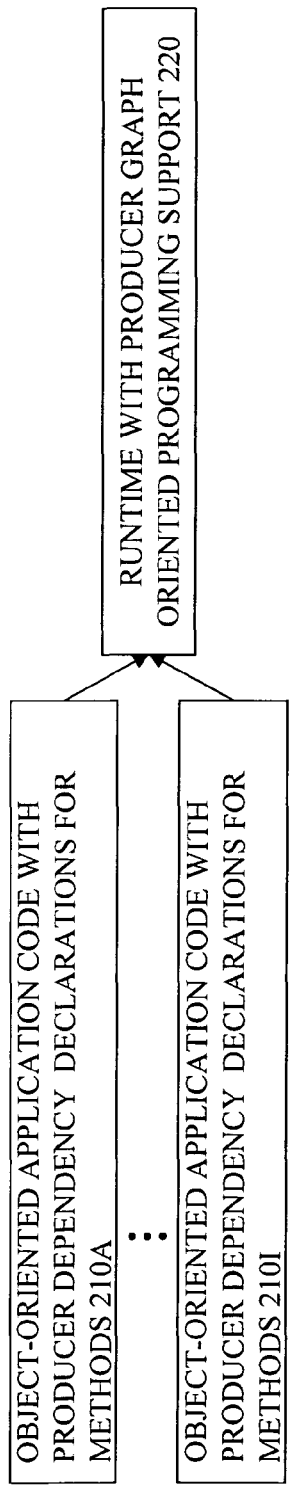
FIG. 2 is a block diagram illustrating the reusability of a runtime with producer graph oriented programming support according to one embodiment of the invention.

FIG. 2 is a block diagram illustrating the reusability of a runtime with producer graph oriented programming support according to one embodiment of the invention. In FIG. 2, multiple object-oriented application programs (object-oriented application code with producer dependency declarations 210A-I) are run by the same runtime with producer graph oriented programming support 220.

Figure 3A:
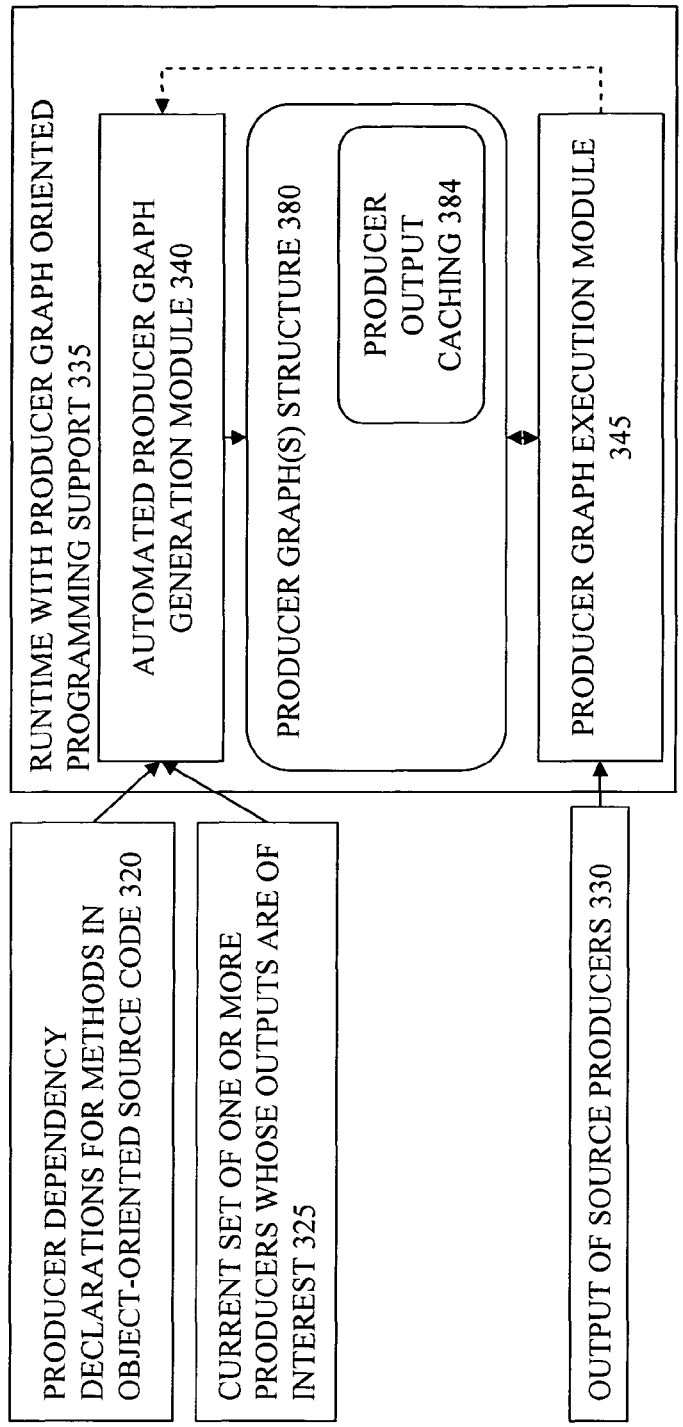
FIG. 3A is a block diagram illustrating a runtime with producer graph oriented programming support according to one embodiment of the invention.

FIG. 3A is a block diagram illustrating a runtime with producer graph oriented programming support according to one embodiment of the invention. In FIG. 3A, a runtime with producer graph oriented programming support 335 includes an automated producer graph generation module 340 and a producer graph execution module 345. In addition, the runtime 335 is to execute object-oriented source code, and thus includes additional modules not shown.

In addition, FIG. 3A shows producer dependency declarations for methods in object-oriented source code 320, a current set of one or more producers whose outputs are of interest 325 (also referred to here as the currently selected producers of interest), and the outputs of source producers 330 (described later herein). The automated producer graph generation module 340 receives the producer dependency declarations 320 and the current set of producers of interest 325.

The automated producer graph generation module 340 attempts to discover, based on the producer dependency declarations, child producers with outputs that contribute directly and indirectly to the input of the currently selected producers of interest (and in some embodiments of the invention that support upwardly declared dependencies, parent producers), and builds a set of one or more current graphs of producers representing the dependency of these producers on each other from the currently selected producers of interest, through any discovered producers that are non-source producers, to those of the discovered producers that are source producers. The current producer graphs(s) are stored in the producer graph(s) structure 380. While embodiments of the invention may store and manipulate the producer graph(s) as a collection of graphs, other embodiments of the invention stores and manipulates the producer graph(s) as a collection of producers that are linked to each other to form graph(s) (as opposed to a collection of graphs) to facilitate merging and splitting of producer graphs. By way of example and not limitation, embodiments of the invention which store and manipulate the producer graph(s) as a collection of producers are described herein.

The producer graph execution module 345 receives the current producer graph(s) from the automated producer graph generation module 340 and the outputs of source producers 330, and executes the producers of the current producer graph(s) to determine the current output of the currently selected producers of interest. The producer graph execution module 345 caches the current outputs of the producers in the producer graph(s) structure 380 as illustrated by the producer output caching 384.

The caching of producer outputs of the producer graph during execution allows for synchronization. For instance, the appropriate time to execute a parent producer that is dependent on multiple child producers is after all of the multiple child producers have been executed; in other words, it would be wasteful (and, in some cases, not possible) to execute the parent producer each time one of its child producers completed execution. The caching of the producer outputs allows for the execution of the parent producer to not only be postponed until all its child producers have been executed, it also allows for a determination of the appropriate time for the execution of the parent producer—when all of the child producers have been executed and their outputs have been cached. Thus, the runtime makes this synchronization decision for the programmer by checking the execution status of its child producers; in other words, such synchronization is automated (the programmer need not include separate source code that determines the appropriate time to identify an instance and execute a given method associated with that instance on that instance). By way of another example, where several parent producers are dependent on the same child producer as well as on other different child producers, the appropriate time to execute each of the several parent producers is typically different; the runtime automatically determines the appropriate time to execute each of the several parent producers depending on the availability of the outputs of its set of child producers.

As will be described in more detail later herein, since some parts of a producer graph may not be currently discoverable due to dynamic producer dependencies, the automated producer graph generation module 340 "attempts" to discover and build the entire producer graph, but may not initially be able to complete the entire producer graph until some producers are executed. As such, the producer graph execution module 345 may invoke the automated producer graph generation module 340 with needed producer outputs during execution of the current producer graph to complete any unresolved remainders of the current producer graph (this is illustrated in FIG. 3A by a dashed arrowed line from the producer graph execution module 345 to the automated producer graph generation module 340; a dashed arrowed line is used because such support is optional)

Figures 4A, 4B, 4C:
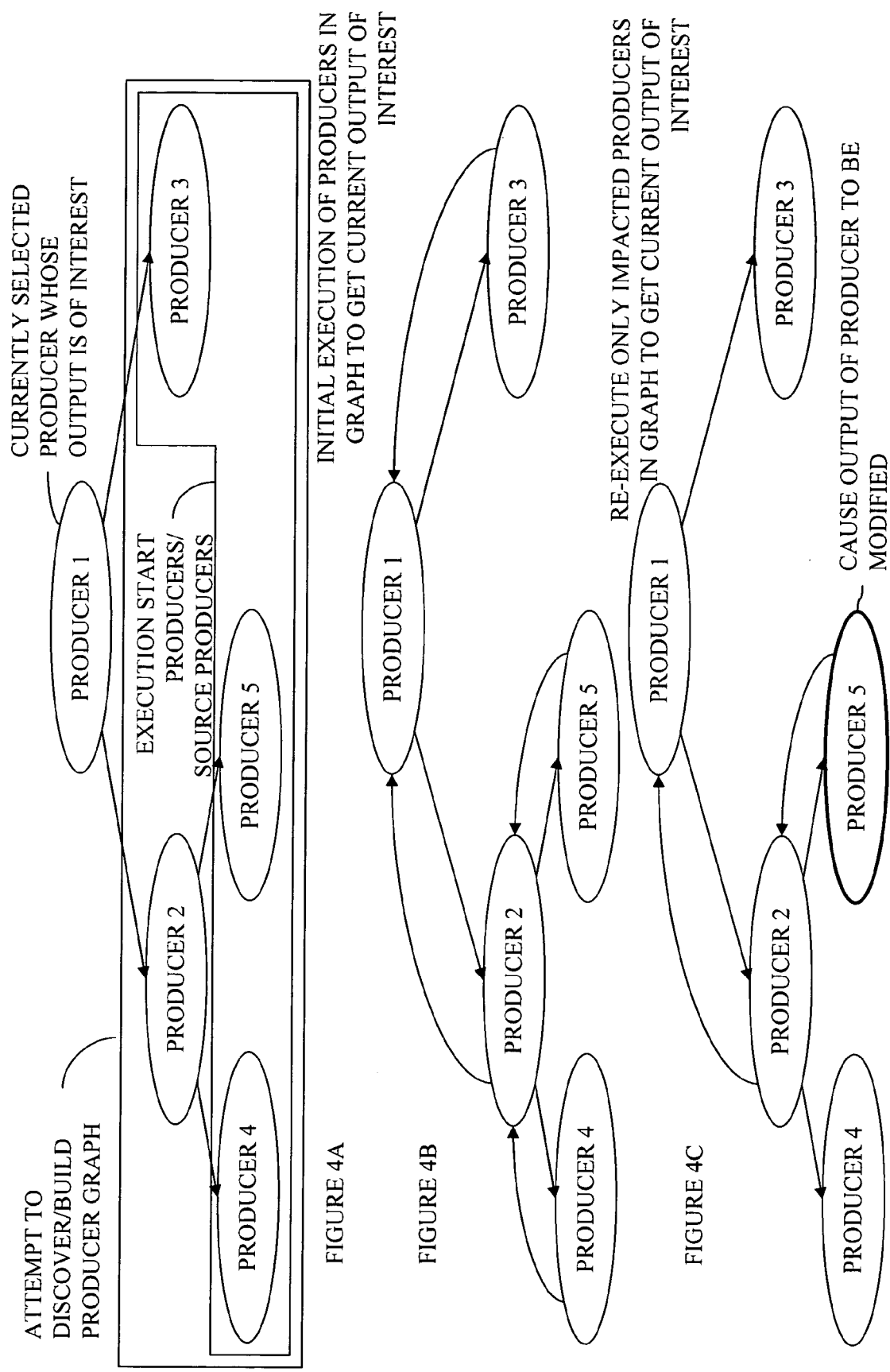
FIG. 4A is a block diagram illustrating the discovery and building of an exemplary producer graph according to one embodiment of the invention.
FIG. 4B is a block diagram illustrating the initial execution of the producer graph of FIG. 4A according to one embodiment of the invention.
FIG. 4C is a block diagram illustrating the incremental execution of the producer graph of FIG. 4B according to one embodiment of the invention.

FIG. 4A is a block diagram illustrating the discovery and building of an exemplary producer graph according to one embodiment of the invention. FIG. 4A shows that the current set of producers of interest consists of producer 1. Based upon producer 1 and its producer dependency declaration, producer 2 and producer 3 are discovered. In other words, the producer dependency declaration for producer 1 identifies that the input to producer 1 requires execution of producer 2 and producer 3. As such, producer 1 is a dependent producer (a producer that has one or more producer dependencies). FIG. 4A also shows that while producer 3 is an independent producer (a producer that has no producer dependencies, and thus is a source producer), producer 2 is not. As a result, based upon the producer dependency declaration of producer 2, producer 4 and producer 5 are discovered. In FIG. 2A, producer 4 and producer 5 are independent producers (and thus, source producers).

FIG. 4B is a block diagram illustrating the initial execution of the producer graph of FIG. 4A according to one embodiment of the invention. In FIG. 4B, curved arrowed lines illustrate the execution of one producer to generate an output that is provided as the input to another producer. As shown in FIG. 3A, the output of the source producers 330 are provided to the producer graph execution module 345; in contrast, the outputs of the dependent producers 1-2 are determined by execution of those producers as shown in FIG. 4B. Thus, in FIG. 4B, the following occurs: 1) the output of source producer 4 and source producer 5 are provided to dependent producer 2; 2) dependent producer 2 is executed; 3) the outputs of dependent producer 2 and source producer 3 are provided to producer 1; and 4) producer 1 is executed and its output is provided as the current output of interest. It is worth noting that the producer graph of FIG. 4B is data driven in the sense that data flows from one producer to another producer up the graph.

Thus, the producer dependency declarations 320 bound the possible producer graphs that may be generated; while the currently selected set of producers of interest 325 identify the beginning node(s) of the current producer graph to be generated. From these two, the automated producer graph generation module 340 discovers and builds the producer graph. The discovery and building is automated in that the automated producer graph generation module 340 is not provided the producer graph (e.g., it does not need to be manually identified by a programmer) or even a list of the producers that will be in the producer graph. Rather, the automated producer graph generation module 340 parses the producer dependency declaration(s) of the current selected set of producers of interest to discover their child producers (and in some embodiments of the invention that support upwardly declared dependencies, parent producers), then parses the producer dependency declarations of those discovered producers, and so on down to the source producers (in some embodiments of the invention described later herein, this may be done with the assistance of the producer graph execution module 345). In the case where the producer graph is a tree, a currently selected producer of interest will typically be the root node, and the producer dependency declarations will be parsed until the leaf nodes (source producers) are discovered.

Overridden Producers and Incremental Execution

Figure 3B:
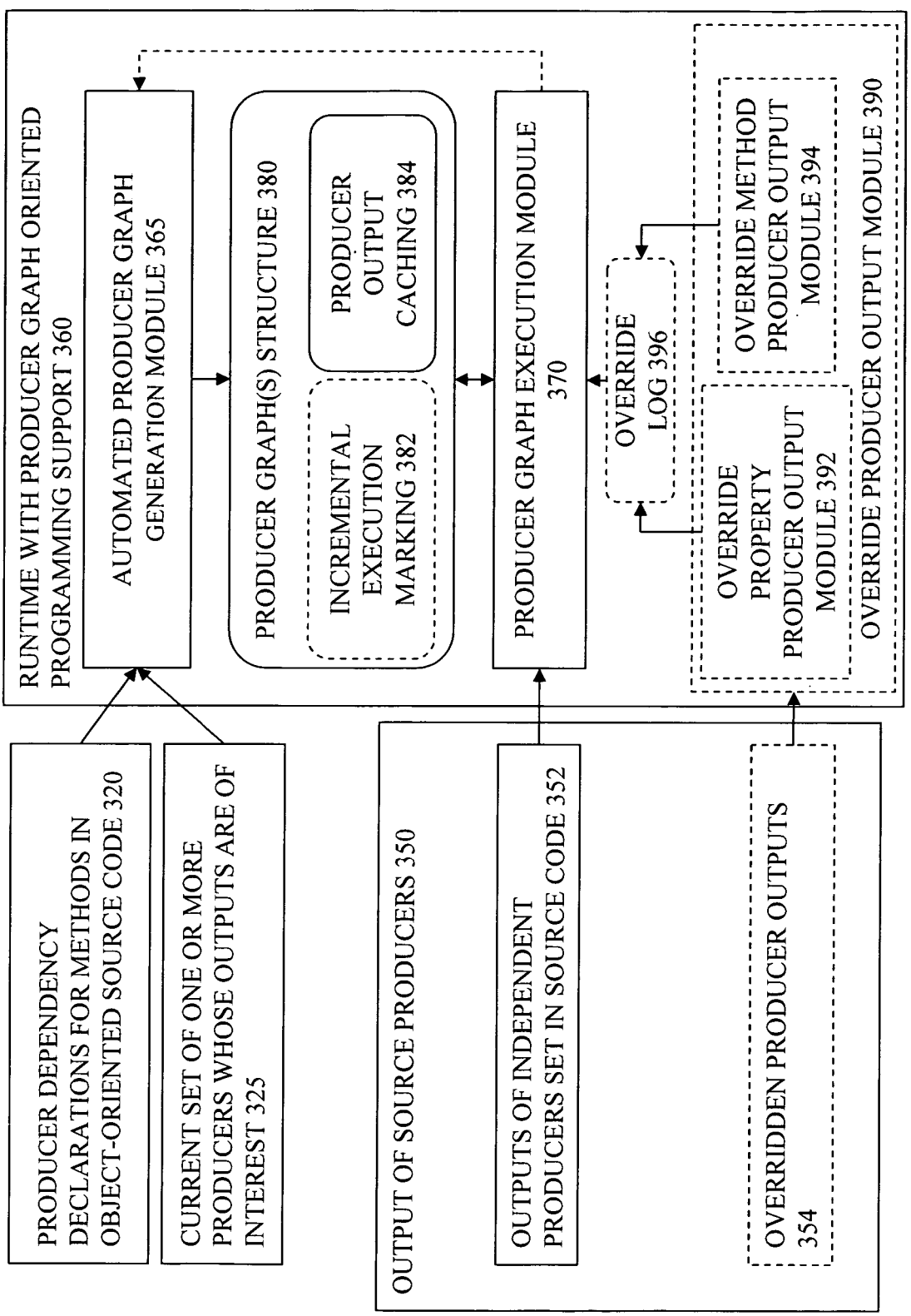
FIG. 3B is a block diagram illustrating a runtime with producer graph oriented programming support that also supports incremental execution and overridden producer outputs according to one embodiment of the invention.

FIG. 3B is a block diagram illustrating a runtime with producer graph oriented programming support that also supports incremental execution and overridden producer outputs according to one embodiment of the invention. It should be understood that incremental execution and overridden producer outputs are each independent optional features, and thus different embodiments of the invention may implement one or both.

In FIG. 3B, a runtime with producer graph oriented programming support 360 includes an automated producer graph generation module 365, a producer graph execution module 370, and an override producer output module 390. The runtime 360 is to execute object-oriented source code, and thus includes additional modules not shown.

In addition, FIG. 3B shows the producer dependency declarations for methods in object-oriented source code 320, the current set of one or more producers whose outputs are of interest 325 (also referred to herein as the currently selected producers of interest), and the output of source producers 350. The output of source producers 350 includes the outputs of independent producers set in the source code 352 (e.g., constants, default values, etc.) and the currently overridden producer outputs 354 (the outputs of the independent producers and/or dependent producers whose outputs are currently overridden).

In some embodiments of the invention, the outputs of producers may be explicitly overridden with a currently provided value (i.e., rather than executing a producer to determine its output value based on its current inputs, the output value for the producer is explicitly provided). In addition to any independent producers of a producer graph, the source producers of a producer graph include any currently overridden producers.

The override producer output module 390 receives the overridden producer outputs 354 (which identify which producers are being overridden and what output values they are being overridden with). In one embodiment of the invention, producers can be classified as property producers or method producers. Property producers are those based on property methods (e.g., get and set). Method producers are those based on non-property methods. The override producer output module 390 includes an override property producer output module 392 for overridden property producers and an override method producer output module 394 for overridden method producers. The override property producer output module 392 causes the overridden value to be stored in the producer output caching 384 and in the data of the instance, whereas the override method producer output module 394 causes the overridden value to be stored in the producer output caching 384. Depending on the embodiment of the invention, this causation may be direct or indirect. FIG. 3B illustrates an indirect causation through the use of an override log 396 which collects the output of the override producer output module 390 and which is consumed by the producer graph execution module 370. For optimization purposes, the override log 396 allows for the delaying of overrides in order to collect multiple overrides for batch processing.

Similar to the automated producer graph generation module 340, the automated producer graph generation module 365: 1) receives the producer dependency declarations 320 and the current set of producers of interest 325; and 2) attempts to discover, based on the producer dependency declarations, child producers with outputs that contribute directly and indirectly to the input of the currently selected producers of interest (and in some embodiments of the invention that support upwardly declared dependencies, parent producers), and builds a set of one or more current graphs of producers representing the input dependency of these producers on each other from the currently selected producers of interest, through any discovered non-source producers, to those of the discovered producers that are source producers (independent producers and currently overridden producers). The producer graphs(s) are stored in the producer graph(s) structure 380.

Similar to the producer graph execution module 345, the producer graph execution module 370 receives the current producer graph from the automated graph module 365 and the outputs of source producers 350, and executes the producers of the current producer graph to determine the current output of the currently selected producers of interest. The producer graph execution module 370 caches the current outputs of the producers in the producer graph structure 380 as illustrated by the producer output caching 384.

As previously described, the caching of producer outputs during execution allows for synchronization (e.g., separate source code need not be written to determine when producer 2 of FIG. 4B should be executed, but rather the runtime makes this synchronization decision for the programmer by checking the availability of the needed outputs in the producer output caching 384; in other words, such synchronization is automated). In addition, this producer output caching 384 is used for incremental execution. More specifically, after a producer graph has been initially generated and executed, the overriding of a producer in the current producer graph requires some level of reexecution. While some embodiments of the invention simply reexecute the entire graph, alternative embodiments of the invention support incremental execution (reexecuting only those parts of the producer graph that are affected by the override). Some exemplary embodiments that support incremental execution use incremental execution marking 382 in the producer graph(s) structure 380 to help determine which producers require reexecution. Thus, maintaining the producer graph(s) refers to modifying the links of the producer graph(s) as necessary across multiple executions to keep them current (up-to-date), whereas incremental execution refers to both maintaining the producer graph(s) and using the current (up-to-date) producer graph(s) to reexecute only those parts of the producer graph(s) that are affected by an override.

Similar to FIG. 3A, there is a dashed arrowed line from the producer graph execution module 370 to the automated producer graph execution module 365 to represent optional support for dynamic dependencies. It should be noted that dynamic dependencies may change during reexecution of a producer graph.

FIG. 4C is a block diagram illustrating the incremental execution of the producer graph of FIG. 4B according to one embodiment of the invention. In FIG. 4C, the output of producer 5 has been explicitly modified, but the outputs of producer 3 and producer 4 have not. Based upon the tracking of output to input dependencies in the producer graph and that only the output of producer 5 has been explicitly modified, it is determined that only producer 2 and producer 1 are affected by this modification. As a result, the determination of an updated output of producer 1 requires only the reexecution of producer 2 and producer 1 with the new output of producer 5 and the prior outputs of producer 4 and producer 3. This partial reexecution of the producer graph is illustrated in FIG. 4C by curved arrowed lines from producer 5 to producer 2 and from producer 2 to producer 1, but not from producer 4 to producer 2 or from producer 3 to producer 1. The lack of curved arrowed lines from producer 4 to producer 2 and from producer 3 to producer 1 are not to indicate that the outputs of producer 3 and producer 4 are not needed, but rather that producer 3 and producer 4 need not be reexecuted if their prior output is available. (e.g., cached from the prior execution of the producer graph).

The relatively simple example of FIG. 4C illustrates that there can be a savings in processing resources as a result of incremental execution. Such savings depend on a number of factors (e.g., the number of producers that do not need to be reexecuted, the amount of processing those producers would have required, etc.). While one embodiment of the invention is illustrated that performs incremental execution, alternative embodiments may be implemented differently (e.g., an alternative embodiment may reexecute all producers responsive to a modification).

Figure 4D:
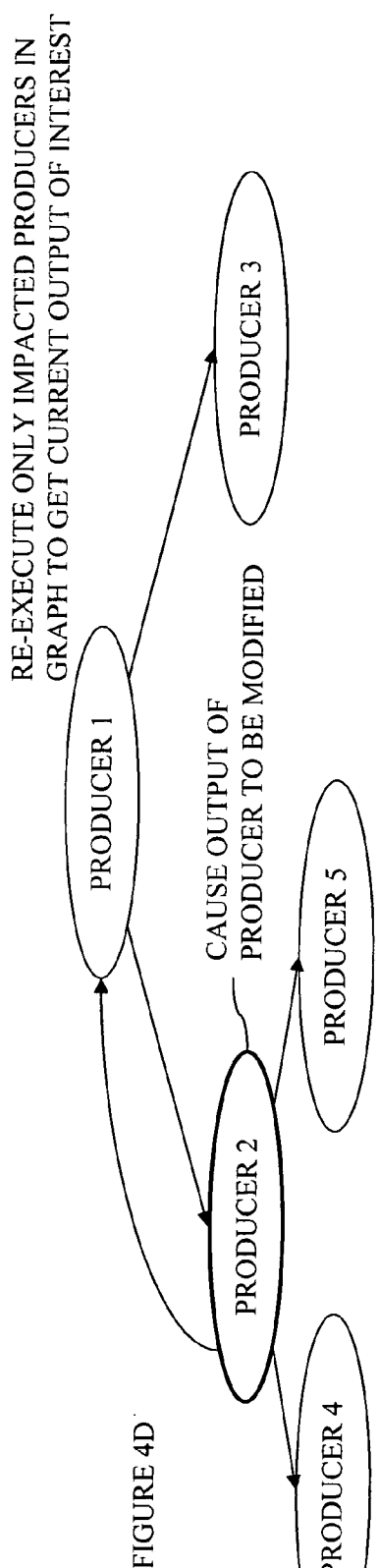
FIG. 4D is a block diagram illustrating the incremental execution of the producer graph of FIG. 4B after dependent producer 2 has been overridden according to one embodiment of the invention.

FIG. 4D is a block diagram illustrating the incremental execution of the producer graph of FIG. 4B after dependent producer 2 has been overridden according to one embodiment of the invention. In FIG. 4D, the output of producer 2 has been explicitly modified, but the output of producer 3 has not. Based upon the producer graph and that only the output of producer 2 has been explicitly modified, it is determined that only producer 1 is affected by this modification. As a result, the determination of an updated output of producer 1 requires only the reexecution of producer 1 with the overridden output of producer 2 and the prior output of producer 3. This partial reexecution of the producer graph is illustrated in FIG. 4D by a curved arrowed line from producer 2 to producer 1, but not from producer 4 and 5 to producer 2 or from producer 3 to producer 1.

Figure 4E:
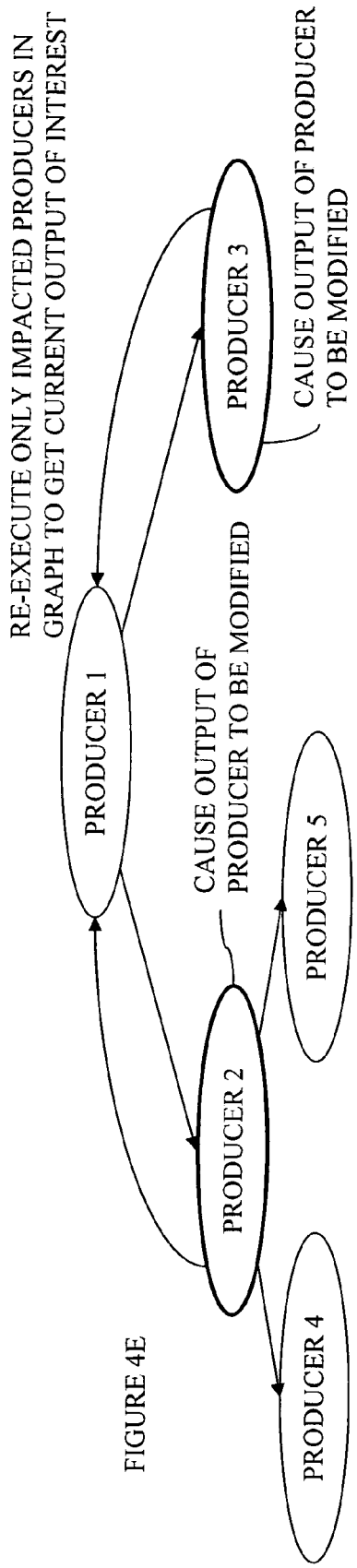
FIG. 4E is a block diagram illustrating the incremental execution of the producer graph of FIG. 4B after dependent producer 2 has been overridden and independent source producer 3 has been modified according to one embodiment of the invention.

FIG. 4E is a block diagram illustrating the incremental execution of the producer graph of FIG. 4B after dependent producer 2 has been overridden and independent source producer 3 has been modified according to one embodiment of the invention. Based upon the producer graph and that only the outputs of producer 2 and producer 3 have been modified, it is determined that only producer 1 is affected by this modification. As a result, the determination of an updated output of producer 1 requires only the reexecution of producer 1 with the overridden output of producer 2 and the modified output of producer 3. This partial reexecution of the producer graph is illustrated in FIG. 4E by a curved arrowed line from producers 2 and 3 to producer 1, but not from producers 4 and 5 to producer 2.

While one embodiment of the invention that supports overriding producer outputs also supports unoverriding producer outputs, alternative embodiments of the invention do not. While one embodiment of the invention that supports unoverriding producers leaves an overridden producer overridden until it is specifically unoverridden, alternative embodiments of the invention may be implemented differently (e.g., unoverriding an overridden producer when one of its progeny is overridden).

Producer Graph Building and Execution

Different embodiments of the invention may be implemented to discover and build out a producer graph to different extents (e.g., build the producer graph until all paths from the root node end at independent producers (in which case, the end nodes of a producer graph are independent producers, with the possibility of any overridden producers being intermediate nodes); build the producer graph out until each path from the root node ends in an overridden producer or an independent producer, whichever is reached first (in which case, each end node of a producer graph is either an independent producer or an overridden producer)).

"Execution start producers" refers to the producers of a producer graph from which a given execution of the producer graph begins. For an initial execution of a producer graph, different embodiments may start from different producers (e.g., in embodiments of the invention that build the producer graph until all paths from the root node end at independent producers, execution may start from the end nodes (which would be the independent producers), from the source producers (which would include the independent producer nodes and any overridden producer nodes), from a subset of the source producers consisting of the combination of any independent producers with at least one path between them and the root producer that does not include an overridden producer and any overridden producers, or from a subset of the source producers consisting of the combination of any overridden producers without any descendents that are overridden and any independent producers with at least one path between them and the root producer that does not include an overridden producer: in embodiments of the invention where the producer graph under overridden producers is not built if and until such a producer is un-overridden, execution may start from the end nodes (which may be independent producers and/or overridden producers), etc).

For subsequent executions of a producer graph, different embodiments may start from different producers (e.g., from the independent producers of the producer graph (e.g., in embodiments of the invention that do not support incremental execution); from the source producers of the producer graph (e.g., in embodiments of the invention that do not support incremental execution); from a subset of the source producers that consists of those source producers that have been overridden and/or added since the last execution (e.g., in embodiments of the invention that do support incremental execution); of the source producers that have been overridden and/or added since the last execution, from the combination of any such overridden producers without any descendents that are overridden and any such added producers with at least one path between them and the root producer that does not include an overridden producer (e.g., in embodiments of the invention that do support incremental execution); etc). By way of example and not limitation, embodiments of the invention that perform the following will be described below: 1) do not build the producer graph under overridden producers if and until such a producer is un-overridden; 2) for an initial execution of a producer graph, start execution from the end nodes (which may be independent producers and/or overridden producers); 3) implements incremental execution; and 4) for subsequent executions of a producer graph, start execution from a subset of the source producers that consists of those source producers that have been overridden and/or added since the last execution.

With regard to the above concept of execution start producers, the processing flow of execution of the producer graph also differs between different embodiments. For example, in one embodiment of the invention, the ancestry of the execution start producers are determined and placed in a collection, the execution start producers are executed, and the collection is iteratively scanned for producers for whom all dependencies have been executed—eventually the root nodes are reached. As another example, in one embodiment of the invention, the execution start producers are executed, the parents of the execution start producers are identified, those parents are executed, and their parents are identified and executed, and so on. The later embodiment of the invention is used below by way of example, and not limitation.

Exemplary Types of Dependencies
Exemplary Dynamic Producer Dependencies

A dynamic producer dependency is a producer dependency that can change during runtime. It should be understood that the criteria for resolving the producer dependency is present in the source code, and thus the producers to which the producer dependency may be resolved are limited. With reference to FIG. 3A, the dashed arrowed line from the producer graph execution module 345 to the automated producer graph generation module 340 represents support for the execution of one or more producers in the current producer graph that are necessary to discover and build the entire current producer graph. In other words, an embodiment of the invention that supports dynamic producer dependencies may iterate between the automated producer graph generation module 340 and the producer graph execution module 345 until the entire producer graph is discovered, built, resolved, and executed (that is, iterate between: 1) invoking the automated producer graph generation module to discover and build those parts of the current producer graph that can be resolved at that time; and 2) invoking the producer graph execution module to execute producers of the current producer graph). In this sense, discovering refers to the accessing of the producer dependency declarations and determining the producers they identify; building refers to instantiating the producers and adding them to the producer graph; and resolving refers to determining currently unresolved dynamic producer dependencies.

Figure 5A:
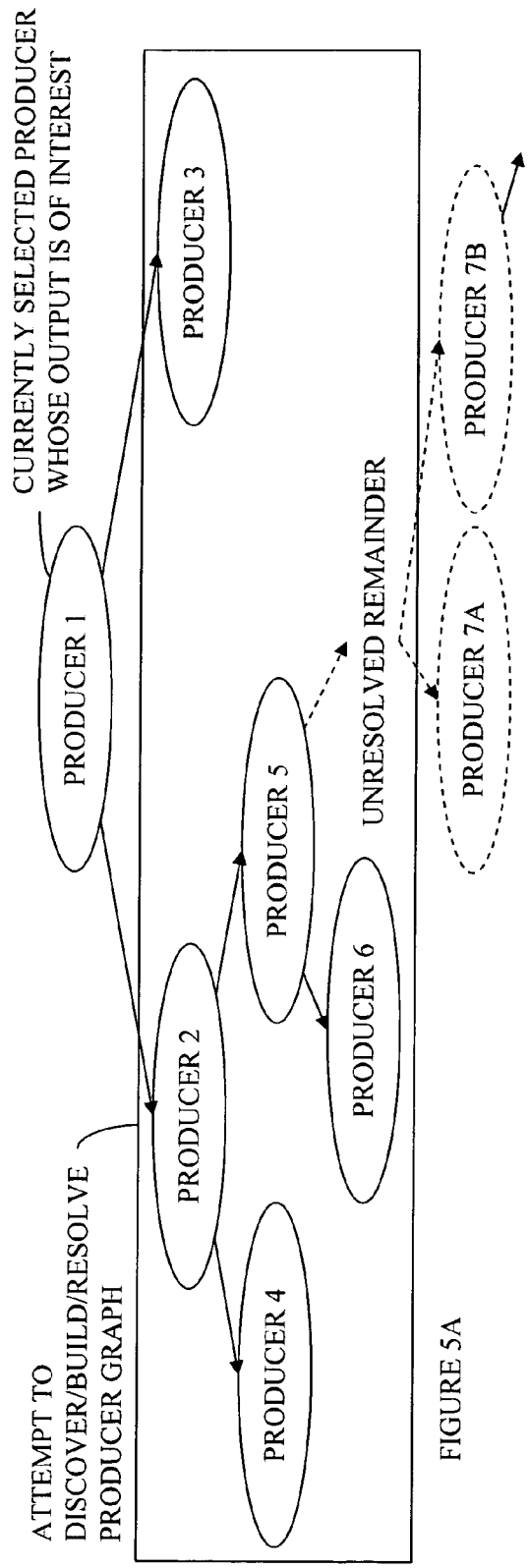
FIG. 5A is a block diagram illustrating the discovery and building of an exemplary producer graph including an unresolved dependency according to one embodiment of the invention.

FIG. 5A is a block diagram illustrating the discovery and building of an exemplary producer graph including an unresolved dependency according to one embodiment of the invention. FIG. 5A shows the current set of producers of interest consisting of producer 1. Based upon producer 1 and its producer dependency declaration, producer 2 and producer 3 are discovered. In other words, the dependency declaration for producer 1 identifies that producer 1 requires as inputs the output of producer 2 and producer 3. FIG. 5A also shows that while producer 3 is an independent producer (and thus, a source producer), producer 2 is not. As a result, based upon the dependency declaration of producer 2, producer 4 and producer 5 are discovered. Further, FIG. 5A shows that while producer 4 is an independent producer (and thus, a source producer), producer 5 is not. As a result, based upon the dependency declaration of producer 5, producer 6 and a currently unresolved dependency are discovered. FIG. 5A also shows that the currently unresolved dependency may be to producer 7A and/or producer 7B.

Figure 5B:
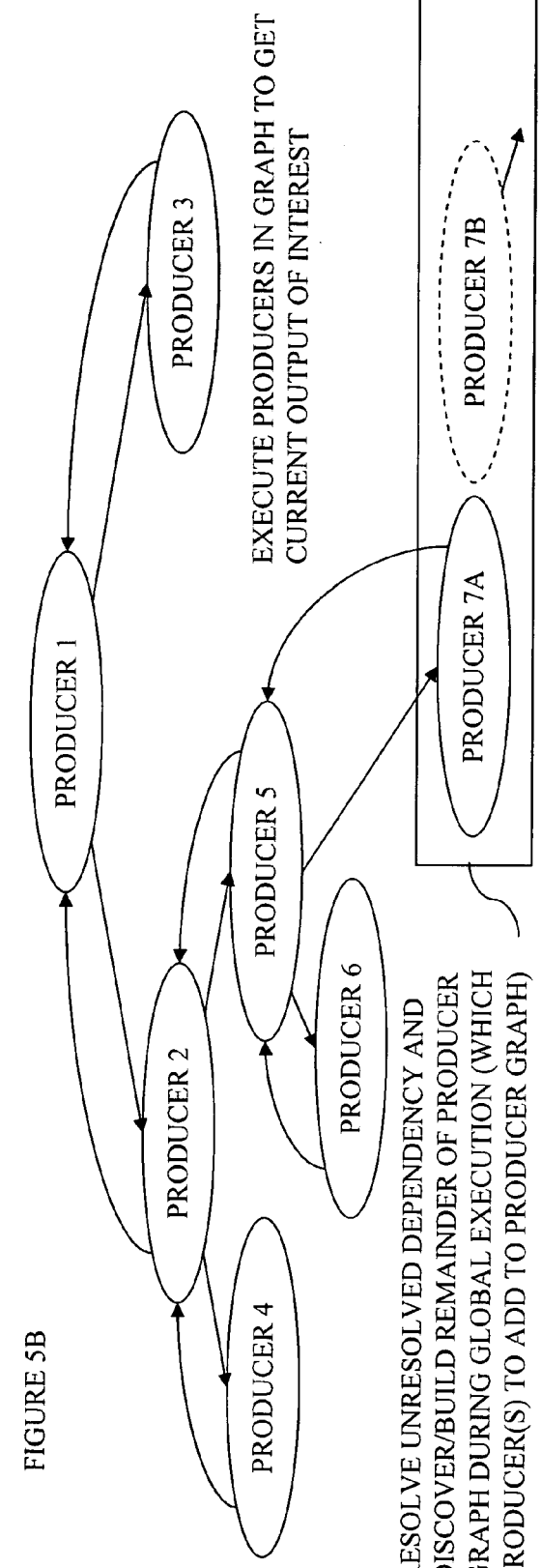
FIG. 5B is a block diagram illustrating the initial execution of the producer graph of FIG. 5A and the resolution of the unresolved dependency according to one embodiment of the invention.

FIG. 5B is a block diagram illustrating the initial execution of the producer graph of FIG. 5A and the resolution of the unresolved dependency according to one embodiment of the invention. FIG. 5B illustrates the producer graph of FIG. 5A with curved arrowed lines showing execution of the producers and provision of their outputs to dependent parent producers. In addition, FIG. 5B shows that the unresolved dependency of producer 5 is resolved as a dependency on producer 7A, and that producer 7A is an independent producer.

FIG. 5C is a block diagram illustrating the initial execution of the producer graph of FIG. 5A and/or the reexecution of the producer graph of FIG. 5B according to one embodiment of the invention. FIG. 5C illustrates the producer graph of FIG. 5A with curved arrowed lines showing execution of the producers and provision of their outputs to dependent parent producers. In addition, FIG. 5C shows that the unresolved dependency of producer 5 is resolved as a dependency on producer 7B and that producer 7B is a dependent producer. As a result, based upon the dependency declaration of producer 7B, producer 8 is discovered. Producer 8 is an independent producer (and thus, is a source producer). Assuming that FIG. 5C represents the initial execution of the producer graph of FIG. 5A, all of the curved arrowed lines in FIG. 5C would be employed. However, assuming that FIG. 5C represents the reexecution of the producer graph of FIG. 5B, the reexecution results in the dynamic dependency being resolved differently (a switch from producer 5 being dependent on producer 7A to producer 7B). Further, if the reexecution is performed without incremental execution, then all of the curved arrowed lines in FIG. 5C would be employed; however, if incremental execution was used, only the non-dashed curved arrowed lines would be employed (producer 8 to producer 7B, producer 7B to producer 5, producer 5 to producer 2, and producer 2 to producer 1). It should also be understood that the dynamic change in dependency illustrated in FIG. 5C is exemplary, and thus any number of different situations could arise (e.g., the dynamic change may never occur; producer 5 could have first been dependent on producer 7B and then changed to producer 7A; producer 5 could have first been dependent on producer 7B and no dynamic change ever occurs; producer 5 could be found to be dependent on both producer 7A and producer 7B as illustrated in FIG. 5D; etc.) While different embodiments may resolve dynamic producer dependencies in different ways, some examples are provided later herein.

Thus, automated reexecution of a producer graph is not limited to the producer being modified and its direct parent being reexecuted; rather a change is automatically rippled through the producer graph by the runtime, affecting any appropriate producers and dependencies, because the producer graphs are maintained (and incremental execution is used where supported). As such, changes cause any necessary additional discovery, building, resolving, and executing. Thus, the reexecution of a producer graph is automated in the sense that a user/programmer need not determine which producers of the producer graph are affected and possibly manually correct the graph.

Static Producer Dependencies

A static dependency is one that cannot change during runtime. Thus, in an embodiment of the invention that supports contingent and subscription dynamic dependencies (described later herein), a non-contingent, non-subscription dependency is a static dependency. The exemplary producer graph of FIG. 4A illustrates a producer graph of static dependencies.

Producer Graph Shapes

Since a producer is at least an instance and a method associated with that instance, a producer graph is a graph representing instances and methods associated with those instances—and thus producer graphs are at least instance and method centric. In embodiments of the invention in which a producer is at least a class, instance, and method, producer graphs are at least class, instance and method centric.

It should be understood that a producer graph may take a variety of different shapes (e.g., a single chain of producers, a tree, etc.). The exemplary producer graph of FIG. 5B is a tree with a root node of producer 1, from which there are two branches—one to each of producer 2 and producer 3. Where producer 3 is a leaf node, producer 2 has two branches extending from it—one to each of producer 4 and producer 5. Producer 5 has two branches extending from it—one to each of producer 6 and producer 7A. The exemplary producer graph of FIG. 5B is said to be multilevel, with level 1 including the rood node producer 1, with level 2 including producer 2 and producer 3, with level 3 including producer 4 and producer 5, with level 4 including producer 6 and producer 7A (in FIG. 5C, level 4 includes producer 7B, and level 5 includes producer 8). When considering the branch from producer 1 with producer 2, the first producer of the branch is producer 2 and the last producers of the branch are producer 4, producer 6, and producer 7A in FIG. 5B.

While FIG. 5B illustrates a producer graph in which the current set of producers of interest includes a single producer, embodiments of the invention that support more than one current producer of interest would discover and build producer graphs for each. It should be understood that where there are simultaneously multiple producers of interest, the resulting producer graphs may be independent or may intersect. Where producer graphs intersect, embodiments of the invention may be implemented to: 1) duplicate producers to maintain separate producer graphs; or 2) avoid such duplication and maintain intersecting producer graphs. It should also be understood that such intersecting producer graphs may include a producer graph that is a subset of another producer graph. For instance, if producer 5 was included with producer 1 in the current set of producers of interest, then there would be a first producer graph with a root node of producer 5 and a second producer graph with a root node of producer 1, where the second producer graph includes the first producer graph. If, for instance, producer 7B was included with producer 1 and producer 5 in the current set of producers of interest, there would be a third producer graph, separate from the first and second producer graph, with a root node of producer 7B in FIG. 5B. Further, if the dynamic dependency of producer 5 changed from producer 7A to producer 7B (FIG. 5C), then the change would result in the third producer graph becoming a subset of the second producer graph remaining, and the second producer graph becoming a subset of the first producer graph. As previously stated, while embodiments of the invention may store and manipulate the producer graph(s) as a collection of graphs, other embodiments of the invention stores and manipulates the producer graph(s) as a collection of producers that are linked to each other to form graph(s) (as opposed to a collection of graphs) to facilitate merging and splitting of producer graphs. By way of example and not limitation, embodiments of the invention which store and manipulate the producer graph(s) as a collection of producers are described herein.

Exemplary Execution Flow

Figure 6:
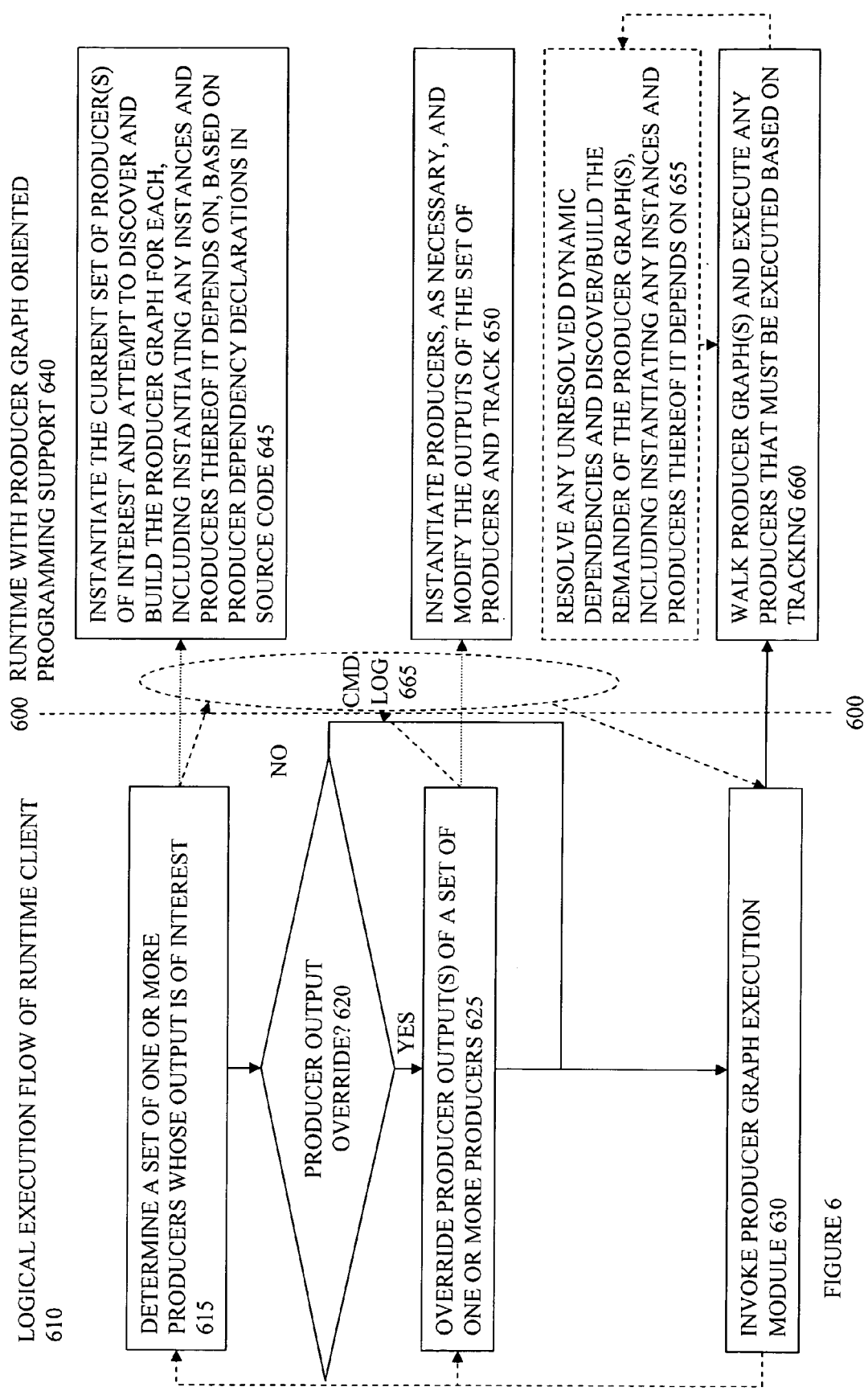
FIG. 6 is a flow diagram illustrating a logical execution flow of a runtime client and its relationship to a runtime with producer graph oriented programming support according to one embodiment of the invention.

FIG. 6 is a flow diagram of a logical execution flow of a runtime client, including client code commands, and its relationship to a runtime with producer graph oriented programming support according to one embodiment of the invention. In FIG. 6, dashed dividing line 600 separates the logical execution flow of a runtime client 610 from the runtime with producer graph oriented programming support 640.

The logical execution flow of the runtime client 610 includes blocks 615, 620, 625, and 630, while the runtime with producer graph oriented support 640 includes blocks 645, 650, 660, and optionally 655. A solid arrowed line represents a direct causal relationship from block 630 to block 660. In contrast, dotted arrowed lines illustrate a causal relationship from blocks 615 and 625 in the logical execution flow of the runtime client 610 to blocks 645 and 650 in the runtime with producer graph oriented support 640, respectively; depending on the embodiment of the invention, this causal relationship may be direct or indirect. For example, FIG. 6 illustrates an optional indirect causation through the use of a command log 665 in a dashed oval on the runtime with producer graph oriented support 640 side of the dashed line 600. The command log 665 collects commands resulting from blocks 615 and 625 of the logical execution flow of the runtime client 610; and the command log 655 is consumed, responsive to block 630, by processing block 660. Thus, the command log 665 allows for the delaying of commands in order to collect multiple ones together and batch process them for optimization purposes. Thus, the command log 665 is similar to the override log 396 of FIG. 3B, and would actually include the override log 396 in some embodiments of the invention.

In block 615, the set of one or more producers of interest are determined as the current set of producers of interest and control passes to block 620. Responsive to the causal relationship between block 615 and block 645, block 645 shows that the current set of producers of interest are instantiated and that an attempt is made to discover, build, and resolve (if dynamic dependencies are supported and one or more are discovered in the producer graph) the producer graph(s) for each, including instantiating any instances and producers thereof as necessary, based on the producer dependency declarations in the runtime client 610. With reference to FIGS. 3A and 3B, the automated producer graph generation module 340 and 365 are invoked, respectively.

In block 620, it is determined if there are any producer output overrides. If so, control passes to block 625; otherwise, control passes to block 630.

In block 625, one or more producer output overrides are received for a set of one or more producers and control passes to block 630. Responsive to the causal relationship between block 625 and block 650, block 650 shows that the current set of overridden producers are instantiated (if not already instantiated in block 645), their outputs are modified, and they are tracked. An overridden producer may have already been instantiated because it was already discovered to be part of the producer graph(s) in block 645. However, an overridden producer may not already be discovered in block 645 because of an unresolved dynamic dependency. As such, this overridden producer is instantiated and overridden with the expectation that it may be added to the producer graph(s) when dynamic dependencies are resolved. Also, as previously indicated, the override log 396 of FIG. 3B, if implemented, exists between block 625 and block 650 and is part of the command log 665. Further, the set of overridden producers is tracked in some embodiments of the invention that support incremental execution. While in embodiments of the invention that support the override log 396/command log 665 the tracking is part of the log, in alternative embodiments of the invention the tracking is separately performed in block 650 with a different mechanism.

In block 630, the producer graph execution module is invoked and control optionally returns to block 615 and/or block 625. Responsive to the causal relationship between block 630 and block 660, block 660 shows that the current producer graph(s) are walked and any producers that require execution are executed based on the tracking. Various techniques have been previously discussed for executing the producers of the producer graph and are applicable here. With reference to FIGS. 3A and 3B, the producer graph execution module 345 and 370 are invoked, respectively. In addition, in embodiments of the invention in which the command log 665 is implemented, the causal relationship includes consuming the command log 665 and performing the processing blocks 645 and 650 prior to block 660. Further, in embodiments of the invention that support the possibility of unresolved dependencies, control flows from block 660 to block 655 when necessary.

In block 655, an attempt is made to resolve the unresolved dependencies and discover and build the remainder of the producer graph(s), including instantiating any instances and producers thereof. From block 655, control flows back to block 660.

Exemplary Forms of Producer Dependency Declarations

FIGS. 7A-F illustrates some exemplary forms for producer dependency declarations according to embodiments of the invention. While FIGS. 7A-F illustrate embodiments that support argument, field, and sequencing dependencies, it should be understood that different embodiments may support only one or two of the three dependency forms. In the embodiments of the invention shown in FIGS. 7A-F, a producer dependency declaration is made up of a producer dependency declaration statement, and optionally explicit producer dependency declaration code. A non-shortcut declared producer dependency is one in which explicit producer dependency declaration code is used, whereas a shortcut declared producer dependency is one in which no explicit producer dependency declaration code is used (rather, the runtime does not use producer dependency declaration code and/or implements it on the fly based on information in the producer dependency declaration statement).

Different embodiments of the invention may use different syntaxes for declaring producer dependencies. For example, different embodiments of the invention may include different syntaxes for use in producer dependency declaration statements that strongly constrain, weakly constrain, and/or do not constrain the type of producer dependency that may be created. A strongly constrained producer dependency is one for which a syntax is used in the producer dependency declaration statement that substantially limits the type of producer dependency that may be created; A weakly constrained producer dependency is one for which a syntax is used in the producer dependency declaration statement that is less limiting of the type of producer dependency that may be created; and an unconstrained producer dependency is one for which a syntax is used in the producer dependency declaration statement that does not limit the type of producer dependency that may be created.

By way of example, and not limitation, embodiments of the invention described below that include the following: 1) a syntax for a strongly constrained producer dependency for arguments (ArgumentDependency=strongly constrained downwardly declared argument [static or dynamic, and if dynamic, contingent and/or absorbing subscription] dependency); 2) a syntax for a strongly constrained producer dependency for fields (FieldDependency=Strongly constrained downwardly declared field [static or dynamic, and if dynamic, contingent and/or absorbing subscription] dependency); 3) a syntax for a strongly constrained producer dependency for sequencing dependencies (SequencingDependency=Strongly constrained downwardly declared sequencing [static or dynamic, and if dynamic, contingent and/or sticky subscription] dependency); 4) a syntax for a weakly constrained upwardly declared producer dependency for argument, field, or sequencing dependencies (UpwardDependency=Weakly constrained upwardly declared field, argument, or sequencing [static or dynamic, and if dynamic, contingent] dependency); and 5) a syntax for a weakly constrained producer dependency (WeaklyConstrainedDependency=either a) downwardly declared sequencing only [static or dynamic, and if dynamic, contingent and/or sticky subscription] dependency; or b) upwardly declared [argument, field, or sequencing] [static or dynamic, and if dynamic, contingent] dependency). It should be understood that while some embodiments of the invention support a syntax for the producer dependency declaration statement that distinguishes downwardly declared argument dependencies, downwardly declared field dependencies, upwardly declared dependencies (that can return upwardly declared argument, field, or sequencing dependencies), and weakly constrained dependencies (that can return downwardly declared sequencing dependencies, upwardly declared argument, field, or sequencing dependencies), alternative embodiments of the invention may adopt a different syntax (e.g., have a syntax that has all dependencies be unconstrained dependencies with dependency determination producers that can return any supported dependencies (downwardly and upwardly declared argument, field, and sequencing dependencies); have a syntax distinguish all supported dependencies; have a syntax that distinguishes downwardly and upwardly declared argument and field dependencies and that distinguishes a weakly constrained dependency that can only return upwardly and downwardly declared sequencing dependencies; a syntax that distinguishes downwardly declared argument and field dependencies and that distinguishes upwardly declared dependencies that can return only upwardly declared sequencing dependencies; a syntax that distinguishes downwardly declared argument, field, and sequencing dependencies (sticky subscriptions and upwardly declared dependencies are not supported); etc.)

It should be understood that the syntax of the producer dependency declaration statement does not necessarily equate to the producer dependency (e.g., the link) created in the producer graph (e.g., ArgumentDependency creates an argument dependency; but an UpwardDependency may create an argument, field, or sequencing dependency). As such, where appropriate for understanding, a space between a qualifier (e.g., argument, field, or sequencing) and the word "dependency" is used to refer to the dependency created by the runtime, while lack of a space is used to refer to the syntax.

FIG. 7A illustrates pseudo code of a producer dependency declaration for a method using shortcut declared dependencies according to one embodiment of the invention; while FIG. 7B is a block diagram of exemplary producers according to one embodiment of the invention. FIG. 7A shows: 1) a producer dependency declaration statement 705 including ArgumentDependencies 1-N, FieldDependencies 1-M, SequencingDependencies 1-L, UpwardDependencies 1-P, and WeaklyConstrainedDependencies 1-Q; and 2) a method alpha 710 having arguments 1-N from the producer dependency declaration statement 705. In one embodiment of the invention, the arguments of a producer dependency declaration statement are numbered to provide an argument ID for each for tracking purposes FIG. 7B shows a producer 720 having child dependencies to the following: 1) producer 725 for argument ID 1; 2) producer 730 for argument ID N; 3) producers 740-745 for FieldDependencies 1-M; 4) producers 746-747 for SequencingDependencies 1-L; and 5) producer 748-749 for UpwardDependencies 1-P (note, WeaklyConstrainedDependencies 1 . . . Q are not shown, but will be described in greater detail with reference to FIG. 7G). Thus, the arguments of the producer dependency declaration statement 705 correspond to the arguments of the method alpha 710, and the argument IDs of the arguments in the producer dependency declaration statement 705 are tracked with regard to the child producers they identify.

FIG. 7C illustrates pseudo code of a producer dependency declaration for a method using a non-shortcut declared dependency, and illustrates a block diagram of exemplary producers according to one embodiment of the invention. FIG. 7C shows the producer dependency declaration statement 705 and the method alpha 710 of FIG. 7A, as well as the producers 720 and 725 from FIG. 7B. In addition, FIG. 7C includes producer dependency declaration code 715 associated with ArgumentDependency 1. During run time, the runtime accesses and executes the producer dependency declaration code 715 responsive to ArgumentDependency 1 of the producer dependency declaration statement 705. Execution of the producer dependency declaration code 715 returns the producer 725 as the producer dependency for ArgumentDependency 1. Thus, FIG. 7C illustrates embodiments of the invention in which producer dependency declaration code 715 may be part of a method (other than method alpha 710), but is not part of a producer.

FIG. 7D illustrates pseudo code of a producer dependency declaration for a method using a non-shortcut declared dependency according to one embodiment of the invention; while FIG. 7E is a block diagram of exemplary producers according to one embodiment of the invention. FIG. 7D shows the producer dependency declaration statement 705 and the method alpha 710 of FIG. 7A, while FIG. 7E shows the producers 720 and 725 from FIG. 7B. In addition, FIG. 7D includes: 1) a producer dependency declaration statement 750; and 2) a method beta 755 including producer dependency declaration code 760. FIG. 7D also shows that argument dependency 1 of the producer dependency declaration statement 705 identifies a producer (shown in FIG. 7E as producer 765) based on the method beta 755 that will return the dependency for argument dependency 1. During run time, the runtime, responsive to argument dependency 1 of the producer dependency declaration statement 705, executes the producer 765 to return identification that the producer dependency for argument dependency 1 is producer 725. As such, producer 765 is referred to as a dependency determination producer (its output is producer dependency—and thus, is returned using a class/instance that is monitored for special treatment (manipulation of the producer graph(s)) by the runtime with producer graph oriented programming support), whereas producer 725 is referred to as a standard producer (its output, if any, is not directly processed by the runtime to manipulate a producer graph; but its output, if any, may be consumed by a parent producer (be it a dependency determination producer or another standard producer) and/or provided as the output of the producer graph (if the standard producer is a producer of interest, and thus a root node).

Thus, FIGS. 7D-E illustrate embodiments of the invention in which producer dependency declaration code 715 is part of another producer—referred to as a dependency determination producer. While in FIGS. 7D-E the object-oriented source code includes explicit producer dependency declaration code in methods from which dependency determination producers are instantiated at run time by the runtime for non-shortcut declared dependencies, alternative embodiments of the invention additionally or instead implement the runtime to include generic producer dependency declaration code that it invokes as one or more generic dependency determination producers on the fly for shortcut declared dependencies. Also, while FIGS. 7C-E are illustrated with reference to ArgumentDependencies, the techniques illustrated are applicable to the other types of downwardly declared dependencies. Further, FIGS. 7F-G illustrate the use of a dependency determination producer for an UpwardDependency and a WeaklyConstrainedDependency.

FIG. 7F is a block diagram of an exemplary dependency through use of an UpwardDependency with a dependency determination producer according to one embodiment of the invention. FIG. 7F shows the producer 720 having sequencing producer dependency to a dependency determination producer 772. The dependency determination producer may return a non-subscription upwardly declared argument, field, or sequencing dependency of the parent producer 748 on the producer 720. Further, such a dependency determination producer may implement a dynamic dependency (e.g., a contingent dependency that selects between the above depending on data values, including between different argument IDs, as described later herein). While some embodiments of the invention support all of these possibilities, alternative embodiments of the invention support only a subset (e.g., only non-subscription upwardly declared sequencing dependencies).

FIG. 7G is a block diagram of possible exemplary dependencies through use of a WeaklyConstrainedDependency with a dependency determination producer according to one embodiment of the invention. FIG. 7G shows the producer 720 having sequencing producer dependency to a dependency determination producer 775. In some embodiments of the invention, the dependency determination producer may return any of the following: 1) a non-subscription downwardly declared sequencing dependency on a child producer 780; 2) a non-subscription upwardly declared argument, field, or sequencing dependency of a parent producer 785 on the producer 720; and 3) a sticky subscription (described later herein). Further, such a dependency determination producer may implement a dynamic dependency (e.g., a contingent dependency that selects between the above depending on data values, including between different argument IDs, as described later herein). While some embodiments of the invention support all of these possibilities, alternative embodiments of the invention support only a subset (e.g., only non-subscription upwardly declared sequencing dependencies).

As previously indicated, sequencing dependencies may be used for a variety of purposes, including ensuring the order of execution between producers that modify data in a manner of which the runtime is not aware and producers that consume that data (a child producer may write its outputs in a way that requires the method of the parent producer to include code to access that output (e.g., a method that impacts the environment by affecting an output that is not the regular producer output and, as such, that is not detected by the runtime—such as a method that sets a global variable, that sets a field in an instance which is not the producer output, that impacts an external data source, etc.)), etc.

Different embodiments may support one or more ways for declaring producer dependencies with respect to property producers. Specifically, in some embodiments of the invention, producers that read a field should be dependent on the get property producer, while the get property producer should be dependent on any producers that set the field for which that get property method is responsible. One technique of handling this situation that may be used in embodiments of the invention that support sequencing producer dependencies is to provide, for a get property method, a producer dependency declaration statement that creates sequencing producer dependencies on every method that sets the field for which that get property method is responsible (e.g., with respect to FIG. 7G, where the producer 780 is a producer that sets a field and the producer 720 is the get property producer responsible for that field, the dependency determination producer 775 would be written to return a downwardly declared sequencing dependency of the producer 720 on the producer 780). A second technique of handling this situation that may be used in embodiments of the invention that support both sequencing producer dependencies and upwardly declared producer dependencies is to include, in the producer dependency declaration statement/code for any method that sets a field, an upwardly declared sequencing producer dependency (e.g., using an UpwardDependency or WeaklyConstrainedDependency) on the get method responsible for that field (e.g., with respect to FIG. 7G, where the producer 720 is a producer that sets a field and the producer 785 is the get property producer responsible for that field, the dependency determination producer 775 would written to return an upwardly declared sequencing dependency of the parent producer 785 on the producer 720). This second technique allows the programmer of the method that sets the field to be responsible for providing a producer dependency to the appropriate get method, as opposed to requiring that programmer to go to the get method and modify its producer dependency declaration statement/code.

When using sequencing dependencies, when a given producer relies on a given variable, that variable should not be modified by more than one of that producer's descendant producers in a given execution of the producer graph(s) (It should be noted that through contingent dependencies (described later herein), different descendant producers may modify that variable during different executions of the current producer graph(s)). For example, a get property producer should only depend on one other producer that sets the filed for which the get property producer is responsible in a given execution of the current producer graph(s).

It should be understood that different embodiments of the invention may implement one or more of the embodiments of the invention shown in FIGS. 7A-F. For example, one embodiment of the invention supports shortcut and non-shortcut declared dependencies, both using dependency determination producers; specifically, in this embodiment of the invention: 1) the object-oriented source code includes explicit producer dependency declaration code in methods from which dependency determination producers are instantiated at run time by the runtime for non-shortcut declared dependencies; 2) the runtime includes generic producer dependency declaration code that it invokes as one or more generic dependency determination producers on the fly for shortcut declared, contingent dependencies (describer later herein); and 3) the runtime includes support to directly link shortcut declared, non-contingent producer dependencies (describer later herein).

As another example, one embodiment of the invention supports non-shortcut and shortcut declared producer dependencies using dependency determination producers; specifically, in this embodiment of the invention: 1) the object-oriented source code includes explicit producer dependency declaration code in methods from which dependency determination producer are instantiated at run time by the runtime for non-shortcut declared dependencies; and 2) the runtime includes generic dependency determination code that it invokes as one or more generic dependency determination producers on the fly for shortcut declared dependencies (regardless of type). This later embodiment allows for consistent treatment of producer dependencies, and thus, simplifies the runtime.

In addition, while in one embodiment of the invention the producer dependency declaration statement for a method is located just above that method in the object-oriented source code, in alternative embodiments of the invention it is located elsewhere (e.g., the producer dependency declaration statements for all the methods for a class are grouped together within the class, the producer dependency declaration statements for all the methods in all of the classes are grouped together as a separate data table, etc.). Also, while in one embodiment of the invention producer dependency declaration code is separate from the producer dependency declaration statements, in alternative embodiments of the invention they are combined (e.g., the producer dependency declaration code is within the parentheses of the producer dependency declaration statement, the producer dependency declaration code is placed directly beneath the producer dependency declaration statement and is treated by the runtime as a single unit, etc.).

Figure 7H:
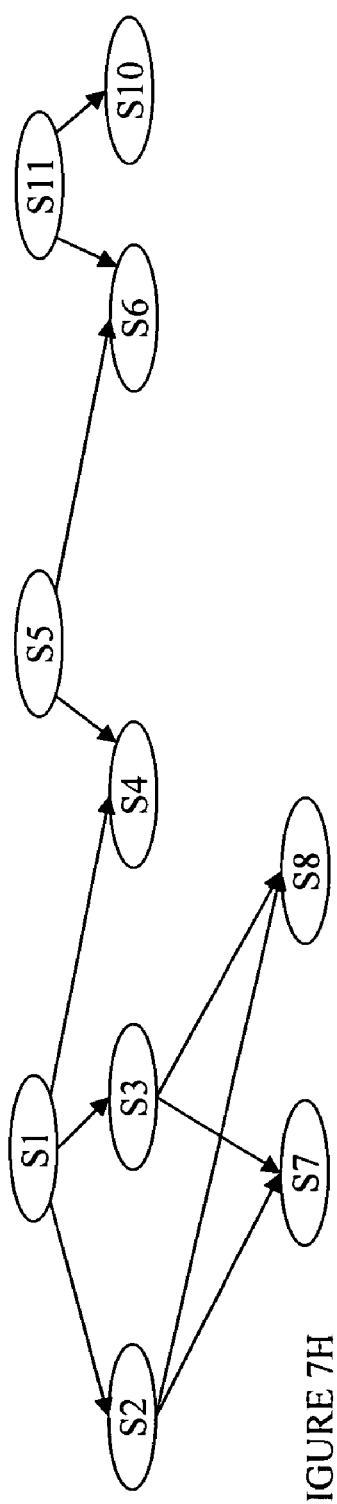
FIG. 7H illustrates exemplary producer graphs of standard producers according to one embodiment of the invention.
Figure 7I:
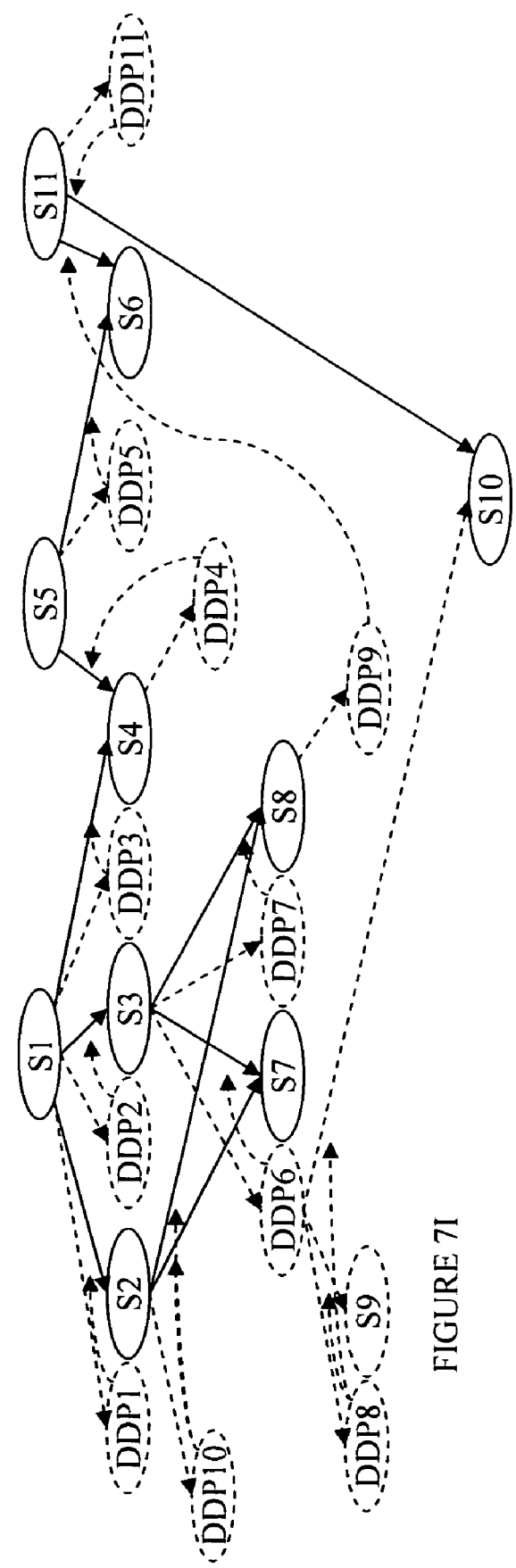
FIG. 7I illustrates one example of producer dependencies and dependency determination producers for discovering, resolving, and building the producer graph of FIG. 7H.

FIGS. 7H-I illustrate the distinction between different subgraphs that may exist in a producer graph due to dependency determination producers. FIG. 7H illustrates exemplary producer graphs of standard producers according to one embodiment of the invention. Specifically, FIG. 7H shows a producer graph with root node S1, a producer graph with root node S5, and a producer graph with root node S11. The standard producer S1 has as children standard producers S2, S3, and S4; standard producers S2 and S3 have as children standard producers S7 and S8; standard producer S5 has as children standard producers S4 and S6; and standard producer S11 has as children standard producers S6 and S10. The exemplary producer graphs of FIG. 7H may be discovered, built, and revolved using any number of producer dependencies and dependency determination producers. FIG. 7I illustrates one example of producer dependencies and dependency determination producers for discovering, resolving, and building the producer graph of FIG. 7H. Specifically, FIG. 7I shows the graphs of FIG. 7H being subgraphs of a larger set of producer graphs. In other words, the producer graphs of FIG. 7I include the graphs of FIG. 7H (referred to as the "target subgraphs" and illustrated using solid arrowed lines and solid ovals) and graphs that assist in the discover, resolution, and building of the target subgraphs (referred to as "decision subgraphs and illustrated used dashed arrowed lines and dashed ovals). The decision subgraphs in FIG. 7H include dependency determination producers (DDPs) 1-11 and standard producers S9-10. In FIG. 7H, S1 is shown as being dependent on DDPs 1-3, which respectively return downwardly declared producer dependencies of S1 on S2, S3, and S4; S4 is shown as being dependent on DDP4, which returns an upwardly declared producer dependency of S5 on S4; S5 is shown as being dependent on DDP5, which returns a downwardly declared producer dependency of S5 on S6; S3 is shown as being dependent on DDP6, which in turn is dependent on DDP8, which returns a downwardly declared producer dependency of DDP6 on S9 and S10, which causes DDP6 to return a downwardly declared dependency of S3 on S7; S3 is shown as being dependent on DDP7, which returns a downwardly declared producer dependency of S3 on S8; S8 is shown as being dependent on DDP9, which returns a sticky subscription for which S6 is a trigger producer and S11 is the created parent (thus, the producer dependency of S11 on S6); S2 is shown as being dependent on DDP10, which returns a collection of downwardly declared producer dependency of S2 on S7 and S8; and S11 is shown as being dependent on DDP11, which returns a downwardly declared producer dependency of S11 on S10. It should be understood that a standard producer may be both part of a target subgraph and a decision subgraph (e.g., see S10). It is worth noting that the target subgraphs are data driven in the sense that data flows from one standard producer to another standard producer up the graph.

Exemplary Programming and Execution Framework

Figure 8A:
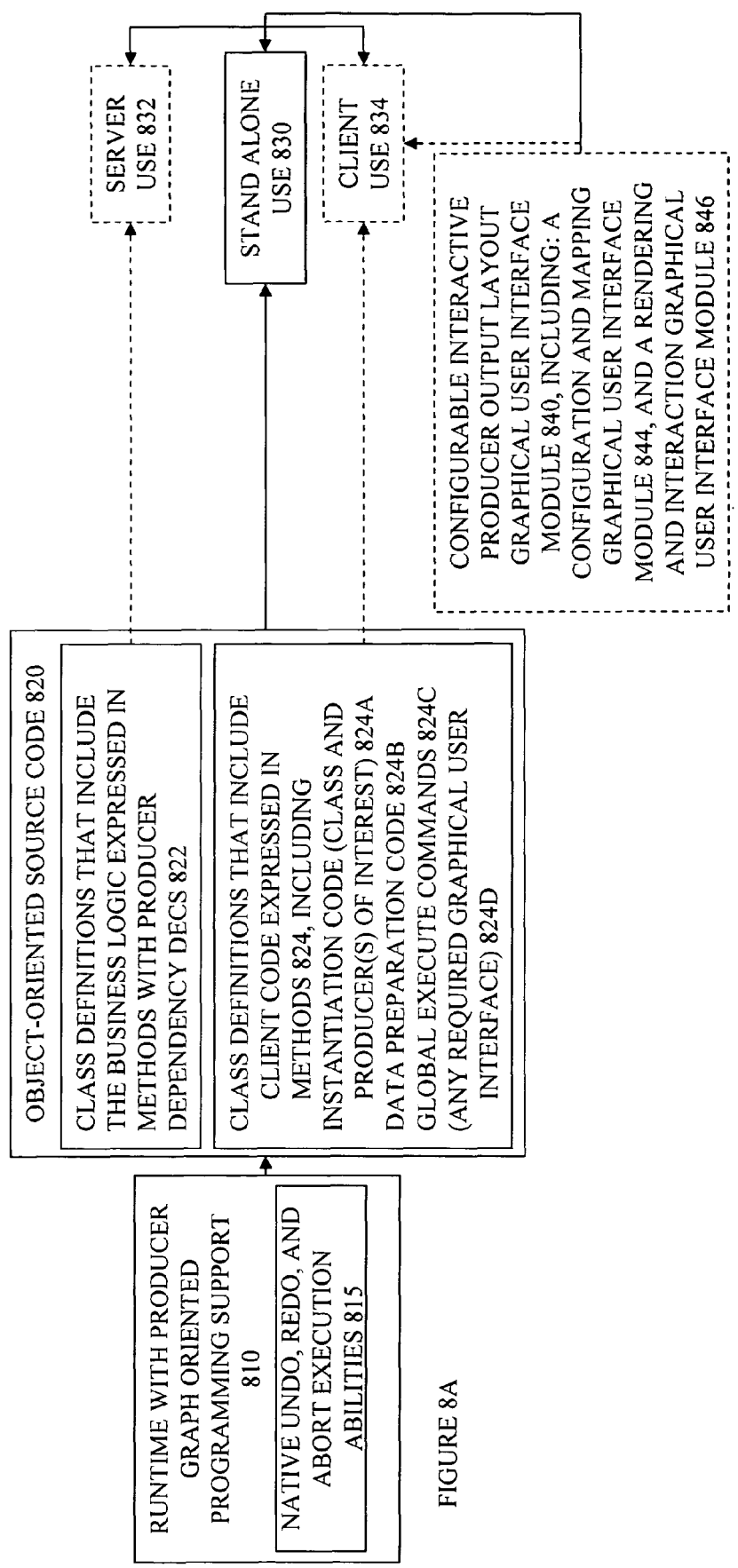
FIG. 8A is a block diagram illustrating a first exemplary framework within which applications are provided to end users according to one embodiment of the invention.

FIG. 8A is a block diagram illustrating a first exemplary framework within which applications are provided to end users according to one embodiment of the invention. The framework shown in FIG. 8A includes three basic divisions. The first division includes the creation of the runtime with producer graph oriented programming support 810, and the native ability to undo any operation, redo any operation, or abort execution of any operation without loss of data 815, as will be described in greater detail below.

This first division is performed by programmers with highly advanced programming skills. When working in this division, programmers are referred to as runtime programmers. When creating a runtime with producer graph oriented programming support, the runtime programmers include support for producer graphs, as well as support for executing the various types of commands used in transformation code, instantiation code, and data preparation code.

The second division includes the creation of object-oriented application source code 820 to be executed by the runtime. The object-oriented application source code 820 includes two basic divisions: 1) class definitions that include the business logic expressed in methods with producer dependency declarations 822 (this may optionally include other functionality, such as a graphical user interface—in which case, the graphical user interface is written using producers and producer dependency declarations); and 2) class definitions that include client code expressed in methods 824, including instantiation code (class, instances, and producer(s) of interest, to cause generation of the producer graph(s)) 824A, data preparation code 824B (e.g., set commands, such as set commands that trigger the overriding of producer outputs), global execute commands 824C to cause execution of the producer graph(s) (e.g., execute and get commands), and any required graphical user interface 824D (not included in 822). The producer dependency declarations are used to define the ties between producers during the definition of the classes that include the business logic, rather than after instances of those classes are created. The object-oriented source code 820 is hard coded class, instance, and methods that are compiled and executed. Furthermore, as will be discussed below, runtime 810 provides the native ability of any object oriented source code 820 to implement undo, redo, and abort execution functionality 815 in any application developed in the framework of FIG. 8A.

While in one embodiment of the invention a global execute command is implemented, execution of which causes the attempted execution of all producer graph(s) currently in the producer graph(s) structure 380, alternative embodiments of the invention alternatively or also implement a graph specific execute command that requires identification of a given graph of the current producer graph(s) that is to be executed. Further, the global execute command may be explicit (e.g., set, set, set, execute, get, get) or implicit depending on the implementation of the runtime. For example, an implicit global execute command could be: 1) triggered by the first get command on a producer of interest (e.g., set, set, set, get (implicit execute), get); 2) triggered by each data manipulation (set (implicit execute), set (implicit execute), set (implicit execute), get, get); etc.

The second division is again performed by programmers with advanced programming skills, as well as an understanding of the business objectives of the application. When working in this division, programmers are referred to as application programmers. As part of this, if the application requires a graphical user interface, the application programmers also design and code the graphical user interface for the specific application; and thus are also referred to as application designers.

The third division includes the use of application programs being run by the runtime. The third division is performed by end users that need not have any programming skills. The application program may be distributed in a variety of ways (e.g., as source code; a transformation of source code, such as byte code; as binary, etc). In addition, the application program may be distributed for stand alone use 830 (in which case, the entire application program (and runtime if not already present) is provided to a computer system) and/or client/server use. In one embodiment of the invention, a client/server distribution includes distributing the class definitions that include the business logic expressed in methods with producer dependency declarations 822 (and runtime if not already present) for server use 832 and the class definitions that include client code expressed in methods 824 (and runtime if not already present) for client use 834, where the client use 834 on a computer system causes communication with the server use 832 on a server system.

FIG. 8A also shows an optional configurable interactive producer output layout graphical user interface module 840 being provided for the standalone use 830 and the client use 834. The object-oriented source code 820 would be run by the runtime to generate the producer graph(s), and the configurable interactive producer output layout graphical user interface module 840 allows for graphically displaying outputs from and interacting with the producer graphs. Specifically, the configurable interactive producer output layout graphical user interface module 840 includes: 1) a configuration and mapping graphical user interface module 844 to allow for the configuration of the layout and mapping of selected producer outputs (e.g., areas of the screen to be used, how the data is to be displayed, etc.); and 2) a rendering and interaction graphical user interface module 846 to render the configured layout and to allow for the overriding of producer outputs (which results in the updating of the producer graphs through a global execute command). It should be understood that the configurable interactive producer output layout graphical user interface module 840 may or may not be created by the same entity that writes the runtime 810.

Figure 8B:
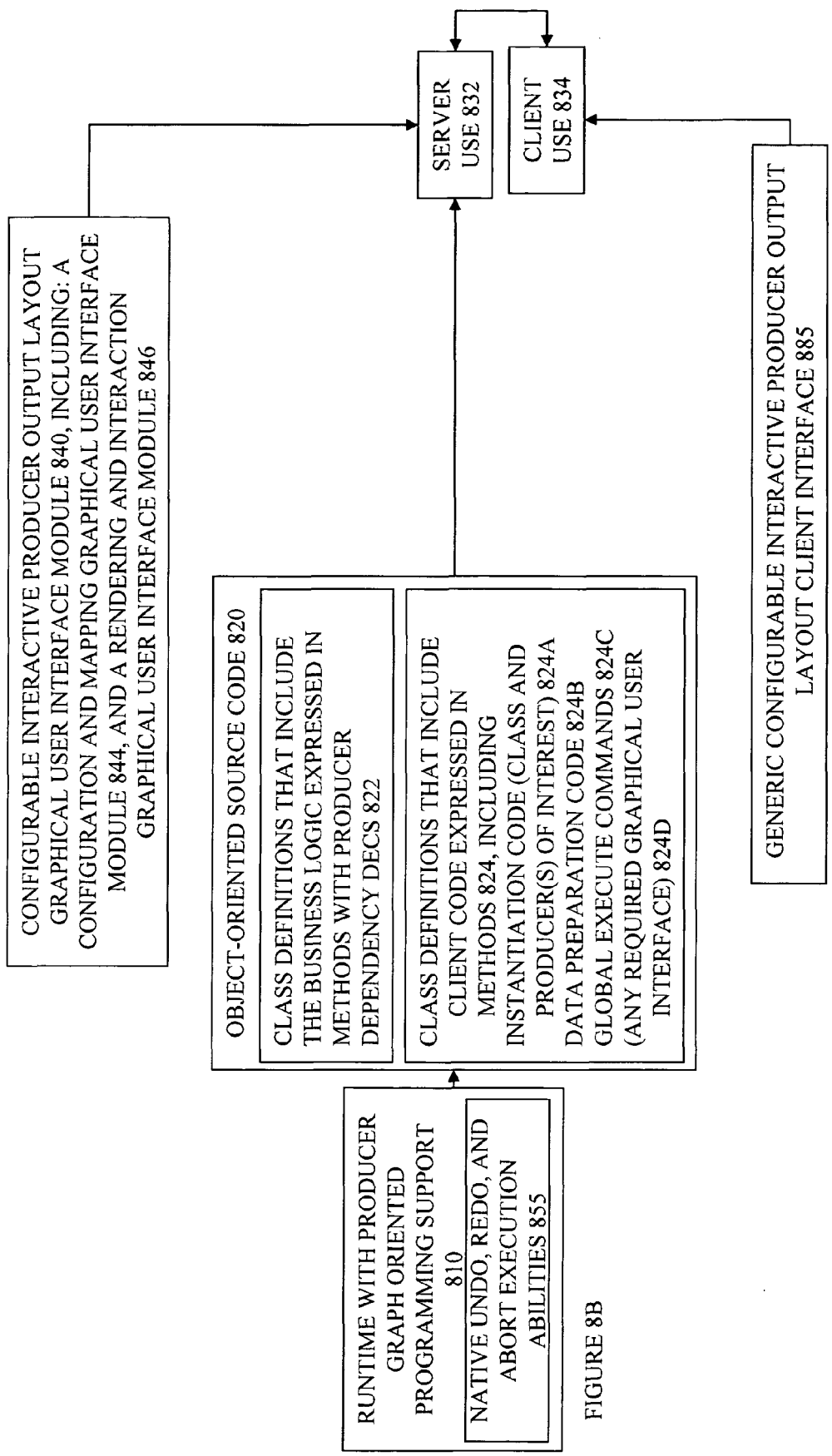
FIG. 8B is a block diagram illustrating a second exemplary framework within which applications are provided to end users according to one embodiment of the invention.

FIG. 8B is a block diagram illustrating a second exemplary framework within which applications, that include a native ability to undo any operation, redo any operation, or abort execution of any operation without loss of data, are provided to end users according to one embodiment of the invention. FIG. 8B is identical to FIG. 8A, with the following exceptions: 1) the stand alone used 830 is not present; 2) the object oriented source code 820 is provided to server use 832, while the client code 824 is not provided to client use 834; 3) the configurable interactive producer output layout graphical user interface module 840 is provided to server use 832 and not client use 834; and 4) a generic configurable interactive producer output layout client interface 885 is provided to client use 834. The configurable interactive producer output layout client interface 885 is used to interface with the configurable interactive producer output layout graphical user interface module 840. Furthermore, as will be discussed below, runtime 810 provides the native ability of any object oriented source code 820 to implement undo, redo, and abort execution functionality 815 in any application developed in the framework of FIG. 8A. Additionally, the native undo, redo, and abort execution abilities 855 could then be included in the standard functionality provided within the configurable interactive producer output layout graphical user interface module 1085 of FIG. 10.

Regardless of the framework used, in one embodiment of the invention the producer graph oriented programming framework offers the ability to interface with programs not written with producer dependency declarations. This ability to interface with programs not written with producer dependency declarations includes: 1) a caller part (such as a graphical user interface not written according to producer graph oriented programming); and 2) a called part (such as an external data source not written according to producer graph oriented programming). The caller part may, through client code, issues producer graph oriented programming commands. The called part is implemented as part of producers that wrap the called part (referred to as "wrapping producers"). Executing the called part (such as reading data from a data source or subscribing to changes of data in an external data source) may in turn trigger instance modifications. These changes may occur by calling the property set methods in the code of the wrapping producers. Get property producers (getters) are caused to have dependencies on these wrapping producers, in order to make sure that instance modifications triggered by the changes occurring in an external data source are properly propagated through the producer graph. As previously described, different embodiments may support one or more ways for declaring producer dependencies with respect to property producers. For example, in some embodiments of the invention that support sequencing producer dependencies, SequencingDependencies may be used for declaring non-subscription downwardly declared sequencing producer dependencies on the wrapping producers. As yet another example, in some embodiments of the invention that support sequencing producer dependencies and non-subscription upwardly declared producer dependencies, UpwardDependencies and/or WeaklyConstrainedDependencies may be may be placed in the producer dependency declaration of the wrapping producers to create non-subscription upwardly declared sequencing producer dependencies for the property producers.

FIGS. 8C-F illustrate exemplary screenshots and usage of the configurable interactive producer output layout graphical user interface module 840 according to one embodiment of the invention. While embodiments of the invention will be described with reference to the configurable interactive producer output layout graphical user interface module 840 providing for the configuration, mapping, and interaction with selected outputs of the current producers graph(s) in the form of a spreadsheet, alternative embodiments of the invention may be implemented to additionally or alternatively provide support for another form. Further, while exemplary ways of performing the configuration, mapping, and interaction in the form of a spreadsheet is described according to some embodiments, other embodiments of the invention may perform these operations another way, with different interface, and/or with a different screen layout. Further, the spreadsheet may support any of the known functionalities associated with spreadsheets (e.g., color selection, font selection, bar/pie/line charts, pivot tables, saving layouts, loading layouts, etc.)

Figure 8C:
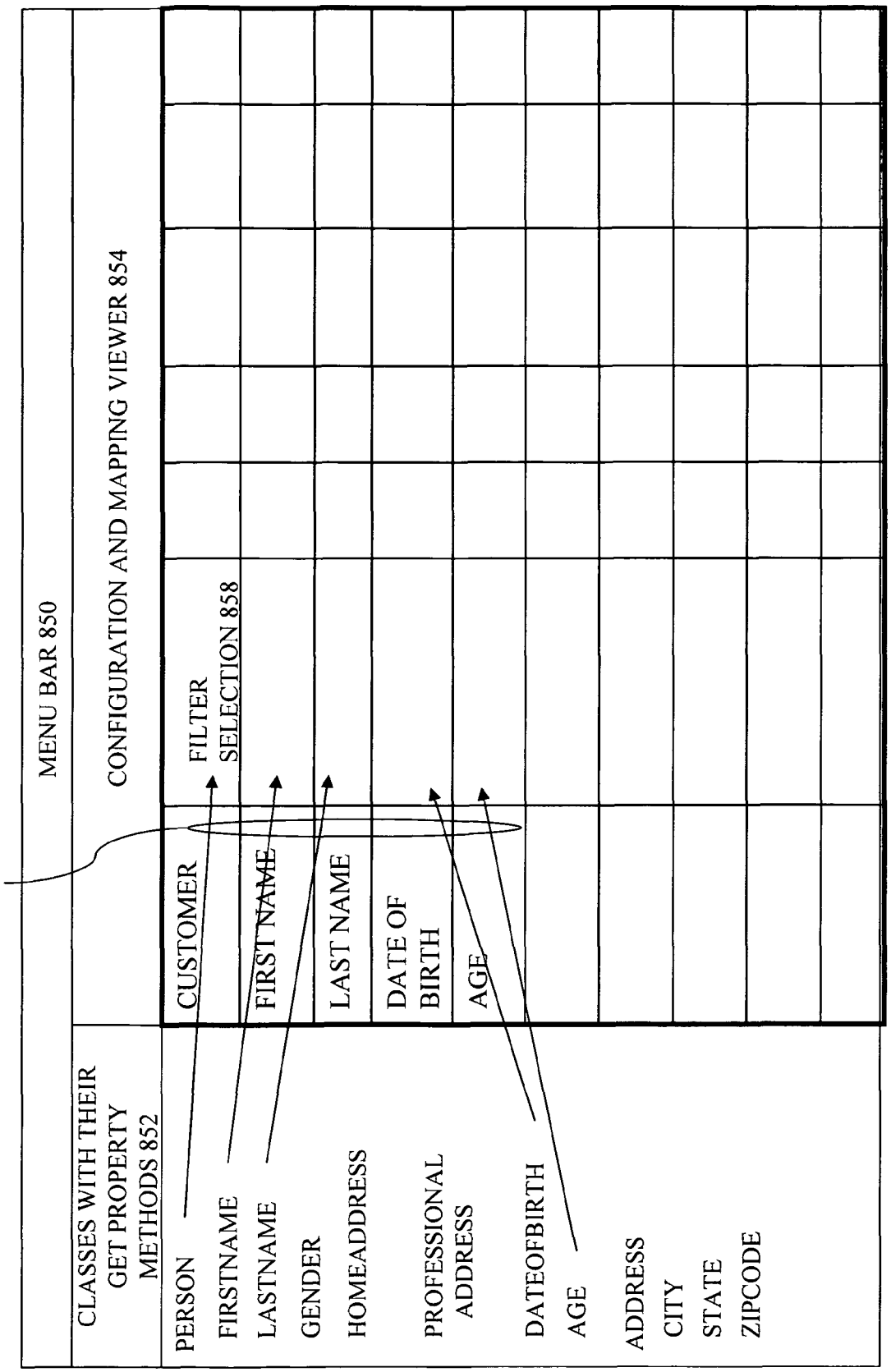
FIG. 8C illustrates an exemplary screenshot and usage of free cell selection with the configurable interactive producer output layout graphical user interface module 840 according to one embodiment of the invention.
Figure 8E:
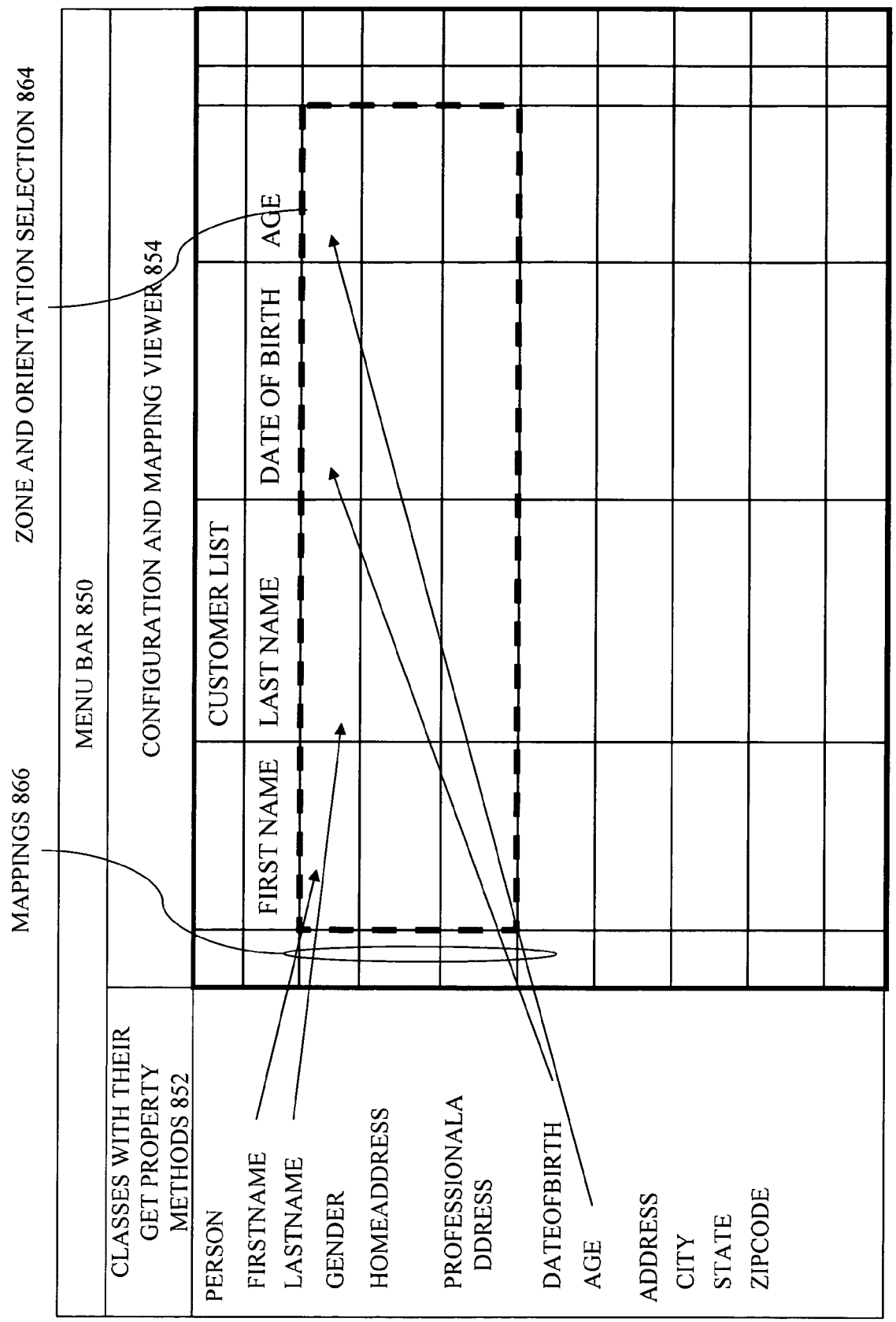
FIG. 8E illustrates an exemplary screenshot and usage of table creation with the configurable interactive producer output layout graphical user interface module 840 according to one embodiment of the invention.
Figure 8F:
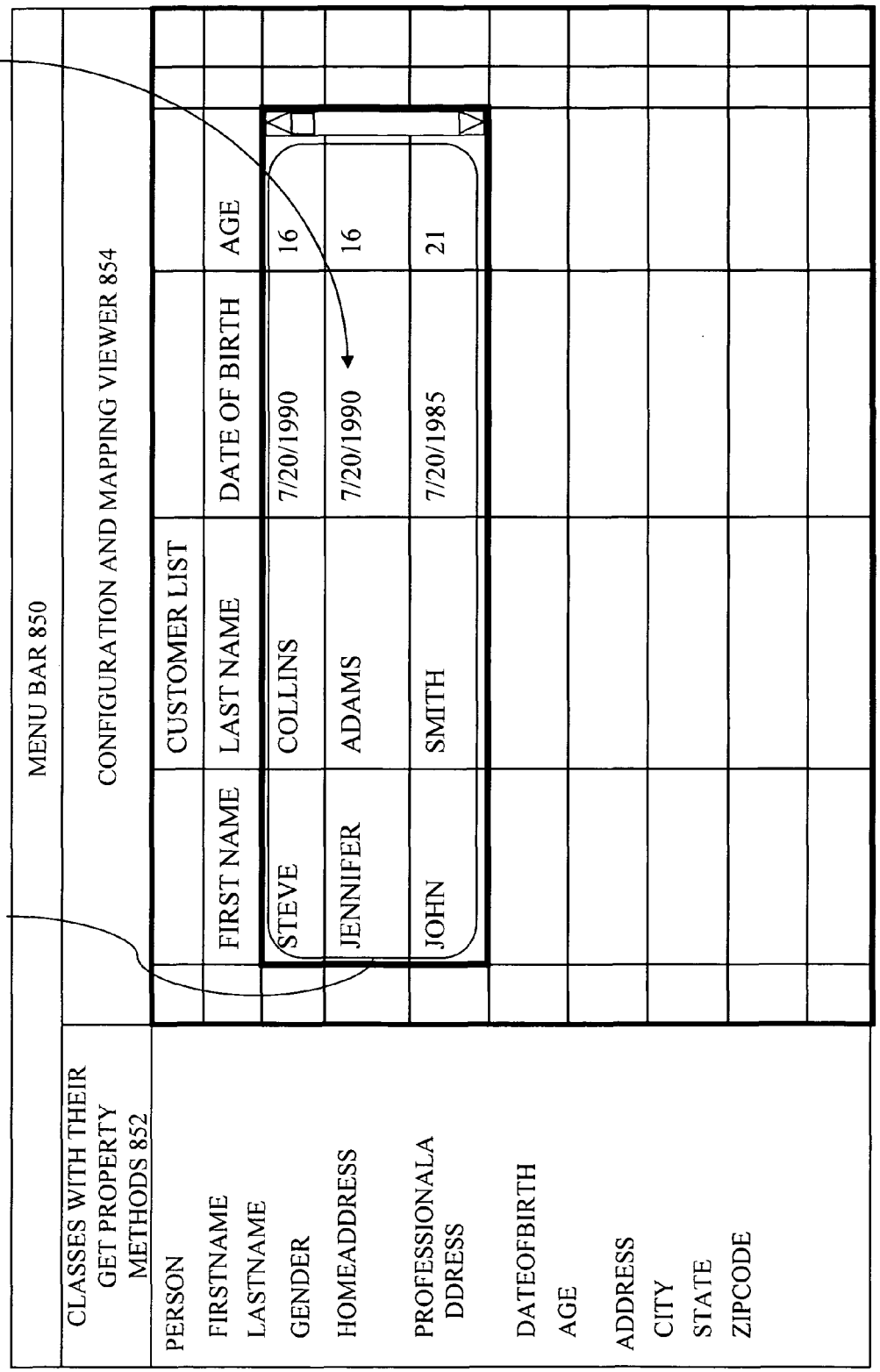
FIG. 8F illustrates another exemplary screenshot and usage of table creation with the configurable interactive producer output layout graphical user interface module 840 according to one embodiment of the invention.

FIGS. 8C-D illustrate exemplary screenshots and usage of free cell selection according to one embodiment of the invention, while FIGS. 8E-F illustrate exemplary screenshots and usage of table creation according to one embodiment of the invention. Each of FIGS. 8C-F include a menu bar 850 along the top of the screen, a list of classes (with their get property methods) 852 of the producers in the current producer graph and their outputs down the left side of the screen, and a configuration and mapping viewer 854 filling the remainder of the screen with a spreadsheet like layout. In addition, FIGS. 8C-F also show the following exemplary list of classes with their get property methods in the list 852: 1) the class PERSON; 2) the get property methods of the class person including FIRSTNAME (e.g., string), LASTNAME (e.g., string), GENDER (e.g., string), HOMEADDRESS (instance of the class ADDRESS), PROFESSIONALADDRESS (instance of the class ADDRESS), DATEOFBIRTH (e.g., date), and AGE (e.g., integer); 3) the class ADDRESS; and 4) the get property methods of the class ADDRESS including CITY (e.g., string), STATE (e.g., string), ZIPCODE (e.g., string). As such, the current producer graph includes producers of the classes PERSON and ADDRESS, as well as producers whose outputs are of classes PERSON and ADDRESS. It is also worth nothing that the get property method AGE calculates an age based on the output of the get property method DATEOFBIRTH; as such, a producer instantiated from the get property method AGE will be dependent on a producer instantiated from the get property method DATEOFBIRTH.

FIGS. 8C-D show the following free text entered in consecutive cells of the first column of the viewer: CUSTOMER, FIRST NAME, LAST NAME, DATE OF BIRTH, and AGE; while FIGS. 8E-F show the following: 1) free text entered in the first row of the viewer—CUSTOMER LIST; and 2) free text entered in consecutive cells of the second row of the viewer FIRST NAME, LAST NAME, DATE OF BIRTH, AND AGE.

FIG. 8C illustrates an exemplary screenshot and usage of free cell selection with the configurable interactive producer output layout graphical user interface module 840 according to one embodiment of the invention. FIG. 8C shows a set of mappings 856 of the class PERSON and selected get property methods of the class PERSON to different cells of the viewer. Specifically, the class PERSON is mapped to the cell to the right of the free text CUSTOMER. As part of this action, some embodiments of the invention prompt the user to select from one of a number of supported filters (show as filter selection 858) (e.g., drop down list, form scrolling arrows, etc.). These filters enable the selection of one or more instance keys of producers of the selected class, or one or more instance keys of the producers whose output class is the selected class. While some embodiments of the invention support a number of filters, other embodiments of the invention default to one (and allow the user to chose whether to select a different one) or support only one and do not need to perform filter selection 858. The mappings 856 also show that the get property methods FIRSTNAME, LASTNAME, DATEOFBIRTH, and AGE of the class PERSON are respectively mapped to the cells adjacent to the cells with corresponding free text. Such a mapping may be performed with any number of well known techniques, including drag and drop, typing in a GUI field, etc.

FIG. 8D illustrates another exemplary screenshot and usage of free cell selection with the configurable interactive producer output layout graphical user interface module 840 according to one embodiment of the invention. FIG. 8D shows that the cell to which the class PERSON was mapped to allow for instance selection 854. Specifically, based on the filter used for this cell, the user is given the opportunity to select an instance of the class PERSON from a list including the instance keys (s) of the producers of the class PERSON, and the instance keys of the producers producing the class PERSON. The selection of an instance of the class PERSON (or the existence of a single instance) results the automatic population of the cells, to which the get property methods of the class PERSON were mapped, with the outputs of the corresponding get property methods of that instance. This populating of the table based on the instances of the class PERSON is labeled 858. In the example of FIG. 8D, the cells to which the get property methods FIRSTNAME, LASTNAME, DATEOFBIRTH, and AGE of the class PERSON were mapped being respectively populated with JOHN, SMITH, Jul. 20, 1990, and 16.

FIG. 8D also shows that cells of the viewer to which get property methods have been mapped may be overridden. By way of example, FIG. 8D shows that if the cell to which the get property method DATEOFBIRTH is mapped is overridden, then it will cause the overriding of the output of the producer whose output is currently populating that cell, invocation of a global execute command (which would result in a reexecution of the producer whose output is currently populating the cell to which the get property method AGE is mapped), and any necessary updating of the display.

FIG. 8E illustrates an exemplary screenshot and usage of table creation with the configurable interactive producer output layout graphical user interface module 840 according to one embodiment of the invention. FIG. 8E shows a zone and orientation selection 864 operation is performed to identify a three row vertical table directly under the cells with free text FIRST NAME, LAST NAME, DATE OF BIRTH, AND AGE (illustrated with a thick dashed line around these cells). Different embodiments of the invention may support the user performing this operation any number of ways (including: 1) selection of an area with an input device like a mouse; and 2) selection between a vertical, horizontal, or pivot table with an interface like a popup menu—assuming multiple orientations are supported). FIG. 8E also shows a set of mappings 866 of selected get property methods of the class PERSON to different cells of the viewer. Specifically, the mappings 866 show that the get property methods FIRSTNAME, LASTNAME, DATEOFBIRTH, and AGE of the class PERSON are respectively mapped to the cells directly beneath the cells with corresponding free text.

FIG. 8F illustrates another exemplary screenshot and usage of table creation with the configurable interactive producer output layout graphical user interface module 840 according to one embodiment of the invention. The mappings 866 results in the automatic population of the columns of the table, to which the get property methods of the class PERSON were mapped, with the outputs of the corresponding get property methods of the instances of that class. This populating of the table based on the instances of the class PERSON is labeled 868. In the example of FIG. 8D, the columns to which the get property methods FIRSTNAME, LASTNAME, DATEOFBIRTH, and AGE of the class PERSON were mapped being populated with the following rows of data: 1) STEVE, COLLINS, Jul. 20, 1990, and 16; 2) JENNIFER, ADAMS, Jul. 20, 1990, and 16; and 3) JOHN, SMITH, Jul. 20, 1985, and 21.

As in FIG. 8D, FIG. 8F shows that cells of the viewer to which get property methods have been mapped may be overridden. By way of example, FIG. 8F shows that if the cell of the second row of the column to which the get property method DATEOFBIRTH is mapped is overridden, then it will cause the overriding of the output of the producer whose output is currently populating that cell, invocation of a global execute command (which would result in a reexecution of the producer whose output is currently populating the cell to which the get property method AGE is mapped), and any necessary updating of the display.

In one embodiment, an undo command, redo command, and/or abort execution command can be included as icons, menu items, etc. in the menu bar 850 of FIGS. 8D-F. As is discussed here, because the undo, redo, and abort execution abilities are native abilities of any application developed in the producer graph oriented programming framework, usage of the configurable interactive producer output layout graphical user interface module 840 according to one embodiment of the invention, could provide one or more of the undo command, redo command, and/or abort execution command in the graphical user interfaces illustrated in FIGS. 8D-F, as well as other graphical user interfaces developed according to the producer graph oriented programming framework.

FIGS. 8C-F illustrate exemplary screens generated by the configuration and mapping graphical user interface module 842. The screens generated by the rendering and interactive graphical user interface module 846 are the same, with the exception that the list of classes (with their get property methods) 852 the configuration and mapping viewer 854 are replaced by a rendering and interactive viewer (not shown) that contains the same image as the configuration and mapping viewer 854 displayed (the difference being the mapping feature is no longer available).

Exemplary Runtime Distribution Schemes

FIGS. 9A-C illustrate various schemes for distributing a runtime with producer graph oriented programming support. It should be understood that these distribution schemes are exemplary, and thus other schemes are within the scope of the invention.

FIG. 9A is a block diagram illustrating a first scheme for distributing a runtime with producer graph oriented programming support, including native undo, redo, and abort execution functionality, according to one embodiment of the invention. In FIG. 9A, object-oriented source code 905 (which would include producer dependency declarations) is shown on top of a runtime with producer graph oriented programming support 910 (including native undo, redo, and abort execution abilities 912), which is on top of a runtime with class loading, dynamic class instantiation, dynamic single method invocation, and class/method introspection 915, which is on top of an operating system 920. In FIG. 9A, the runtime 910 works with the runtime 915. While any number of mechanisms may be used to allow runtime 910 to work with runtime 915, a metadata facility is described by way of example. A metadata facility allows additional information to be added to source code, which information is used by development tools. For example, the Metadata Facility for Java specification defines an API for annotating fields, methods, and classes as having particular attributes that indicate they should be processed in special ways by development tools, deployment tools, or run-time libraries (Java Specification Request 175). In this example, a programmer programming the object-oriented source code 905 would add annotations to methods in the form of the producer dependency declarations. Since these annotations are handed off by the runtime 915 to the runtime 910, the runtime 910 dictates the syntax of the producer dependency declarations. In FIG. 9A, the runtimes 910 and 915 may be developed and/or distributed by different organizations. Furthermore, a programmer programming an application can call any of the undo, redo, and abort execution abilities from the object-oriented source code 905 because, as will be discussed in greater detail below, the native undo, redo, and abort execution functions are supplied to the object oriented source code 905 by the native undo, redo, and abort execution abilities 912 of the runtime 910.

FIG. 9B is a block diagram illustrating a second scheme for distributing a runtime, including native undo, redo, and abort execution functionality, with producer graph oriented programming support according to one embodiment of the invention. In FIG. 9B, object-oriented source code 925 (which would include producer dependency declarations) is shown on top of a runtime (with class loading, dynamic class instantiation, dynamic single method invocation, and class/method introspection, as well as producer graph oriented programming support, and native undo, redo, and abort execution abilities 932) 930, which is on top of an operating system 935. In comparison to FIG. 9A, the runtime 910 and 915 have been combined into a single runtime 930. As a result of this combination, the runtime 930 dictates the syntax of the producer dependency declarations. Thus, a programmer programming the object-oriented source code 925 would add the producer dependency declarations in the required syntax. Furthermore, similar to the discussion above in FIG. 9A, a programmer programming an application can call any of the undo, redo, and abort execution abilities from the object-oriented source code 925 because the native undo, redo, and abort execution functions 932 are supplied to the object oriented source code 925 by the runtime 930.

FIG. 9C is a block diagram illustrating a third scheme for distributing a runtime, including native undo, redo, and abort execution functionality, with producer graph oriented programming support according to one embodiment of the invention. In FIG. 9C, object-oriented source code 940 (which would include producer dependency declarations) is shown on top of an operating system runtime (with class loading, dynamic class instantiation, dynamic single method invocation, and class/method introspection, as well as producer graph oriented programming support) 945. In comparison to FIG. 9B, the runtime 920 and operating system 935 have been combined into a single entity. As a result of this combination, the operating system runtime 945 dictates the syntax of the producer dependency declarations. Thus, a programmer programming the object-oriented source code 940 would add the producer dependency declarations in the required syntax. Furthermore, similar to the discussion above in FIGS. 9A and 9B, a programmer programming an application can call any of the undo, redo, and abort execution abilities 947 from the object-oriented source code 940 because the native undo, redo, and abort execution functions are supplied to the object oriented source code 940 by the operating system runtime 945 and 947.

While embodiments are described in which the runtime has class loading, dynamic class instantiation, dynamic single method invocation, and class/method introspection, alternative embodiments may include more or less features (e.g., instance cloning, dynamic proxies, primitive type conversions, etc.)

Exemplary Advantages

In one embodiment of the invention, producer dependencies are declared for methods as a way to specify method invocation sequencing using the appropriate instances (where the appropriate instances include the instances to use as arguments, the instances to be used by instance methods, and the meta class instances used by class methods) without using manual invocation sequencing code. Effectively, the work of generating some or all of manual invocation sequencing code is replaced with: 1) work done by the application programmer to write the producer dependency declarations; and 2) work done by the runtime to discover and build the producer graph(s) and execute the producers of those producer graph(s). In other words, the logic that was previously contained in the manual invocation sequencing code is discoverable by the runtime during runtime based on the producer dependency declarations. Thus, the producer dependency declarations inform the runtime what methods of what instances with what arguments to execute, and when for synchronization purposes. Although the effort to write the runtime is relatively great, it needs only be written once in that it can be used to execute any object-oriented applications written for the runtime; in contrast, for a typical application, the effort to write the producer dependency declarations is relatively low in comparison to writing manual invocation sequencing code.

Reducing Programming Mistakes

Producer graph oriented programming typically reduces the costs associated with the debugging and/or performance tuning of the manual invocation sequencing code. This is true for at least the reason that the infrastructure of an application program is conceptually a set of non-formalized graphs of transformation methods of objects (the output of one method associated with an object is the input to another, and so on) that operate on specific inputs. The producer dependency declarations and the runtime with producer graph oriented programming support formalizes these graphs as producer graphs. Thus, for each opportunity for data to change, the application programmer need not consider its effect and write manual invocation sequencing code to cause the appropriate transformation methods of the appropriate instances to be invoked in the appropriate order with the appropriate inputs. In other words, for each opportunity for data to change, an application programmer need not consider which graphs are affected, as well as which transformation methods of instances within those graphs are affected. Rather, the automated producer graph generation module discovers and builds the producer graphs and the producer graph execution module reexecutes the producer graphs as needed to reflect changes in the data. This automation helps application programmers avoid mistakes such as: 1) invoking the appropriate transformation methods of the appropriate instances in the wrong order; 2) forgetting to include commands to cause the one or more required transformation methods of instances in a graph to be invoked responsive to some data being changed; 3) including commands to cause unnecessary transformation methods of instances to be invoked responsive to some data being changed (e.g., including commands to invoke transformation methods of instances that are not part of a graph affected by the change in data; including commands to invoke transformation methods of instances that are part of a graph affected by the change in the data, but are not themselves affected; etc.).

Synchronization

As previously described, the caching of producer outputs during execution allows for synchronization. Thus, in terms of comparison to the observer pattern, the producer dependency declarations notify a runtime with producer graph oriented programming support of the dependencies, and the runtime determines what producers and when to call back.

Ability to Fully Explain any Result

In one embodiment of the invention, a drilling/viewing module (not shown) is included as part of the runtime. The drilling/viewing module provides a graphical user interface which, through interaction by an end user, allows for drilling down into the producer graph (walking down a producer graph from the root node) to view the outputs of the various producers of the producer graph. This allows an end user to see the various outputs that contributed to the output of the producer of interest, including the data values and dependencies (returned by dependency determination producers). Further, in one embodiment of the invention, this drilling/viewing module provides the ability for the end user to view the code inside the methods of the producers, the values of the instances of the producers, and/or the content of the classes of the producers.

Thus, the drilling/viewing module provides for a variety of post processing activities, including debugging, explanation of outputs, etc.

Native Runtime Undo, Redo, and Abort Execution Abilities

In one embodiment of the invention, the ability to undo any operation performed in, or by, a Producer Graph Oriented Programming application is provided as a native ability of the runtime. As such, the runtime implements the logic that allows operations to be undone. In a similar manner, the runtime implements the logic that allows any operation to be redone, as well as allowing the execution of any program to be interrupted while not losing data. Because the runtime, and not an application, includes the logic to undo, redo, and stop program execution, the abilities are provided to any application and any applications programmer that develops a producer-based software application.

Furthermore, an application programmer need not "re-invent the wheel" for each application by hard-coding undo, redo, and abort execution functions in each new application. Because the runtime includes the logic to perform undo, redo, and stop execution functions on an application, the application programmer merely includes the native functions in an application. For example, and not by way of limitations, an application programmer may simply associate a certain combination of computer keys (e.g. ctrl-alt-del, F12, etc.) with the native abort execution ability, create an application icon that calls on the native ability to undo or redo an operation, etc. Additionally, because the abilities are included as native abilities in the runtime, the application programmer need not be concerned with the "how to" for coding such functions. Rather, the application programming utilizes the native functions while developing an application thereby improving program development efficiency, accuracy, and feature integration. In one embodiment, as part of a configurable interactive producer output layout GUI module native undo, redo, and abort execution abilities are included, either selectively or automatically, as part of any application constructed by the generic configurable interactive producer output layout GUI module.

Exemplary Practical Application/Technical Effect/Industrial Applicability

There are a variety of exemplary practical applications of the different aspects and embodiments of the invention. For example, the runtime, as part of executing application programs, causes the retrieval of information from a machine storage media (e.g., accessing the object-oriented source code, including the producer dependency declarations), the storage of information to a machine storage media (e.g., storing data structures like the producer graph(s) structure, etc.), the operation of hardware processing resources, the provision of the outputs of the producer(s) of interest (e.g., through a graphical user interface, storage to machine storage media, transmission, etc.), etc. In one sense, preprocessing activity includes the writing of such an application program and/or the provision of data (which data may represent any number of physical and/or practical items, such as financial values, geographical values, meteorological values, actuarial values, statistical values, physical measures, machine state values, etc.), while post processing activity includes the provision of results (which results may represent any number of physical and or practical items, such as financial analysis, geographical analysis, meteorological analysis, actuarial analysis, statistical analysis, industrial measures, machine control information, etc. By way of specific example, post processing activity may be provided by: 1) the producer graph viewer module 1062 of FIG. 10 for graphically displaying a representation of the current producer graph(s) generated by the runtime; and/or 2) the configurable interactive producer output layout graphical user interface module 840 (see also, configurable interactive producer output layout graphical user interface module 1085 of FIG. 10) for graphically displaying outputs from and interacting with the producer graphs.

As another example, the application program with producer dependency declarations itself, when executed by the runtime, represents the physical/practical items and causes the operations described above. By way of specific example, these producer dependency declarations cause data structures to be formed in machine storage media responsive to their execution by the runtime. Also, the producer dependency declarations are stored and retrieved from machine storage media along with the application program. Further, these producer dependency declarations represent relationships between producers, while producers represent operations to be performed (methods) and instances. The instances in object-oriented programming may be used to represent physical and/or practical items, while the producers represent operations to be performed on these representations.

By way of another example, a set of one or more application programs and the runtime implement cross-asset risk management software covering foreign exchange, equity, interest rate, credit, inflation, commodity, and cross-asset composite products. These products range from cash and physical plain vanilla products to exotic and complex derivative products. Also included is a set of mathematical valuation models for these products, and their associated market data, payment and accounting entries generation routines and their associated observables, calibration models and their associated raw inputs.

By way of another example, a set of one or more application programs and the runtime may implement a word processor, a spreadsheet, a communication/e-mail software, a photo viewing software, a virus scan software, a media player, a database server, a game, an industrial application, a computer aided design tool application, and/or an operating system. Of course, application programs can be implemented to perform a variety of other tasks. According to the implementations of these applications, undo, redo, and abort execution functions may be included as native abilities of the runtime. Thus, a user of these applications may undo or redo any user operation (e.g., user input into a word processor, calculation in a spreadsheet, cropping an image, etc.) and instantly undo, switching to a previous state of the application as a result of the runtime executing the undo function, or instantly redo, and switch to a subsequent state of the application that had previously been undone, as a result of the runtime executing the redo function. An application that utilizes the native abort execution ability would allow a user to terminate a running treatment, by canceling the last action while it is processing, without loosing data as a result of stopping the presently running process, and hence returning to a stable state, i.e. the state that was prevailing prior to the execution of the aborted command. With respect to undo, redo, and abort execution, the user may view such results virtually instantaneously on a monitor, or the results may be internal to a software application. In either case, the user is provided with the ability to alter the state of a running application with native abilities of a runtime, and not application-specific hard-coded functions.

Exemplary Implementations

By way of illustration, exemplary embodiments of the invention will be described that support dependencies, dynamic dependencies (including contingent dependencies and subscription dependencies), explicit dependency determination producers for shortcut declared dependencies and for non-shortcut declared dependencies, on the fly dependency determination producers for shortcut declared dependencies, class keys, instance keys, method keys, producer override/unoverride commands (which are types of set commands), command stacks, audit stacks, modification logs, and global execute commands. In addition, the exemplary embodiments optionally support a producer graph interactive viewer module and incremental execution. Of course, alternative embodiments of the invention may implement more, less, and/or different features.

Figure 10:
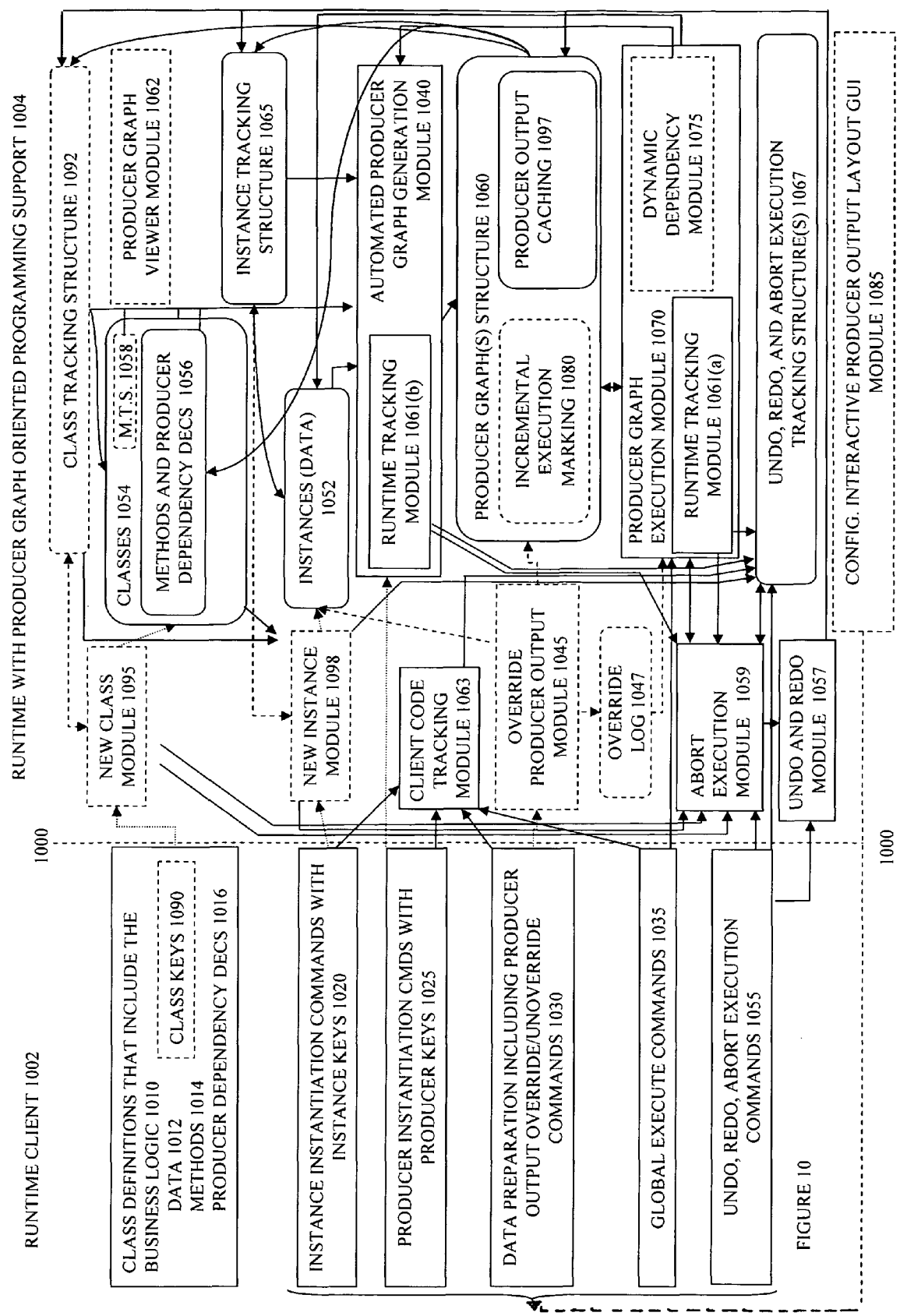
FIG. 10 is a block diagram of an exemplary implementation according to one embodiment of the invention.
Figure 13:
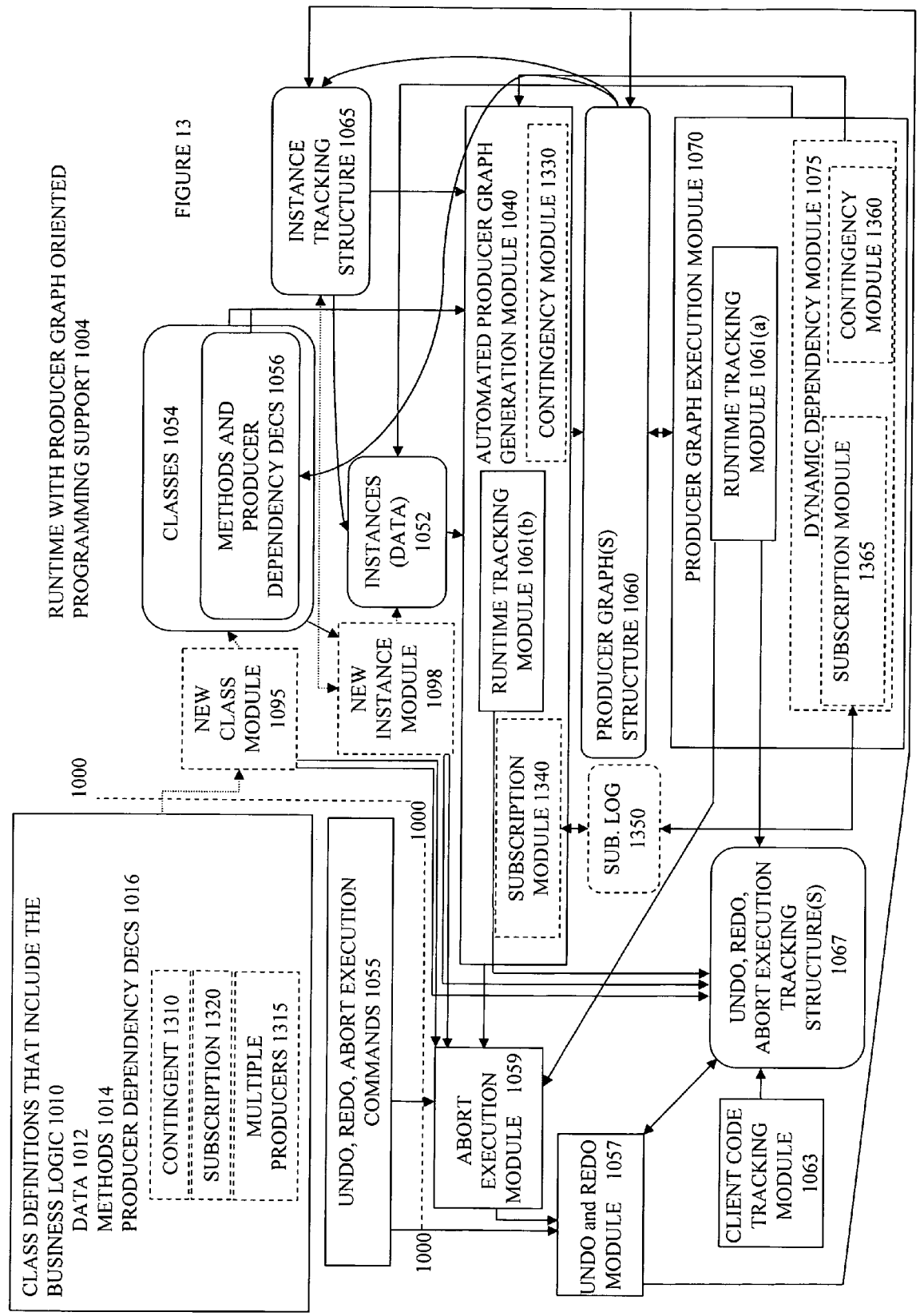
FIG. 13 is a block diagram illustrating additional detail of FIG. 10 to support contingent and subscription type dynamic producer dependencies according to one embodiment of the invention.

FIG. 10 is a block diagram of an exemplary implementation according to one embodiment of the invention. In FIG. 10, dashed dividing line 1000 separates a runtime client 1002 from a runtime with producer graph oriented programming support 1004.

The logical execution flow of the runtime client 1002 includes blocks 1010, 1020, 1025, 1030, 1035, and 1055 and the runtime with producer graph oriented programming support 1004 includes respectively corresponding blocks 1095, 1098, 1040, 1045, and 1070, 1057, 1059, 1061 (*a*), 1061(*b*), and 1063; while a solid arrowed line represents a direct causal relationship from blocks 1020, 1025, 1030, 1035, and 1055 of the logical execution flow of the runtime client 1002, to blocks 1063, 1070, 1059, and 1057, of the runtime with producer graph oriented support 1004, dotted arrowed lines illustrate a causal relationship from blocks 1010, 1020, 1025, and 1030 of the runtime client 1002 to blocks 1095, 1098, 1040, and 1045 of the runtime with producer graph oriented programming support 1004. Depending on the embodiment of the invention, these later causal relationships may be direct or indirect. For example, similar to FIG. 6, an optional indirect causation through the use of a command log (not shown) and/or override log 1047 may be used. Further blocks 1095 and 1098 are dashed because they may optionally be part of a different block depending on the embodiment of the invention (e.g., block 1095 may be part of block 1098; block 1098 may be part of block 1040; blocks 1095 and 1098 may be part of block 1040). Similarly, block 1045 is dashed because it may be optionally part of a different block depending on the embodiment of the invention (e.g., block 1045 may be part of block 1070).

In FIG. 10, the runtime 1002 includes class definitions that include business logic 1010 having data 1012, methods 1014, producer dependency declarations 1016, and optionally class keys 1090. The class definitions 1010 are classes in an object-oriented programming language, and thus include definitions for data 1012 and methods 1014. In addition, these class definitions 1010 include producer dependency declarations 1016 for the method 1014 as previously described. Further, in one embodiment of the invention, each class has a class key 1090 for tracking purposes.

The new class module 1095 of the runtime 1004 loads and introspects the class definitions 1010 (e.g., responsive to new class commands). This loading and introspecting may be done using any number of well known or future developed techniques, including those to selectively load classes for optimization purposes. Further, the new class module 1095 of the runtime 1004 populates entries in the undo, redo, abort execution tracking structure(s) 1067 for the process(es) performed by the new class module 1096, as a result of loading and introspecting class definitions, as a record of each of the operations performed by the new class module 1095, and which may be used by the abort execution module 1059 and/or the undo and redo module 1057. The loading of the classes by the new class module 1095 is illustrated by classes 1054 of the runtime 1004. As part of loading and introspecting the classes 1054, the new class module 1095 also loads and introspects the producer dependency declarations 1016 as illustrated by methods and producer dependency declarations 1056 in the classes 1054. The new class module 1095 also maintains a class tracking structure 1092 that is used for tracking the classes using the class keys. Thus, the class tracking structure 1092 maintains a correspondence between class keys and references into the classes 1054. Further, the new class module 1095 also maintains a method tracking structure 1058 that is used for tracking methods using the method keys. Thus, the method tracking structure 1058 maintains a correspondence between method keys and references to the methods, as well as information regarding the producer dependency declarations.

The runtime client 1002 also includes instance instantiation commands with instance keys 1020. The new instance module 1098 of the runtime 1004 instantiates the instances designated by the instance instantiation commands with instance keys 1020 (e.g., responsive to new instance commands). This instantiating of instances may be done using any number of well known or future developed techniques, including those to selectively instantiate instances for optimization purposes. As part of this instantiating of instances, the new instance module 1098 accesses the class tracking structure 1092 using a class key to access the appropriate class from the classes 1054. The instantiating of instances by the new instance module 1098 is illustrated by instances 1052 of the runtime 1004. The new instance module 1095 also maintains an instance tracking structure 1065 that is used for tracking the instances using the instance keys. Thus, the instance tracking structure 1065 maintains a correspondence between instance keys and references into the instances 1052. As previously indicated, the new class module 1095 may be part of the new instance module 1098 in that the classes 1054 may be instantiated responsive to the instance instantiation commands 1020, as opposed to separate new class commands.

For each instance instantiation command executed by the runtime client 1002, the command is received, for tracking purposes, by the client code tracking module 1063, which in turn records tracking data relevant to the instance instantiation command in the undo, redo, abort execution tracking structure(s) 1067. Consecutive to executing the instance instantiation command, the new instance module 1098 further populates entries in the undo, redo, and abort execution tracking structure(s) 1067, for the process(es) performed by the new instance module 1098.

The runtime client 1002 also includes producer instantiation commands with producer keys 1025. The automated producer graph generation module 1040 of the runtime 1004 instantiates producers designated by the producer instantiation commands with producer keys 1025 (e.g., responsive to new producer commands designating the current set of producers of interest). In addition, the automated producer graph generation module 1040 also discovers, builds, and optionally resolves the producer graph(s) responsive to the current set of producers of interest as previously described. In one embodiment of the invention, a producer key is comprised of a class key, instance key, and method key. As part of this instantiating of producers, the automated producer graph generation module 1040: 1) accesses the class tracking structure 1092 using the class key to access the appropriate class from the classes 1054; 2) accesses the instance tracking structure 1065 using the instance key to access the appropriate instance from the instances 1052; and 3) accesses the method tracking structure using the method key to access the appropriate producer dependency declaration statement. The instantiating of the producers designated by the producer instantiation commands with producer keys 1025 and instantiating of the any discovered producers and building the producer graph is illustrated by producer graph(s) structure 1060 of the runtime 1004. Thus, in one embodiment of the invention, the producer keys identified by the producer instantiation commands with producer keys 1025 and those discovered through producer graph generation are stored in the producer graph(s) structure 1060, along with additional information to represent the current producer graph(s).

For each producer instantiation command executed by the runtime client 1002, the command is received, for tracking purposes, by the client code tracking module 1063, which in turn records tracking data relevant to the producer instantiation command in the undo, redo, and abort execution tracking structure(s) 1067. Consecutive to executing the producer instantiation command, a runtime tracking module 1061(*b*) of the automated producer graph generation module 1040 further populates entries in the undo, redo, and abort execution tracking structure(s) 1067, for the process(es) performed by the automated producer graph generation module 1040.

As previously described, the block 1095 and 1098 may be part of block 1040, and thus, the decision regarding which classes, instances, and producers to load/instantiate is driven by what producers are in the current producer graph(s). In such an embodiment of the invention, the loading/instantiating of class, instances, and producers is optimized and is producer centric.

The runtime client 1002 also includes data preparation commands, including producer output override/unoverride commands 1030. The override/unoverride commands include the producer key of the producer to be overridden/ unoverridden, as well as the override values when being overridden. The override producer output module 1045 of the runtime 1004 causes producers designated by the producer override/unoverride commands to be overridden/unoverridden. This causation may be indirect or direct.

For each data preparation command executed by the runtime client 1002, the command is received, for tracking purposes, by the client code tracking module 1063, which in turn records tracking data relevant to the data preparation command in the undo, redo, and abort execution tracking structure(s) 1067. Consecutive to executing the data preparation command, the a runtime tracking module 1061(*a*) or 1061(*b*) further populates entries in the undo, redo, and abort execution tracking structure(s) 1067, for the process(es) performed by the respective runtime module(s) discussed below, for each case of direct and indirect causation.

In the case of indirect causation, the override producer output module 1045 populates the override log 1047 for consumption by the producer graph execution module 1070. In the case of direct causation, the override producer output module 1045 accesses the producer output caching 1097 of the producer graph(s) structure 1060 and the instances 1052. Specifically, as described with reference to the override producer output module 390, in one embodiment, producers can be classified as property producers or method producers; thus, the override producer output module 1045 may include an override property producer output module (not shown) for overridden property producers and an override method producer output module (not shown) for overridden method producers; the overriding of a property method causes the overridden value to be stored in the producer output caching 1097 of the producer graph(s) structure 1060 and to be stored in the data of the appropriate instance of the instances 1052, whereas the overriding of a method producer causes the overridden value to be stored in the producer output caching 1097.

Furthermore, in one embodiment of the invention, a subset of producers may be classified as clearing producers, that cause the runtime to clear the command stack, audit stack, and modification log of the undo, redo, and abort execution tracking structure(s) of FIG. 10. Specifically, after a clearing producer is executed by the producer graph execution module 1070 of runtime 1004, the runtime clears the noted tracking structures. In one embodiment, each producer may include a data value indicating the type of producer it is (e.g., an annotation, Boolean value, etc. defined/set within a producer method, an enumerated data type, etc.).

A clearing producer is a producer that may be conceptually thought of as a producer that carries out some action(s) beyond the confines of the runtime 1004, and consequently the action(s) are not known to the runtime. Because the producer performs actions beyond the application, the native abilities of the runtime are consequently unable to extend beyond the scope of the runtime to affect a change, such as an undo, redo, or an execution interruption. For example, a producer may cause an email message to be sent. Once the email is sent, however, it cannot be recalled because the email message (i.e., an electronic message forwarded to a mail server for delivery to the addressed recipient) has left the confines of the runtime client 1002 and the runtime 1004, and now exists on an email message server. Consequently, the runtime cannot affect changes on the external message server. As another example, a producer that saves an object, either at the direction of a user or programmatically, writes that object to a disk, media, etc. The runtime, however, cannot cause undo, redo, and abort processes to be performed on the disk, media, etc. because the save operation has already performed a storage/write on the media. However, in system configurations with multiple actors, both internal and external to a particular runtime, undo, redo, and abort execution operations may be communicated to and carried out by those actors that also include the runtime as discussed herein. Furthermore, the examples described above are not exclusive examples of clearing producers, as any number of producers could be classified as a clearing producer.

In one embodiment of the invention producers may not be overridden before a producer graph of which they will be part has been initially executed (thus, the producer will already be instantiated as a result of being designated as a producer of interest or as a result of being discovered by the automated producer graph generation module 1040). However, in the embodiment shown in FIG. 10, producers may be overridden before the initial execution by being instantiated and overridden with a producer override command. Such an overridden producer will typically eventually become part of a producer graph through the discovery process (e.g., when a dynamic dependency is resolved). In some embodiments of the invention, this data preparation may also include other types of set commands. The override producer output module 1045 is shown as a dashed box because it may not be present in alternative embodiments of the invention.

The producer graph(s) structure 1060 also optionally includes incremental execution marking 1080 for some embodiments of the invention that support incremental execution. As previously described with reference to the incremental execution marking 382 of FIG. 3B, the incremental execution markings 1080 is used to assist with incremental execution of the producer graph(s) on execution beyond that of the initial execution. Different embodiments of the invention that use the incremental execution marking 382, use them in different ways. For example, in one such embodiment of the invention that has a command log, the log is used to track which producers have been added and/or modified, and the incremental execution marking 382 are used to mark those producers that are affected (ancestors of the modified or added producers, and thus dependent on them). As another example, in one such embodiment of the invention that does not have a command log, the incremental execution marking 382 are used to mark those producers that are added or modified, as well as those that are ancestors of the modified or added producers (and thus dependent on them). As another example, in one such embodiment of the invention that does not have a command log, modifications and additions of producers are done immediately and the incremental execution marking 382 are used to mark those producers that are ancestors of the modified or added producers (and thus dependent on them). While embodiments of the invention have been described that support incremental execution and use incremental execution marking, other embodiments of the invention support incremental execution that do not use incremental execution marking (e.g., a command log is used to track which producers were added or modified, and a list of execution start producers is maintained in an execution start log; where the producer graph execution module 1070 starts from the execution start producers and works its way up the ancestors of the producer graph(s) to the top; by way of example and not limitation, this embodiment of the invention is described later herein with regard to FIGS. 15-25.

Thus, as noted above, each of the runtime processes performed as a result of output override/unoverride commands 1030, regardless of whether the command directly causes the runtime to perform a process, indirectly causes the runtime to perform a process, is implemented with incremental execution markings, etc., one or runtime tracking modules 1061(*a*) or 1061(*b*) updates the undo, redo, abort execution tracking structure 1067 to reflect each of the process(es) performed by the runtime.

The runtime client 1002 also includes global execution commands 1035. The producer graph execution module 1070 of the runtime 1004 executes the producer graph(s). As such, the producer graph execution module 1070 modifies the producer output caching 1097 (in the case of property producers and method producers), uses the incremental execution marking 1080 (if present), and modifies the data of the instances 1052 (in the case of property methods). Various techniques have been previously discussed for executing the producers of the producer graph and are applicable here. For instance, in embodiments in which a command log is implemented, the command log is consumed and then the producer graph(s) are executed. Further, in embodiments of the invention that support the possibility of unresolved dependencies, producer graph execution module 1070 includes dynamic dependency module 1075, which can invoke the automated producer graph generation module 1040.

For each global execution command executed by the runtime client 1002, the command is received, for tracking purposes, by the client code tracking module 1063, which in turn records tracking data relevant to the global execution command in the undo, redo, abort execution tracking structure(s) 1067. Consecutive to executing the global execution command, a runtime tracking module 1061(*a*) of the producer graph execution module 1070 further populates entries in the undo, redo, and abort execution tracking structure(s) 1067, for all the process(es) performed by the respective runtime module(s) discussed below, for each case of direct and indirect causation. Furthermore, when producer graph execution module 1070 calls the automated producer graph execution module 1040, runtime tracking module 1061(*b*) further populates entries in the undo, redo, and abort execution tracking structure(s) 1067.

In one embodiment of the invention, however, after undo, redo, abort execution tracking structure(s) 1067 is updated to reflect the invocation of a global execution command, runtime tracking structure 1061(*a*) does not track the consequences (i.e., process performed by the runtime in response to the global execution command) of the global execution command. In such an embodiment, the runtime 1004 would require less memory allocated to undo, redo, abort execution tracking structure(s) 1067, as a global execution command may involve thousand upon thousands of processes. For example, overriding a single producer's input may cause the runtime to, in response to a global execution command, recalculate thousands of producers, etc. In one embodiment, the choice as to whether runtime 1004 tracks the consequences of a global execution command may be set programmatically (e.g., by the runtime in response to a computer system's resources), may be selected by an application developer, etc.

The runtime client 1002 also includes undo, redo, and abort execution commands 1055. The undo and redo module 1057 of the runtime 1004 causes operations and runtime elements designated in the undo, redo, abort execution tracking structure(s) 1067, producer graph(s) structure 1060, instance tracking structure 1065, and/or class tracking structure 1092 (and more generally, any runtime tracking structure) to be undone or redone, as will be described in greater detail below, in response to an undo or redo command received from the runtime client 1002.

The abort execution module 1059 of the runtime 1004 causes the interruption of a client application being run by runtime 1004. Because an interruption could occur at any time in an application's execution, modules, such as new class module 1095, new instance module 1063, automated producer graph execution module 1040, producer graph execution module 1070, etc. inform abort execution module 1059 when an execution interruption has occurred. Upon abort execution module 1059 receiving an abort execution command the abort execution module 1059 of the runtime process(es) performed by the runtime during the command, or global execution command, in which the execution interruption command was received. Furthermore, logic of the abort execution module prevents runtime 1004 from further processing any actions until the command, in which the execution interruption was received, terminates. By ceasing the processing of commands received by the runtime client 1002, as well as those runtime 1004 processes performed in response to the runtime client commands, and performing an undo operations, a runtime client 1002 software application terminates its current execution, but returns to a previously stable state known to the runtime.

FIG. 10 also shows an optional producer graph viewer module 1062 that provides a mechanism (e.g., a graphical user interface) by which a programmer/user can view the producer graph(s) and producer outputs of the producer graph(s) structure. Further, FIG. 10 shows an optional configurable interactive producer output layout graphical user interface module 1085 to provide for a graphical user interface (including dynamic invocation of blocks 1030, and 1035) that represents the configurable interactive producer output layout graphical user interface module 840.

In embodiments of the invention that use a command log, different triggers may be use to trigger different actions. For instance, the producer instantiation commands may be logged and batch processed responsive to an explicit command (start logging and end logging), an explicit global execute command (logging starts automatically at startup and after each explicit global execute command, and each log is processed responsive to the following explicit global execute command), an explicit data preparation command, etc. Similarly, the data preparation commands may be logged and batch processed responsive to an explicit global execute command, a first get command, every get command, etc.

Exemplary Tracking Structures

FIGS. 11A-D and FIGS. 12A-C are block diagrams illustrating exemplary content of the data structures of FIG. 10 according to one embodiment of the invention. While FIGS. 11A-D and FIGS. 12A-C illustrate these data structures as tables, it should be understood that any suitable data structure may be used (e.g., a hash map, a set, a list). Furthermore, as will be discussed in greater detail below, each of the data structures, or some combination of the data structures, are utilized by the runtime native undo, redo, and abort execution abilities.

FIG. 11A is a block diagram of an example of the class tracking structure 1092 of FIG. 10 according to one embodiment of the invention. In FIG. 11A, a class key column 110, a class reference column 1115, a log element number column 1117, and a deletion flag column 119 are shown to respectively store the class keys, corresponding references to the loaded classes, a log element number to be utilized in the undo, redo, and abort execution processes, and a deletion indication 1119 (e.g., such as a flag, enumerated data type, Boolean value, etc.) to indicate the class's status as deleted or not deleted.

FIG. 11B is a block diagram of an example of the instance tracking structure 1065 of FIG. 10 according to one embodiment of the invention. In FIG. 11B, an instance key column 1120 and an instance reference column 1125 are shown to respectively store the instance keys and corresponding references to the instances. Further, a log element number column 1127 and a deletion indication 1129 are also respectively shown. In embodiments of the invention in which instance keys need not be unique across all classes, the instance tracking structure also include the class key or reference for the class of the instance.

FIG. 11C is a block diagram of an example of the producer graph(s) structure 1060 of FIG. 10 according to one embodiment of the invention. In FIG. 11C, a class reference column 1135, an instance reference column 1140, and a method reference column 1145 are shown to respectively store references that make up the current producers of the current producer graph(s). These references may take a variety of forms. For example, these columns may respectively store references into the classes 1054 (or alternatively 1092), instances 1052 (or alternatively 1065), and methods 1056 (or alternatively 1058). While in one embodiment of the invention these columns store references, in alternative embodiment of the invention one or more of these columns store keys.

In addition, FIG. 11C includes a parent producer(s) link(s) column 1150 (including for each link a parent producer reference, a dependency determination producer reference, a log element number, and a deletion indication) and a child producer(s) link(s) column 11160 (including for each link, child producer reference(s), a dependency determination producer reference, a link mode, a sticky link indicator, a log element number, and a deletion indication). Each producer may have zero or more child producer links in column 1160. Each child producer link in column 1160 includes: 1) child producer reference(s) which are references to other rows of the producer graph(s) structure to represent a producer dependency according to the producer dependency declaration; 2) a dependency determination producer reference which is a reference to another row of the producer graph(s) structure and represents the dependency determination producer that has created the child link; and 3) a link mode with a producer dependency type that identifies whether the producer dependency is a result of an argument, a field, or a sequencing dependency (see discussion regarding FIGS. 7A-F), and if an argument, the argument ID of the producer dependency; and 4) a sticky indicator to indicate that the link mode is the result of an upwardly declared dependency (in embodiments of the invention that support upwardly declared dependencies) or the result of a sticky subscription (in embodiments of the invention that support sticky subscriptions) and should not be modified through the producer argument dependency declaration of this producer (i.e., the producer stored in the row of the column containing the sticky indicator). Furthermore, each child producer link includes a dependency determination producer reference, a link mode, a sticky indicator, a log element number, and a deletion flag indication that identifies the status of each dependency of column 1160. Each producer may have zero or more parent producer links in column 11150. Each parent producer link in column 1150 includes: 1) a parent producer reference that stores back a reference in accordance with a child producer reference of another producer (i.e., a reference to another row of the producer graph(s) structure to represent a parent producer dependent on this producer), 2) a dependency determination producer reference which is a reference to another row of the producer graph(s) structure and represents the dependency determination producer which has created the parent link. Furthermore, each parent producer link includes a parent producer reference, a dependency determination producer reference, a log element number, and a deletion flag indication that identifies the status of each dependency of column 1150.

Thus, when a link is created, the parent producer link column of the child producer's row and the child producer link column of the parent producer's row are modified to represent the link (and the dependency determination producer reference is the same in both). In one embodiment of the invention, since multiple paths in a producer graph or different producer graphs may include a given producer, there may be multiple parent producer links for a given producer.

Further, FIG. 11C includes a producer output caching and override producer output modification column 1170 to store the current producer outputs, as well as an indication of whether the producer is overridden and the overridden output value. Also, FIG. 11C includes an incremental execution marking column 1180 to store incremental execution markings as previously described. FIG. 11C further illustrates a log element number column 1185 and a deletion indication 1187.

FIG. 11D is a block diagram of an example of the method tracking structure 1058 of FIG. 10 according to one embodiment of the invention. In FIG. 11D, a method key column 1190 and a method reference column 1192 are shown to respectively store the method keys and corresponding references to the methods of the loaded classes. In addition, FIG. 11D also includes an ArgumentDependencies column 1194, a FieldDependencies column 1196, a SequencingDependencies column 1195, an UpwardDependencies column 1193, a WeaklyConstrainedDependencies column 1199, an output class column 1197, and an optional additional annotations column 1198. The ArgumentDependencies column 1194, the SequencingDependencies column 1195, the UpwardDependencies column 1193, the WeaklyConstrainedDependencies column 1199, and the FieldDependencies column 1196 store producer dependency information parsed from the producer dependency declaration statement of the method (e.g., see 705 of FIG. 7A), while the output class column 1197 stores information regarding the output class of the output of the method (determinable by the method's signature—e.g., see 710 of FIG. 7A). Exemplary contents of the ArgumentDependencies column 1194, FieldDependencies column 1196, SequencingDependencies column 1195, UpwardDependency column 1193, and WeaklyConstrainedDependencies column 1199, used in some embodiments of the invention are provided later herein. FIG. 11D further illustrates a log element number column 1188 and a deletion indication 1189.

FIG. 12A is a block diagram of an example of a command stack which is included in the undo, redo, abort execution tracking structure(s) 1067 of FIG. 10 according to one embodiment of the invention. The command stack is utilized by the runtime to track client code command issued by the runtime client 1002. In FIG. 12A, a command ID column 1210 is shown to store an identification number, generated by the runtime, and associated with each command processed by the runtime 1210. Also, FIG. 12A illustrates a run identification number, generated by the runtime for each global execution (run) command. FIG. 12A further illustrates a command nature column 1218 to store data indicative of the command, such as override command, unoverride command, new producer command, remove producer command, delete producer command, run command, etc. Any command that can be issued to runtime 1004 can provide the command nature illustrated in column 1218.

FIG. 12B is a block diagram of an exemplary audit stack which is included in the undo, redo, abort execution tracking structure(s) 1067 of FIG. 10, according to one embodiment of the invention. The audit stack is utilized by the runtime to track runtime processes consecutively to a client code command. In FIG. 12B, the triggering command identification column 1210. FIG. 12B also include an indication as to whether the current entry in the audit stack is for the insertion or removal of an element from a producer graph based application, as indicated in the insertion or removal column 1220 (note that a modification is handled as an insertion of an item in the modification log, as will be discussed below in greater detail). FIG. 12B additionally includes an element nature column 1222 to store data indicating the nature of the inserted or removed element, such as a producer, an instance, a dependency, a subscription, a class, a modification, etc. Column 1222 indicates what has been inserted or removed. Finally, FIG. 12B illustrates a log element number 1224 column.

FIG. 12C is a block diagram of an example of a modification log which is included in the undo, redo, abort execution tracking structure(s) 1067 of FIG. 10, according to one embodiment of the invention. FIG. 12C includes a log element number column 1240 and a corresponding nature of item modified column 1245. In one embodiment, the nature of the item that was modified may be a producer, an instance, a method, a dependency, a subscription, etc. Any item in a PGOP application that can be modified could be represented by the data stored in column 1245. FIG. 12C also includes a modified item key column 1250 to store either a producer key or producer reference, a class key or class reference, or an instance key or an instance reference, etc. Furthermore, the principals for tracking runtime operations discussed herein need not be restricted to the precise elements discussed, as other/future elements that may be developed for the runtime may be tracked, according to the discussion herein. Further, FIG. 12C includes a modified item affected member column 1255 to store data indicating what of the current entry was effected, such as a subscription criteria, a producer output, etc. In addition, FIG. 12C includes a modification or restore column 1260 to store data indicating whether the current entry in the modification log is for an item that has been modified to a new state, or restored back to a previous state. In order to aid in the undo, redo, and abort execution abilities of the runtime 1004, the modification log also includes a previous value column 1265 and a current value column 1270 to store the actual values associated with an entry in the modification log.

Although the data structures illustrated in FIGS. 12A-C are illustrated as separate and distinct data structures, the data structures can be combined into a single data structure of some combination of the data structures of FIGS. 12A-C.

Dynamic Producer Dependencies

As previously described, one embodiment of the invention supports non-dynamic and dynamic producer dependencies. While different embodiments may support different types of dynamic producer dependencies, one embodiment of the invention supports contingent and subscription types of dynamic producer dependencies. Thus, a non-contingent, non-subscription dependency is a non-dynamic (static) dependency.

The following description of contingent and subscription dependencies is done in the context of an embodiment of the invention that uses a class DEP (an abbreviation for dependency), from which an instance is returned by dependency determination producers and is analyzed by the runtime with producer graph oriented programming support. The class DEP includes the following fields: 1) TYPE which can be set to subscription, non-subscription downwardly declared (child producers that are not subscriptions), or non-subscription upwardly declared (parent producers that are not subscriptions); 2) PROD which is used for non-subscription downwardly declared dependencies and is a collection of child producers (as such, it can store zero or more producers); 3) SUB TYPE which is used for subscription dependencies and is set to indicate the type of subscription dependency (used in embodiments of the invention that support multiple types of subscription; while the embodiment of the invention described here supports two types—sticky and absorbing, alternative embodiments may support more, less, and/or different subscription types; 4) SUB CRIT which is used for subscription dependencies and is set to indicate the subscription criteria; 5) PAR LINK MODE which is used for sticky subscription dependencies and non-subscription upwardly declared dependencies and is set to indicate what the link mode of the parent producer should be; 6) PAR CLASS which is used for sticky subscription dependencies and non-subscription upwardly declared dependencies and is set to indicate what the class of the parent producer (e.g., the class key)

should be; 7) PAR METHOD which is used for sticky subscription dependencies and non-subscription upwardly declared dependencies and is set to indicate what the method of the parent producer (e.g., the method key) should be; and 8) PAR INSTANCE which is used for sticky subscription dependencies and non-subscription upwardly declared dependencies and is set to indicate what the instance of the parent producer (e.g., the instance key) should be (If PAR INSTANCE is left blank, the instance key of the child producer is then used for the parent producer). An alternative embodiment could use a collection of parent producers (each item of the collection holding a PAR_CLASS, PAR_INSTANCE, PAR_METHOD, PAR_LINK MODE) in the case of sticky subscription dependencies and/or non-subscription upwardly declared dependencies. Of course, other alternative embodiments of the invention could use a different structure to return dependencies.

Contingent Dependencies

In one embodiment of the invention, both non-contingent and contingent producer dependencies are supported. A non-contingent producer dependency is one that is independent of the output of other producers, while a contingent producer dependency is one that is dependent on the output of other producers. While one embodiment of the invention supports both non-contingent and contingent producer dependencies, alternative embodiments support only non-contingent or contingent (which contingent producer dependencies may be initially driven by default values).

As previously discussed, a producer can be viewed as a set of multiple identifiers, one identifier for each additional level of granularity specified. In one embodiment of the invention, a contingent producer dependency can be contingent in the sense that any one or all of the set of identifiers can be conditionally determined based on current data values. For instance, a first contingent producer dependency may have only the instance identifier be conditionally determined (the class and method identifiers are fixed), while a second contingent producer dependency may have the class, instance, and method identifiers be conditionally determined. While in one embodiment of the invention, all of the plurality of identifiers of a contingent producer dependency may be conditional, alternative embodiments of the invention may be implemented differently (e.g., only allow a subset of the plurality of identifiers to be conditional).

Method Tracking Structure

Referring back to the method tracking structure of FIG. 11D, exemplary contents of the ArgumentDependencies column 1194, FieldDependencies column 1196, SequencingDependencies column 1195, UpwardDependencies column 1193, and WeaklyConstrainedDependencies column 1199 used in some embodiments of the invention will now be described. Specifically, the ArgumentDependencies column 1194 stores a collection of items, one for each ArgumentDependency. In one embodiment of the invention, each item includes the following: 1) the argument ID; 2) a class key nature identifier, being one of explicit class, same class, and contingent class; 3) an explicit class key identifier populated when the class key nature identifier indicates explicit class; 4) contingent class determination method key identifier populated when the class key nature identifier indicates contingent class; 5) an instance key nature identifier, being one of explicit instance, same instance, and contingent instance; 6) an explicit instance key identifier populated when the instance key nature identifier indicates explicit instance; 7) contingent instance determination method key identifier populated when the instance key nature identifier indicates contingent instance; 8) a method key nature identifier, being one of explicit method, same method, and contingent method; 9) an explicit method key identifier populated when the method key nature identifier indicates explicit method; 10) contingent method determination method key identifier populated when the method key nature identifier indicates contingent method; and 11) a shortcut identifier that indicates if the producer dependency declaration for the argument in the producer dependency declaration statement contained an indication of shortcut (i.e., the producer dependency declaration statement directly identifies a standard child producer instead of a dependency determination producer).

The " . . . explicit" indication of the various key nature identifiers is used where the explicit key is provided for the producer dependency in the producer dependency declaration statement. By way of example, the producer dependency "CW::IY::BETA" of a producer dependency declaration statement provides an explicit class, instance, and method key.

In some embodiments of the invention, a shorthand technique is supported for the producer dependency declaration statements such that: 1) if a class is not provided for a given producer dependency, then the same class as the parent producer is used; and 2) if a class and instance are not provided for a given producer dependency, then the same class and instance as the parent producer are used. In other embodiments of the invention, a syntax is used to allow any combination of class, instance, and method, to be the same as the parent (with the exception of all being the same) (e.g., a separator is used to designate each of class, instance, and method, and an absence of such a separator indicates same as parent—by way of specific example, the syntax may be "#C:", "#I:", and "#M:", such that a producer dependency in a producer dependency declaration statement may be #C:"class key"::#I:"instance key"::#M:"method key".) (where quotes indicate a placeholder for a value or variable) The " . . . same" indication of the various key nature identifiers is used where this shorthand technique is used in the producer dependency declaration statement.

As previously indicated, in some embodiments of the invention an indication of a contingent producer dependency is supported through a syntax (e.g., <P>) used in the producer dependency declaration statement itself, and such syntax can be used on one or more of the class, instance, and method of a producer dependency. The " . . . contingent" indication of the various key nature identifiers is used to identify when such a contingent producer dependency occurs, while the "contingent . . . determination method key identifier" indicates the method key of the child producer (the class and the instance are the same as that of the parent producer).

The SequencingDependencies column 1195, the UpwardDependencies column 1193, and the WeaklyConstrainedDependencies column 1195 each store a collection of items, one for each SequencingDependency, UpwardDependency, and WeaklyConstrainedDependency. In one embodiment of the invention, each such item has the same structure as an item of the collection for the ArgumentDependencies, except that it does not include an argument ID. Further, although figures non-subscription downwardly declared dependencies originating from dependency determination producers, it should be understood that in the case of an upwardly declared dependency or weakly constrained dependency the dependency determination producer may return other dependencies.

The FieldDependencies column 1196 stores a collection of items, one for each FieldDependency. While in one embodiment of the invention each item includes the property method key, in alternative embodiments of the invention may have the same structure as an item of the collection from SequencingDependencies.

Subscription Dependencies

In one embodiment of the invention, both non-subscription and subscription producer dependencies are supported. When a subscription producer dependency is declared for a given method and a given producer is instantiated from that given method, the runtime can resolve during run time (based upon the existence of other producers) the set of zero or more producers that meet the criteria of the subscription. While one embodiment of the invention supports both non-subscription and subscription producer dependencies, alternative embodiments support only non-subscription. In addition, while in one embodiment of the invention two types of subscription dependencies are supported (absorbing and sticky), alternative embodiments of the invention support more, less, and/or different types of subscription producer dependencies.

Figures 14B, 14C:
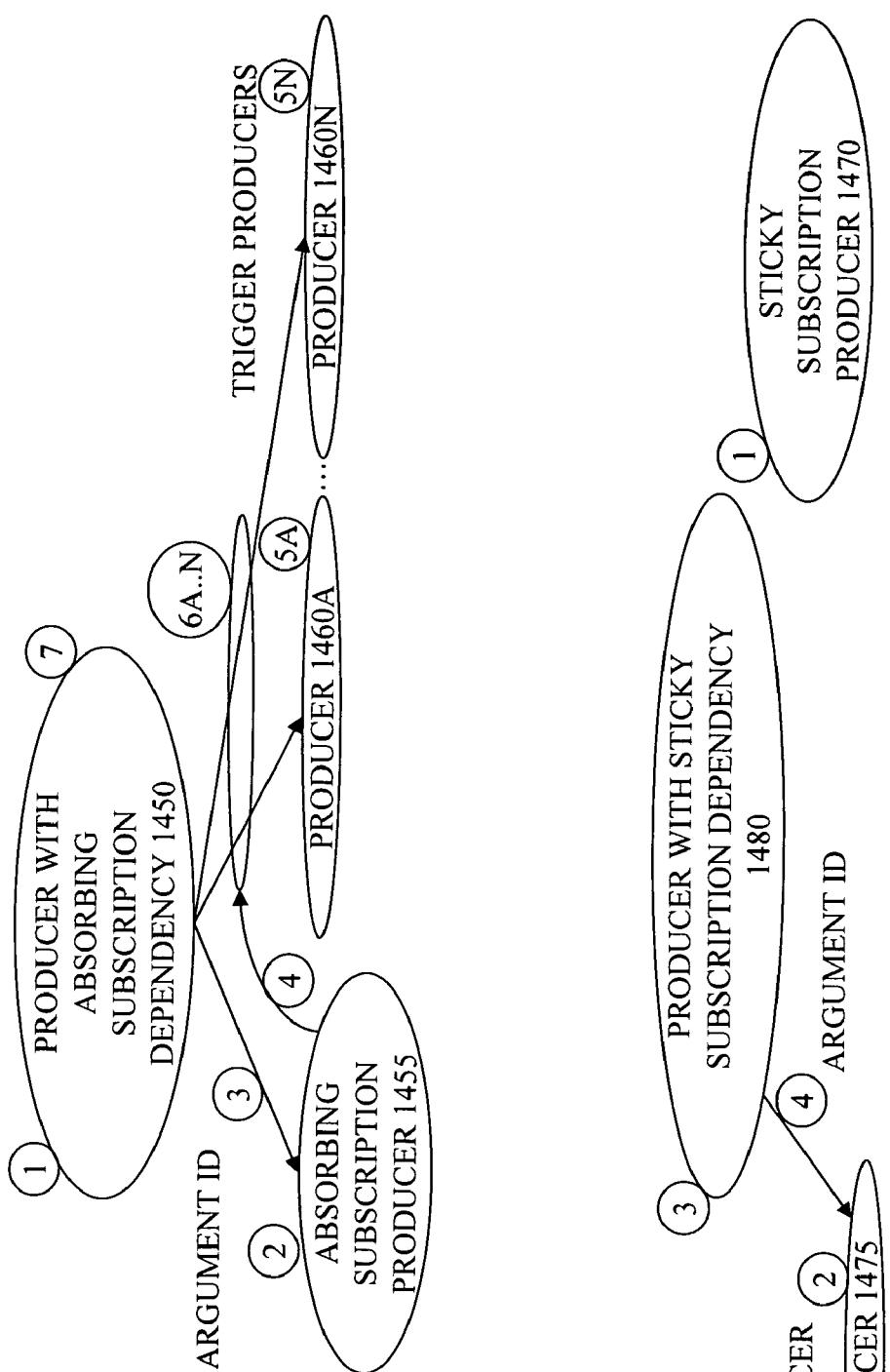
FIG. 14B is a block diagram of exemplary producers illustrating a non-contingent, absorbing subscription producer dependency according to one embodiment of the invention.
FIG. 14C is a block diagram of exemplary producers illustrating a non-contingent, sticky subscription producer dependency according to one embodiment of the invention.

FIGS. 14A-C are block diagrams illustrating absorbing and sticky subscriptions according to one embodiment of the invention. FIG. 14A is a block diagram of an example of the subscription log 1250 of FIG. 12 according to one embodiment of the invention. While FIG. 14A illustrates this log structure as a table, it should be understood that any suitable data structure may be used (e.g., a hash map). FIG. 14B is a block diagram of exemplary producers illustrating a non-contingent, absorbing subscription producer dependency according to one embodiment of the invention. FIG. 14C is a block diagram of exemplary producers illustrating a non-contingent, sticky subscription producer dependency according to one embodiment of the invention. Two rows are shown in the table of FIG. 14A populated with content used in the examples of FIGS. 14B-C. Circled numbers are used in FIGS. 14B-C to illustrate the order in which operations are performed according to one embodiment of the invention.

In FIG. 14A, a subscriber's producer key column 1400, a subscription type column 1405, and a subscription criteria for trigger producers column 1410 are shown to respectively store the content corresponding to the column name. In addition, FIG. 14A shows a parent link mode column 1425 to store the link mode for the parent producer of the subscription dependency; this information will be described in more detail with regard to FIGS. 14B-C.

FIG. 14A also shows a matching producers column 1415 and a completed column 1420 used for absorbing subscriptions. The matching producers column 1415 is used to store the producer keys of the trigger producers that meet the subscription criteria of the absorbing subscription, including the log element number(s) and deletion indication(s) 1492A...N for the trigger producers, while the completed column 1420 is used to track whether the absorbing subscription has been completed during a given execution of the current set of producer graphs. The matching producers column 1415 and the completed column 1420 provide an additional optional optimization that allows for the work of scanning the instantiated producers to be divided between the automated producer graph generation and the producer graph execution as described later herein.

FIG. 14A also shows a parent class column 1430, a parent method column 1435, and a parent instance column 1437 used for sticky subscriptions. The parent class column 1430, the parent method column 1435, and the parent instance column 1437 respectively store the class key, method key, and instance key of the parent producer to be created for the sticky subscription. In addition, FIG. 14A shows a dependency determination producer reference column 1421 store a reference to the dependency determination producer creates the subscription. FIG. 14A also shows a log element number column 1285 and a deletion indication column 1490 for undo, redo, and abort execution operations of the runtime.

Absorbing Subscription

In an absorbing subscription producer dependency, the dependency is to the collection of all producers of the current producer graph(s) structure that meet the absorbing subscription criteria. With reference to FIG. 14B, a circled 1 indicates a producer 1450 is instantiated (e.g., as a result of designation of the producer 1450 as a producer of interest, as a result of automated discovery of the producer 1450 as a progeny of a producer of interest, etc.). The producer 1450 is based on a method for which the producer dependency declaration includes a producer dependency (e.g., with argument ID X). A circled 2 indicates the producer dependency of the producer 1450 is processed to identify a producer 1455.

A circled 3 indicates that the producer 1450 is linked (in the above example, through argument ID X) in the producer graph to producer 1455 as a child producer. A circled 4 indicates execution of the producer 1455. The producer 1455 is a dependency determination producer that includes producer dependency declaration code indicating an absorbing subscription producer dependency and indicating the absorbing subscription criteria. As such, the execution of the producer 1455 results in populating the subscription log. With regard to the example in the first row of FIG. 14A, the subscriber's producer key column 1400, the subscription type column 1405, the subscription criteria for trigger producers column 1410, the parent link mode column 1425, and the dependency determination producer reference column 1421 are respectively populated with the producer key of the producer 1450, an indication that the subscription is of the absorbing type, the absorbing subscription criteria contained within the producer 1455, the link mode of the producer 1450 linked to the producer 1455 (which, in the case of an absorbing subscription will be an argument dependency and include an argument ID, but whose sticky indicator will indicate not sticky—in the above example, argument ID X), and a reference to the producer 1455 (the dependency determination producer that cerates the subscription).

Circled 5A-N indicates the instantiation of producers 1460A-N. In this example, the producers 1460A-N meet the absorbing subscription criteria, and thus are trigger producers. As such, circled 6A-N indicates the linking of the producer 1450 to the producers 1460A-N (in the above example, through argument ID X). A circled 7 indicates that the absorbing subscription dependency is completed for the current execution of the producer graph(s), and the producer 1450 is then executed.

In one embodiment of the invention, the absorbing subscription criteria can be one or more of any of the keys making up a producer key. Thus, in embodiments of the invention where a producer key comprises a class key, instance key, and a method key, the subscription criteria could be one or more such keys. By way of example with reference to FIG. 11C, a scan through the instantiated producers for those that meet the subscription criteria is a scan through one or more of the first three columns of the producer graph(s) structure to determine if the keys of the instantiated producers match the keys of the absorbing subscription criteria. While in one embodiment of the invention the absorbing subscription criteria can be one or more of any of the keys making up a producer key, in alternative embodiments of the invention the absorbing subscription criteria is limited to a subset of the keys making up a producer key.

Sticky Subscription

In a sticky subscription producer dependency, the dependency causes a parent producer to be instantiated for each producer that meets the sticky subscription criteria. With reference to FIG. 14C, a circled 1 indicates a producer 1470 is instantiated (e.g., as a result of designation of the producer 1470 as a producer of interest, as a result of automated discovery of the producer 1470 as a progeny of a producer of interest through a sequencing dependency (e.g., as a result of a SequencingDependency or WeaklyConstrainedDependency, etc.). The producer 1470 is a dependency determination producer that includes producer dependency declaration code indicating a sticky subscription, the sticky subscription criteria for the trigger producers, and the sticky subscription characteristics for the parent producer to be created.

Execution of the producer 1470 results in populating the subscription log. With regard to the example in the second row of FIG. 14A, the subscriber's producer key column 1400, the subscription type column 1405, and the subscription criteria for trigger producers column 1410 are respectively populated with the producer key of the producer 1470, an indication that the subscription is of the sticky type, and the sticky subscription criteria for the trigger producers contained within the producer 1470. In addition, the parent class column 1430, the parent method column 1435, the parent instance column 1437, and the link mode column 1425 of the parent producer to be linked to the trigger producer are populated with the sticky subscription characteristics for the parent producer to be created—in this embodiment of the invention, respectively the class of the parent producer to be instantiated, the method of the parent producer to be instantiated, the instance of the parent producer to be instantiated (if left blank, would be equal to the instance key of the trigger producer), the link mode (which, in the case of sticky subscription, may be: 1) argument, field, or sequencing dependency; 2) argument ID if an argument dependency—the argument ID of the parent producer to be linked to the trigger producer (e.g., argument ID Y). In addition, the dependency determination producer reference column 1421 is populated with a reference to the dependency determination producer that created the subscription (in FIG. 14C, the producer 1470).

With reference to FIG. 14C, a circled 2 indicates a producer 1475 is instantiated (e.g., as a result of designation of the producer 1475 as a producer of interest, as a result of automated discovery of the producer 1475 as a progeny of a producer of interest, etc.). In addition, it is determined if the producer 1475 meets the sticky subscription criteria for a trigger producer. A circled 3 indicates that responsive to the trigger producer 1475, a producer 1480 is instantiated based on the sticky subscription characteristics for the parent producer to be created. With reference to the exemplary second row of FIG. 14C, the class key, method key, instance key, and link mode are accessed from the parent class column 1430, the parent method column 1435, the instance column 1437, and the parent link mode column 1425, respectively. The parent producer has a producer key comprising the accessed class key, the accessed instance key (if left blank, the instance key of the trigger producer (in FIG. 14C, the producer 1475)), and the accessed method key—in the example of FIG. 14C, this is producer 1480. A circled 4 indicates that the instantiated parent producer 1480 is linked in the producer graph to the child trigger producer 1475 through the accessed link mode (in the above example, link mode type=argument dependency; link mode argument ID=Y). Also at circled 4, in the case of an argument dependency, the sticky indicator is set to indicate sticky—that the producer dependency in that position of the producer dependency declaration statement for the method on which the instantiated parent producer 1480 is based should be ignored for the producer 1480—this prevents the link created by the sticky subscription producer dependency from being overwritten by later automated producer graph generation operations.

In one embodiment of the invention, the sticky subscription criteria for trigger producers can be one or more of the keys making up a producer key. Thus, in embodiments where a producer key comprises a class key, instance key, and a method key, the sticky subscription criteria for the trigger could be one or more of the class, instance, and method keys. By way of example with reference to FIG. 11C, a scan through the instantiated producers for those that meet the sticky subscription criteria for trigger producers is a scan through one or more of the first-third columns of the producer graph(s) structure to determine if the keys of the instantiated producers match the keys of the sticky subscription criteria for trigger producers. While in one embodiment of the invention the sticky subscription criteria for trigger producers can be one or more of the keys making up a producer key, in alternative embodiments of the invention the absorbing subscription criteria can be a more limited number of the keys making up a producer key.

Figures 14D, 14E:
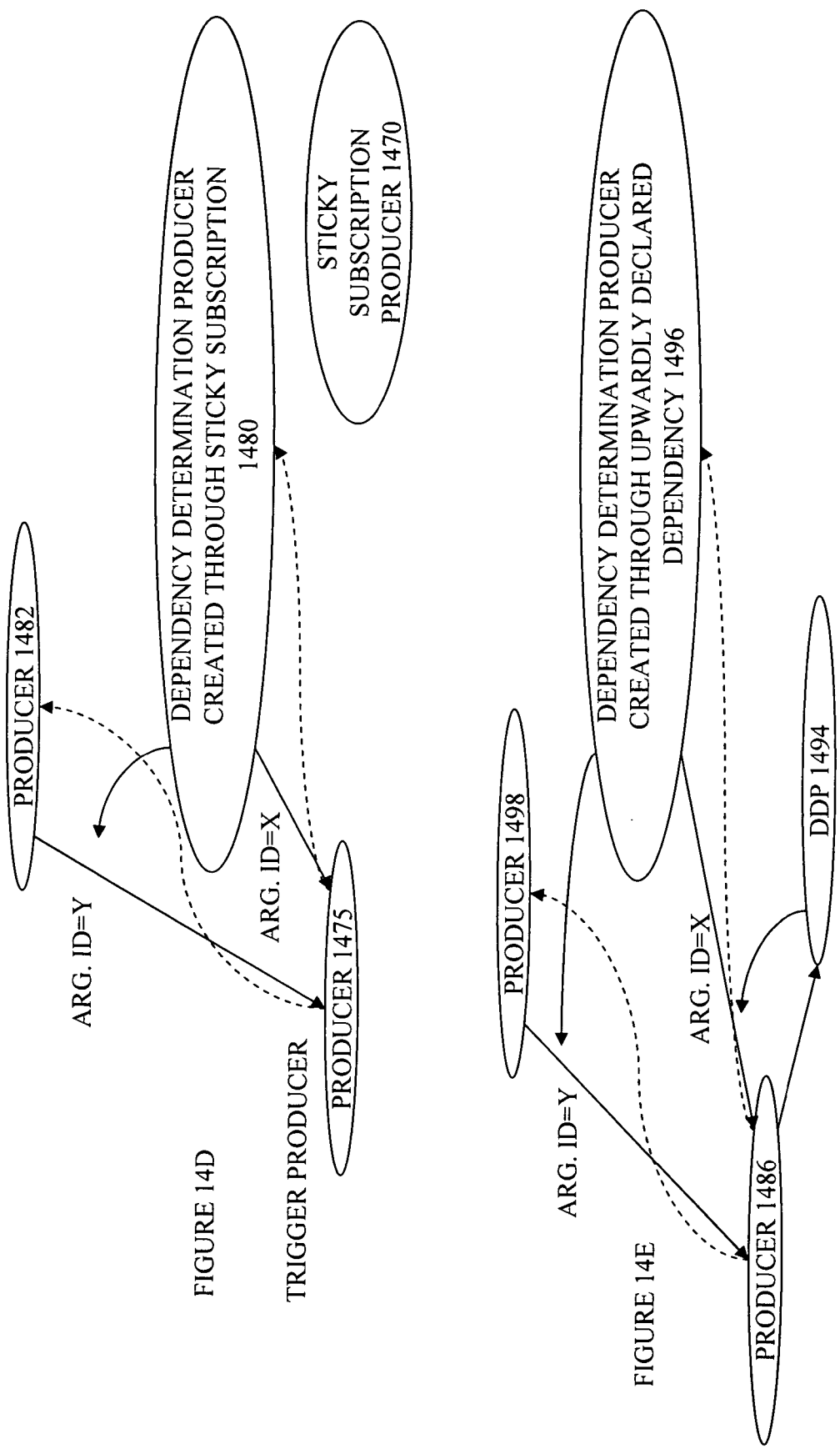
FIG. 14D illustrates the choice of a parent producer based upon a parent dependency determination producer created by a sticky subscription according to one embodiment of the invention.
FIG. 14E illustrates the choice of a parent producer based upon a parent dependency determination producer created by a child dependency determination producer, which child dependency determination producer is linked by a sequencing dependency, according to one embodiment of the invention.

FIGS. 14D-E illustrate the choice of a parent producer based upon a parent dependency determination producer according to one embodiment of the invention. While FIGS. 14D-E are described with reference to argument dependencies, embodiments of the invention may support the use of sequencing and field dependencies.

FIG. 14D illustrates the choice of a parent producer based upon a parent dependency determination producer created by a sticky subscription according to one embodiment of the invention. Like FIG. 14C, FIG. 14D shows the sticky subscription producer 1470 and the trigger producer 1475; however, rather than the producer 1480, FIG. 14D shows a dependency determination producer 1480 created through the sticky subscription of sticky subscription producer 1470. Further, FIG. 14D shows that the link mode of the sticky subscription is argument dependency, argument ID=X, and sticky indicator=sticky. As illustrated by the dashed curved line from the producer 1475 to the dependency determination producer 1480, the DEP returned by the dependency determination producer may be based on the output of the producer 1475 itself (the argument of argument ID=X). In FIG. 14D, the dependency determination producer 1480 returns an non-subscription upwardly declared producer dependency on a producer 1482, with the link mode indicating argument dependency and argument ID=Y. While the argument IDs of X and Y are used in FIG. 14D to show that they may differ, it should be understood that they may be equal.

FIG. 14E illustrates the choice of a parent producer based upon a parent dependency determination producer created by a child dependency determination producer, which child dependency determination producer is linked by a sequencing dependency, according to one embodiment of the invention. FIG. 14E is similar in structure to FIG. 14D; specifically, the producer 1475, 1480, and 1482 are replaced with producers 1486, 1496, and 1498. However, rather than the sticky subscription producer 1470 creating the link between the producers 1480 and 1475, the producer 1486 has a sequencing dependency on a dependency determination producer 1494 (e.g., created through an UpwardDependency or a WeaklyConstrainedDependency), which creates the dependency determination producer 1496 through a non-subscription upwardly declared dependency.

It is worth nothing that sticky subscriptions and non-subscription upwardly declared dependencies (e.g., created through UpwardDependencies and/or WeaklyConstrainedDependencies) cause a bottom up building of a producer graph (as opposed to the top down building described earlier herein). Further, this bottom up building is not limited to the building of a single level, but may be multiple level (e.g., if, due to a sticky subscription or non-subscription upwardly declared dependency, a parent producer is instantiated, that same parent producer may also be a trigger producer for a sticky subscription or may include a non-subscription upwardly declared dependency and cause the instantiation of another parent producer, and so on). In this sense, sticky subscriptions, as well as non-subscription upwardly declared dependencies, reverse producer graph building.

While in some embodiments of the invention the parent producers identified by the sticky subscription characteristics are standard producers (see FIG. 14C), alternative embodiments may be implemented to support the identification of other types of producers. For example, in embodiments of the invention that allow the sticky subscription characteristics to identify a dependency determination producer (see FIG. 14D), such a dependency determination producer may access the output of the trigger producer and may, based on that output, trigger the creation of a particular producer as a parent producer that needs to stick on the child (this parent producer might already exist or not; If it already exists, it is simply linked, and the child producer is added to its argument; If is does not exist yet, it is created). The case where the dependency determination producer returns a constant producer mimics an absorbing subscription. The case where the dependency determination producer returns a producer whose instance key is unique per trigger producer (e.g., returns a producer whose instance key is the producer key of the trigger producer) results in a separate parent producer per child producer and is referred to as a pure sticky subscription. The case where the dependency determination producer returns an instance key which is neither constant nor unique per trigger producer can mix the behaviors of pure sticky subscriptions and absorbing subscriptions and is referred to as a non-pure sticky subscription.

Exemplary Advantages

As previously described, in one embodiment of the invention, producer dependencies are declared for methods as a way to specify method invocation sequencing using the appropriate instances (where the appropriate instances include the instances to use as arguments, the instances to be used by instance methods, and the meta class instances used by class methods) without using manual invocation sequencing code; effectively, the work of generating some or all of manual invocation sequencing code is replaced with: 1) work done by the application programmer to write the producer dependency declarations; and 2) work done by the runtime to discover and build the producer graph(s) and execute the producers of that producer graph(s). Although the effort to write the runtime is relatively great, it needs only be written once in that it can be used to execute any object-oriented applications written for the runtime; in contrast, for a typical application, the effort to write the producer dependency declarations is relatively low in comparison to writing manual invocation sequencing code.

Non-dynamic producer dependencies provide for a way to specify unconditional method invocation sequencing code, and thus avoid the need for writing unconditional manual invocation sequencing code. Contingent producer dependencies provide for a way to specify conditional processing, and thus replace the need for writing conditional manual invocation sequencing code. Supporting producer dependencies that allow for a collection of producers to be returned provides for a way to specify the filling of a collection before it is passed as a parameter, and thus avoid the need for writing multiple calls in manual invocation sequencing code to fill a collection before it is passed as a parameter. Supporting subscriptions provides an environment in which a programmer need not write specific listening code for each type of object to be listened to (e.g., in a producer graph oriented programming spreadsheet, an absorbing subscription may be used to compute an average of a range of cells (each cell being a producer) by having the absorbing subscription criteria identify cells within the range, and re-computing the average every time a new producer is added to the absorbing subscription; in a producer graph oriented programming spreadsheet, a sticky subscription may be used as a currency converter by having the sticky subscription criteria identify cells holding currency content and sticky subscription characteristics of sticky producer(s) to be instantiated that perform currency conversion (the producers (holding the converted amounts) created by the sticky subscriptions would then be available for display in other cells).

Operation

Conceptually, an application consists of client code commands, whether coded into an application or received as input during the execution of an application. As a consequence of these client code commands, the runtime performs specific actions in response to the client code commands, as well as runtime applications that follow as consequences of client code command. Each of these processes, is handled by the runtime in a sequential order, which composes the flow of an application. Therefore, in order to track both client code commands and the runtime processes performed consecutively to the client code commands, certain "bookkeeping" variables are utilized by the tracking logic of the runtime, as discussed below. One skilled in the art will recognize that such variables can exist in numerous formats, names, configurations, etc. Therefore, the names, data types, initialization values, etc. are merely exemplary. Furthermore, the variable values will continually be updated and changed by the runtime, as the runtime is executing an application.

Therefore, for ease of discussion, Current Command ID is a variable that reflects the sequential order to client code commands called by the client code. The runtime, as will be discussed below, increments the Current Command ID for each command. Another exemplary variable is the Cursor Position variable, which points to a Command ID, but serves as a synchronization check between the Current Command ID and the runtimes pointer to the Command Stack of FIG. 12A. For each global method sequencer execution command received by the runtime, a Current Run ID variable is incremented, to indicate the sequence of runs. Finally, global and local Interrupt Execution variables are utilized by the runtime in detecting and processing interrupt execution client code commands. Each of these variables is utilized by the logic below, and discussed in greater detail. The variables may be stored in a memory of the runtime, one or all of the runtime tracking structure(s), etc. and initialized as follows:

```
CURRENT_COMMAND_ID    = 0;
CURRENT_RUN_ID        = 1;
CURSOR_POSITION       = 0;
INTERRUPT_EXECUTION   = NOT_ABORTED;
```

However, as noted above, the values, data types, initialization values, etc. are merely exemplary as there are any number of variables, data structures, etc. that may be utilized by the logic discussed below, to provide native undo, redo, and abort execution abilities to a runtime.

Tracking Client Code Commands

Figure 15C:
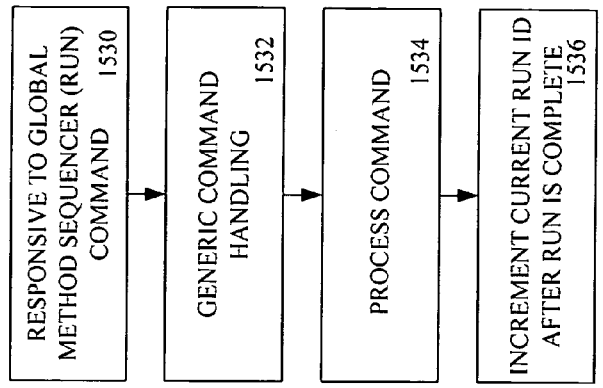
FIG. 15C is a flow diagram for the runtime to receive and perform a global method sequencer (RUN) command according to one embodiment of the invention.
Figure 15B:
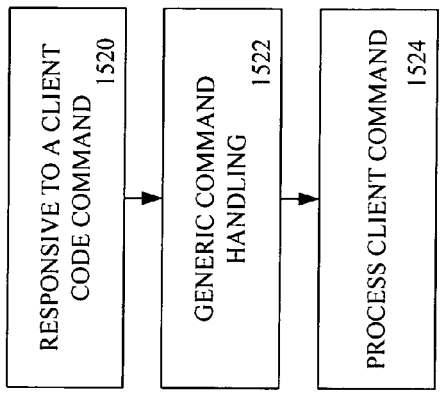
FIG. 15B is a flow diagram for the runtime to receive and execute a client code command according to one embodiment of the invention.
Figure 15A:
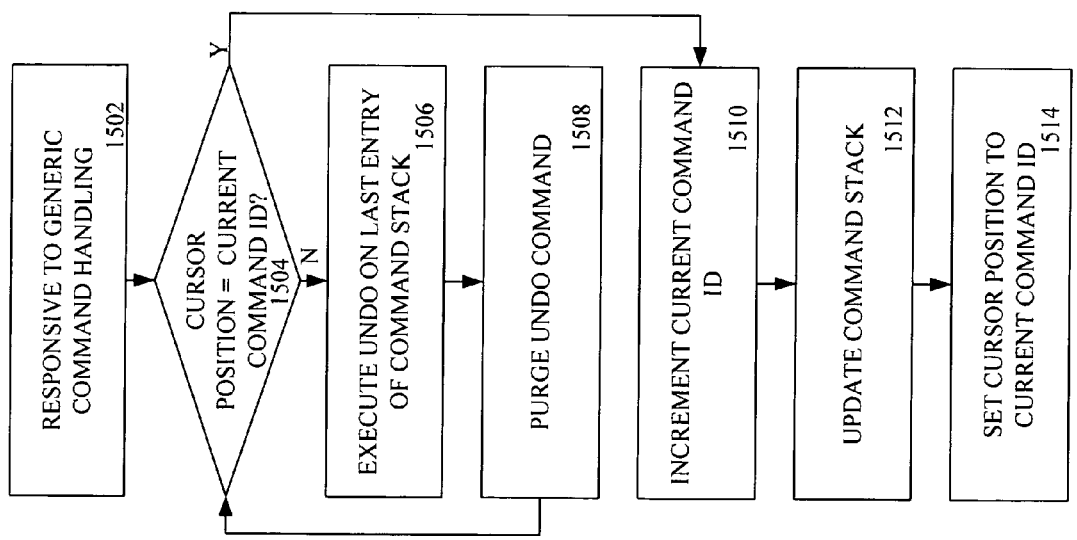
FIG. 15A is a flow diagram for generic client code command handling of block 1522 of FIG. 15B and block 1534 of FIG. 15C according to one embodiment of the invention.

FIGS. 15A-C illustrate exemplary flow diagrams for tracking client code commands of a runtime client, such as the runtime client 1002 of FIG. 10. FIG. 15A illustrates a process for the runtime to handle and track client code commands according to one embodiment of the invention. FIG. 15B illustrates a process for the runtime to receive and execute a client code command. FIG. 15C illustrates a process for the runtime to receive and perform a global method sequencer (RUN) command. The flow diagrams of FIGS. 15A-C are performed by the client code tracking module 1063, as well as the modules discussed above in FIG. 10 with respect to processing client code commands.

With respect to FIG. 15A, responsive to a generic command handling (block 1502), control passes to block 1504. As described herein, generic command handling is a process performed by the runtime in response to client code commands (i.e., FIG. 15B) and in response to global method sequencer (RUN) commands (i.e., FIG. 15C). In block 1504, the Cursor Position variable is compared to the Current Command ID. If the Cursor Position equals the Current command ID, control passes to block 1510. Otherwise, control proceeds to block 1506.

In block 1506, the runtime executes an undo command on the last entry of the Command Stack of FIG. 12A, and then purges the undo command (block 1508); Note that the undo command and the purge operation are discussed below in FIGS. 17 and 19D, respectively. The process of undoing the last entry of the Command Stack (block 1506) and purging the undo command (block 1508) is repeated until the Cursor Position equals the Current Command ID, as determined at block 1504, essentially clearing the command stack of all entries beyond the Cursor Position. The runtime performs the series of undo and purge operations to prevent uncertainty that would result from inserting data into the command stack from an interior location of the stack, that may result if blocks 1510-1514 were executed when Cursor Position does not equal the current command ID. That is, when the Cursor Position fails to point to the Current Command ID, the Cursor Position points to an interior position in the Command Stack (of FIG. 12A). Therefore, when blocks 1510-1514, as will be discussed herein, insert values into the Command Stack, the blocks would not insert values into the end of the command stack.

After it is determined that Cursor Position equals the Current Command ID, the Current Command ID is incremented (block 1510). Control then passes to block 1512 where the runtime updates the Command Stack. In one embodiment, the Command Stack, illustrated in FIG. 12A, is updated by adding an entry in the command stack utilizing the Current Command ID, Current Run ID, and the Command Nature of the command represented by the present entry. Control then passes to block 1515, where the Cursor Position is set to Current Command ID.

In one embodiment, both client code commands and global method sequencer (RUN) commands cause the runtime to update the Command Stack. With respect to FIG. 15B, responsive to a client code command (block 1520), the generic command handling of FIG. 15A is invoked (block 1522). In one embodiment, client code commands include any of a new producer command, a remove producer command, an override command, an unoverride command, etc.

Any client code command may be tracked by the runtime. Subsequent to the generic command handling process (i.e., updating the command stack to reflect the client code command), the runtime processes the client code command (block 1524).

In FIG. 15C, responsive to a global method sequencer (RUN) command (block 1530), the generic command handling of FIG. 15A is invoked (block 1533). Subsequent to the command tracking of FIG. 15A, the RUN command is processed by the runtime (block 1534). As noted above, in one embodiment, the RUN command is logged in the Command Stack, but runtime processes such as insertions, removals, and modifications of elements consecutive to the execution of the run command are not tracked in the audit stack (which will be introduced later). In another embodiment of the invention, each of the runtime processes, such as insertions, removals, and modifications, is audited including those performed by the runtime consecutive to the execution of a run command, In either case, the Current Run ID is then incremented once the current run is complete (block 1536).

As a result of the processes performed by the runtime in FIGS. 15A-C, the runtime tracks any client code command issued by a runtime client, such as runtime client 1002, to a runtime with producer graph oriented programming support, such as runtime 1004.

Tracking Runtime Processes

FIGS. 16A-E illustrate exemplary flow diagrams for tracking runtime processes performed by the runtime in response, and consecutive to, client code commands, such as the runtime 1004 of FIG. 10. The flow diagrams of FIGS. 16A-E are performed by the runtime tracking module 1061(*a*) and 1061(*b*), the tracking performed by each module 1061(*a*) and 1061(*b*) is performed the same.

With respect to FIG. 16A, responsive to any runtime insertion of a new runtime element (block 1602) into a producer based application, control passes to block 1604. The runtime then tracks the insertion by adding an entry in the Audit Stack, of FIG. 12B (block 1604). When the runtime action being tracked is an insertion, the runtime utilizes the Current Command ID to index the entry into the Audit Stack. Furthermore, the entry corresponding to the Current Command ID is populated with the insertion or removal column 1220 set to insertion, element nature set to indicate that a producer, an instance, a dependency, a subscription, a class, a modification, etc. has been inserted into the application by the runtime, and log element number 1224 is populated with the inserted element number.

In FIG. 16B, responsive any runtime modification of an existing element (block 1610), control passes to block 1612. The runtime then tracks the modification by adding an entry in the modification log (block 1612) and then adding an entry in the audit stack (block 1614). When the runtime action being tracked is a modification to an element in a PGOP application, the runtime allocates an entry in the modification log, illustrated in FIG. 12C. Each entry is then populated, by the runtime, with the log element number, nature of the item modified (producer, instance, dependency, subscription, class, etc. . . . ), the modified item's key or reference, the item affected member, the previous value of the modified element, and the newly modified value of the element. In addition to the data used to populate the entry in the modification log, the modification/restore column 1260 is set to indicate the modification log entry is for a modification. The runtime then adds an entry to the audit stack, as discussed in FIG. 16A.

The runtime further tracks the removal of elements from a PGOP application by the runtime, as illustrated by FIG. 16C. Responsive to any runtime removal of an element (block 1620), control passes to block 1622 where the element is marked as deleted. Based on the nature of the element that has been deleted, the deletion is marked in one of the class map column 1119, instance map column 1129, the producer graph column 1187, or any column of a runtime element tracking structure holding a deletion flag. Control then passes to block 1624 where the runtime adds an entry to the audit stack, as discussed in FIG. 16A, except that the insertion/removal column is set to indicate the current entry in the audit stack is for a removal.

In FIG. 16D, responsive to any runtime restoration of an existing element (block 1630), control passes to block 1632. The runtime determines whether a modification exists for the element, which is the subject of the current restore (block 1932). That is, in order for an element to be restored to a previous state, value, condition, etc., the element must have first been modified. Then, after the modification, a restore becomes possible. In order to determine whether a modification exists, the runtime searches for the last modification with the same characteristics (element nature, log element number) in the modification log.

If, at block 1632, the runtime is unable to find a modification, the process terminates at block 1638. However, if a corresponding modification is found, the runtime then tracks the restoration by allocating an entry in the modification log (block 1634) and then adding an entry in the audit stack (block 1636). When the runtime action being tracked is a restoration of an element in a PGOP application, the runtime allocates an entry in the modification log, illustrated in FIG. 12C. Each entry is then populated, by the runtime, with the log element number, nature of the item modified, the modified item's key or reference, the item affected member, the previous value of the restored element set to be equal to the new value of the corresponding modification, and the new value of the restored element set to be equal to the previous value of the corresponding modification. In addition to the data used to populate the entry in the modification log, the modification/restore column 1260 is set to indicate the modification log entry is for the restoration of an element. The runtime then adds an entry to the audit stack, as discussed in FIG. 16A, except that the element nature for the present entry is a modification.

In FIG. 16E, responsive to the runtime scanning the runtime map diagrams, for example in the automated producer graph execution module 1070 or in the automated producer graph generation module 1040, the runtime ignores elements from these map diagrams (such as those of FIG. 11A-11C) that have been marked as deleted.

Thus, the processes performed by the runtime in FIGS. 16A-D track each runtime process(es) performed by the runtime in response to, and consecutive to, client code commands.

Native Undo and Redo Processing

Figure 18B:
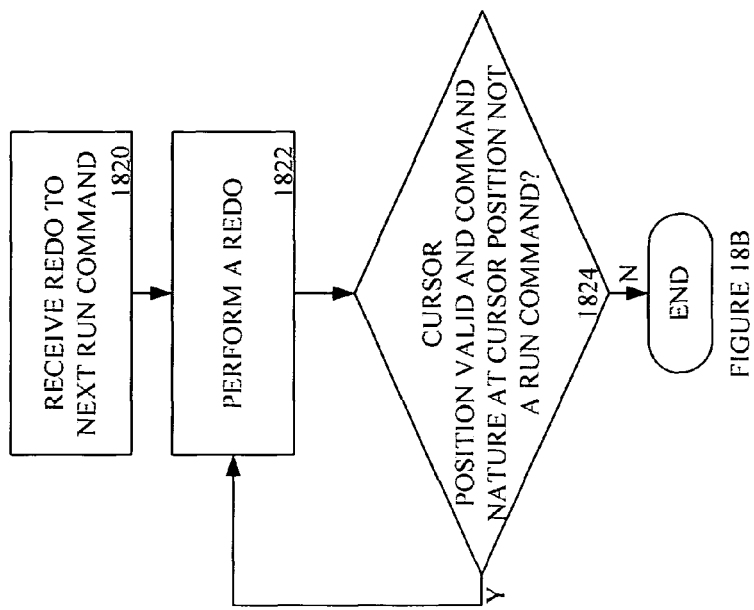
FIG. 18B is a flow diagram for a runtime redo to next run process according to one embodiment of the invention.
Figure 18A:
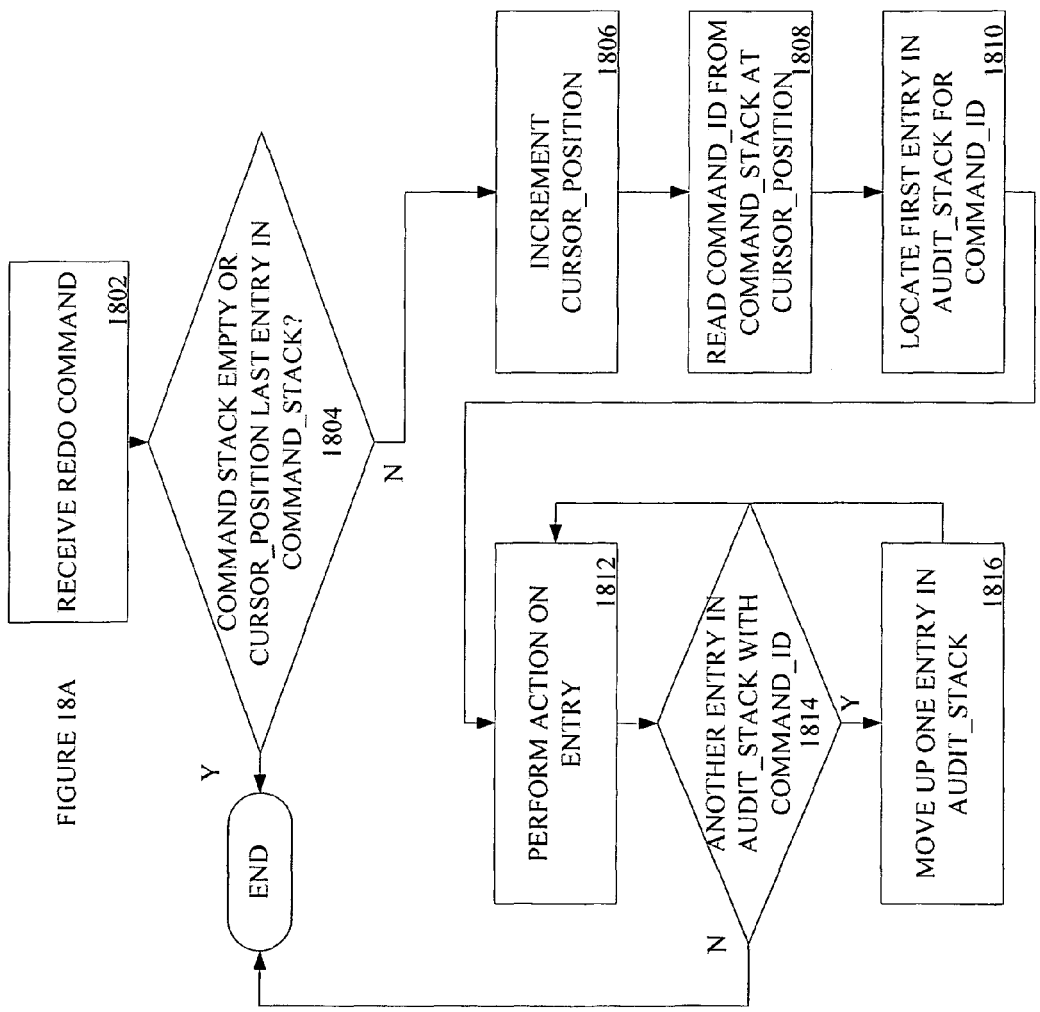
FIG. 18A is a flow diagram for a runtime redo process according to one embodiment of the invention.

FIGS. 17A-B illustrate exemplary flow diagrams for a process by which the runtime, in response to an undo command 1055, can undo any operation. FIG. 18A-B illustrate exemplary flow diagrams for a process by which the runtime, in response to a redo command 1055, can redo any operation. The flow diagrams of FIGS. 17A-B and 18A-B are performed by the undo and redo module 1057 illustrated in FIG. 10. Operations can be undone, on a client code command by client code command basis. However, typical reverting of operations would consist in undoing operations until a previous run command, as illustrated in FIG. 17B (this is equivalent to undoing until the last stable state, which is typically the last run command). Additionally, operations may similarly be redone to the next run command, as illustrated in FIG. 18B.

In FIG. 17A, responsive to the runtime receiving an undo command (block 1702), control passes to block 1704. The runtime then determines whether the command stack is empty (block 1704). If the command stack is empty, the runtime process illustrated in FIG. 17A, the process ends. That is, when the command stack is empty, there are no commands that may be undone by the runtime, so the process simply terminates.

However, if the command stack is not empty, control passes to block 1706, where the runtime reads the command ID from the command stack at the current cursor position (block 1706). The runtime then utilizes the command ID, read at block 1706, to locate the last entry in the audit stack with the current command ID (block 1708). Note that as will be discussed below, the last entry is accessed because the undo process illustrated in FIG. 17A is performed in a reverse chronological order on the Audit Stack.

Control then passes to block 1710 where the runtime performs a reverse action on the entry in the audit stack. There are three types of reverse actions that may be performed by the runtime. If the entry in the Audit Stack is an insertion, the runtime performs the reverse action by setting the deletion flag for the element to deleted in the element's corresponding tracking structure. If the entry in the Audit Stack is a deletion, the runtime performs the reverse action by setting the deletion flag for the element to not deleted in the element's corresponding tracking structure. Furthermore, if the entry in the Audit Stack is an update to an item (i.e., a modification or a restoration), the runtime reads the previous value for the element from the modification log, and sets the old value to the present value for the element.

After the reverse action is performed by the runtime, control passes to block 1712. The runtime determines whether or not there is another entry in the Audit Stack with the same/current Command ID (block 1712). So long as entries remain in the Audit Stack with the Current Command ID, the runtime backs up one entry in the audit stack (block 1714) and performs the reverse action on that entry (block 1710). That is, the runtime performs the reverse action on each command that is identified with the current Command ID.

However, when there are no more entries in the Audit Stack with the same Command ID, the Cursor Position is decremented (block 1716) and the undo process ends.

In FIG. 17B, when the runtime receives an undo to previous run command (block 1720), as opposed to the undo command illustrated in FIG. 17A, control passes to block 1722. The runtime performs an undo, according to the discussion of FIG. 17A (block 1722). After the undo process is completed by the runtime, a determination is made as to whether the cursor position is valid and whether the command nature at the cursor position is a run command (block 1724). Block 1724 determines both whether the cursor position is within the range of the possible command stack values, and whether the current command is a run. So long as neither of these conditions is true, the runtime continues to perform undo operations (blocks 1722-1724). Thus, the decision block 1724 will cause the runtime to undo commands to a previous run, or if no run has occurred, will stop when there is nothing that can be undone. The undo process then ends.

In FIG. 18A, upon receiving a redo command (block 1802), the runtime determines whether the Command Stack is empty or whether the cursor position points to the last entry in the command stack (block 1804). If either condition is true, the process ends. When both conditions are false, however, the runtime is assured that there are commands that may be redone (i.e. commands that have previously been undone) and the cursor position is currently pointing to a valid entry of the command stack, and the control passes to block 1806.

Next, the cursor position is incremented (block 1806) by the runtime and a command ID is then read from the Command Stack at the current cursor position (block 1808). Control then passes to block 1810 where the runtime locates the first entry in the Audit Stack with the command ID read at block 1808 (block 1810). Note that the first entry is located by the runtime so that the redo operation may be processed in a chronological order. The runtime then performs the action on the entry for the redo operation (block 1812). If the entry indicates that an insertion has occurred, the deletion flag is set to not deleted for the element in its corresponding tracking structure(s). If the entry indicates a deletion, the deletion flag is set to deleted in the element's corresponding tracking structure. However, if the entry for the element indicates that the element was updated (i.e., modified or restored), the runtime applies the elements new value, as read from the modification log.

After the action is performed, control passes to block 1814. The runtime determines whether there is another entry in the command stack with the current command ID (block 1814). If no additional entries exist in the Audit Stack with the current command ID, the redo process ends because there are no more elements to redo. However, if another entry does exist in the audit stack, with the current command ID the runtime moves up one entry in the audit stack (block 1816) before again performing the action on the entry (block 1812). The runtime will continue to redo commands so long as entries remain in the Audit Stack with the current command ID.

In FIG. 18B, when the runtime receives a redo to next run command (block 1820), as opposed to the redo command illustrated in FIG. 18A, control passes to block 1822. The runtime performs a redo, according to the discussion of FIG. 18A (block 1822). After the redo process is completed by the runtime, a determination is made as to whether the cursor position is valid and whether the command nature at the cursor position is a run command (block 1824). Block 1824 determines both whether the cursor position is within the range of the possible command stack values, and whether the current command is a run. So long as neither of these conditions is true, the runtime continues to perform redo operations (blocks 1822-1824). The redo process then ends.

Native Abort Execution Processing

Figure 19B:
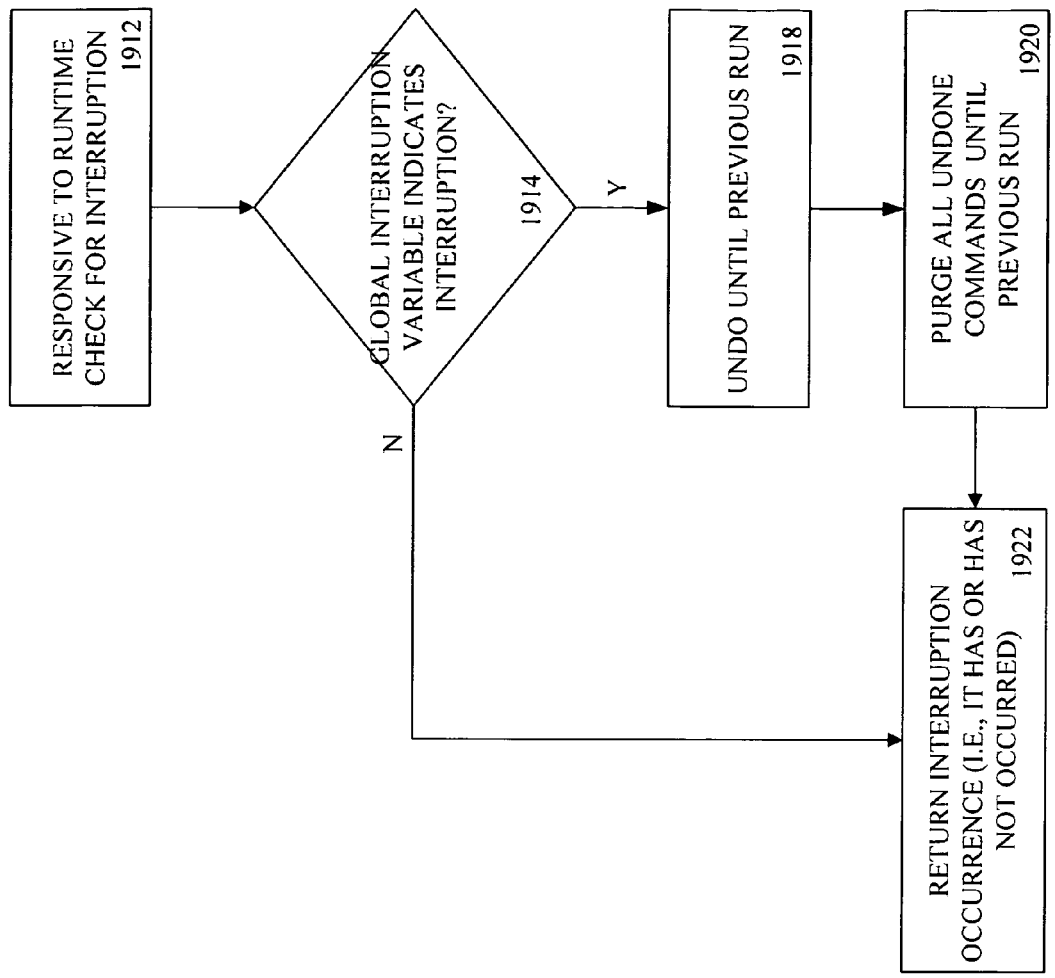
FIG. 19B is a flow diagram for a runtime abort execution process according to one embodiment of the invention.
Figure 19A:
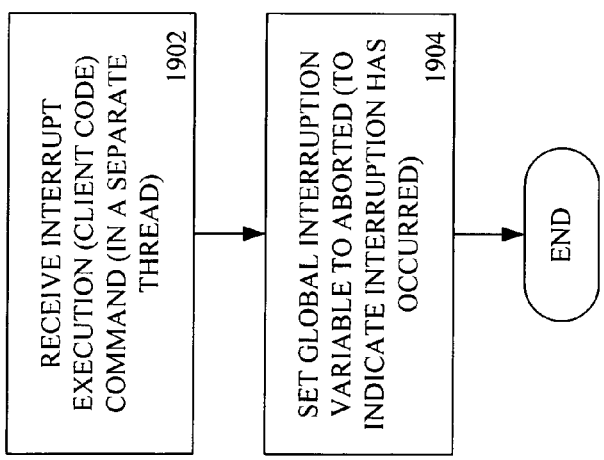
FIG. 19A is a flow diagram for a runtime receipt of an interrupt execution command according to one embodiment of the invention.
Figure 19C:
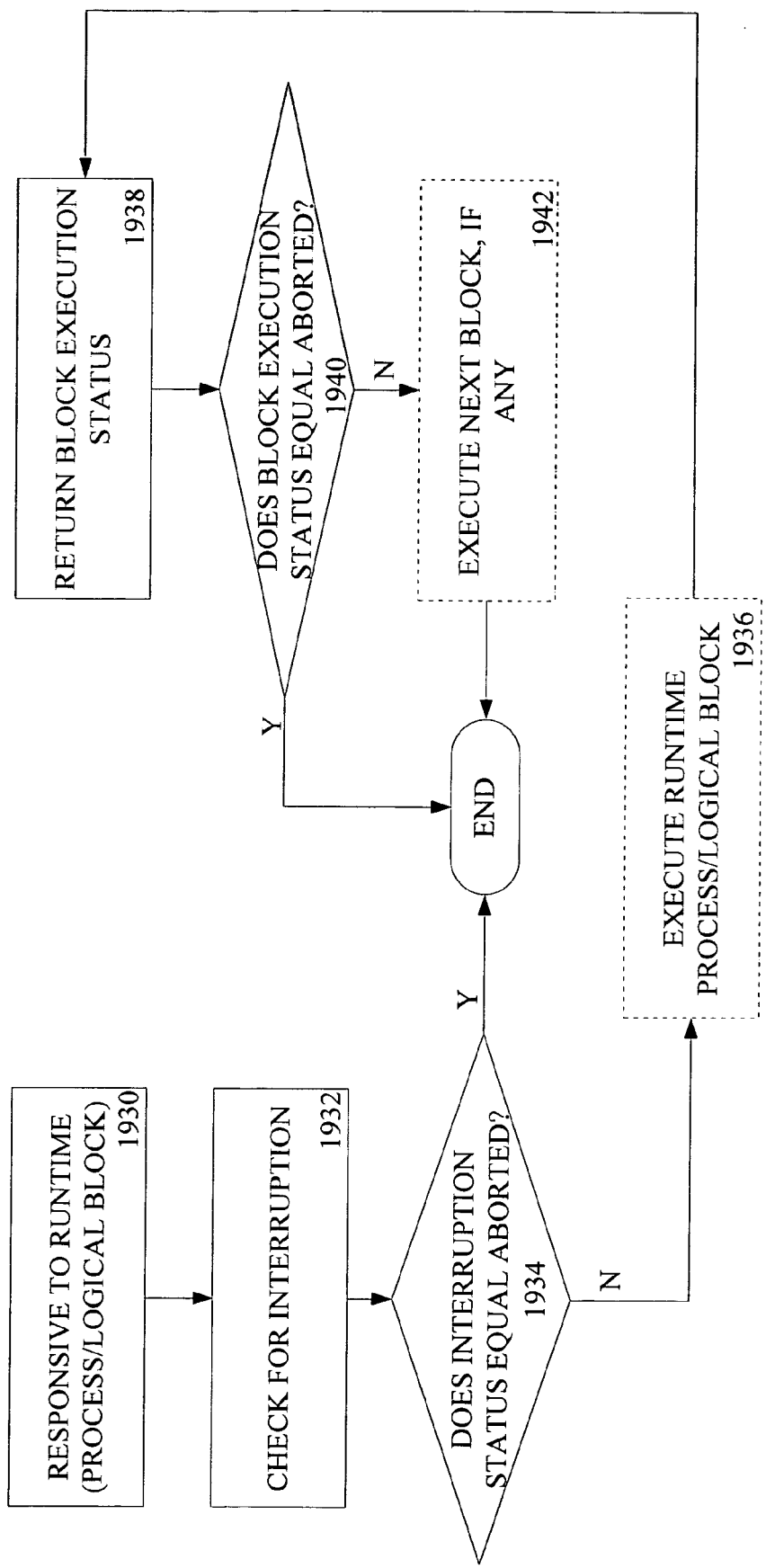
FIG. 19C is a flow diagram for a runtime abort execution process according to one embodiment of the invention.
Figure 19D:
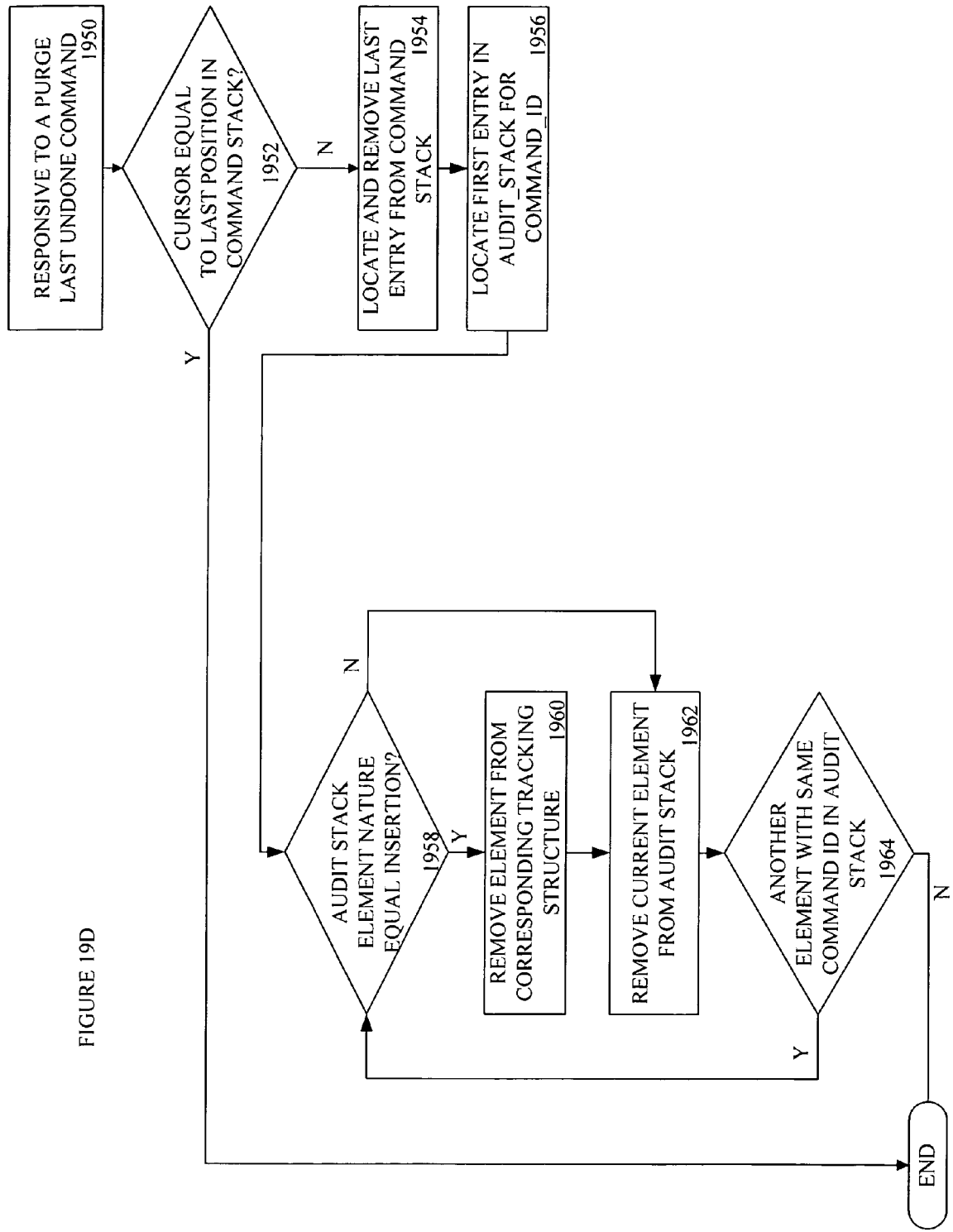
FIG. 19D is a flow diagram for runtime purge last undone command process of block 1508 of FIG. 15A and block 1920 of FIG. 19B according to one embodiment of the invention.

FIGS. 19A-D illustrate exemplary flow diagrams for a process by which the runtime, in response to an interrupt execution command 1055, can abort the execution of any operation without loss of data. FIG. 19A illustrates an exemplary process by which the runtime receives and handles an interrupt execution command. FIGS. 19B and C illustrate exemplary processes by which the runtime carries out an interrupt execution command to abort application execution. FIG. 19D illustrates an exemplary process that the runtime utilizes to clean the runtime tracking structures after aborting application execution. Furthermore, the process of FIG. 19D, as discussed above, is utilized by the generic command handling process of FIG. 15A.

In FIG. 19A, when the runtime receives an interrupt execution client code command (block 1902), control passes to block 1904. The runtime then sets the global interruption variable to aborted to indicate that an interruption has occurred (block 1904). In one embodiment, the interrupt execution command is received by the runtime in a thread while the runtime executes the application in a different thread.

In FIG. 19B, responsive to a runtime check for an interruption (block 1912), the runtime checks whether the global interruption variable indicates interruption (block 1914). Any module within runtime 1004 may be configured to monitor the interruption variable in order to detect when an interruption has occurred. In one embodiment, modules 1095, 1098, 1040, 1070, etc. are configured to check for interruptions prior to performing any operation. Any manner may be used to signal an execution interruption to the runtime, such as a user's selection of an icon on a graphical user interface, pressing a key or combination of keys on a computer keyboard, via a mouse input, programmatic conditions, etc.

If an interruption has not occurred (block 1914), as indicated by the global interruption variable, the interruption status is simply returned (block 1922). However, if an interruption has occurred (block 1914), the runtime performs an undo until previous run (block 1918), as discussed in FIGS. 17A-B. After performing an undo until previous run, control passes to block 1920 where the runtime purges all undone commands until the previous run. Control then passes to block 1922, where the interruption occurrence is then returned (block 1922). In one embodiment, in which computer programming languages that support exception based mechanisms, the interrupt execution variable may be reset after the previous runs and purges are completed (blocks 1918 and 1920). After the exception is "thrown," the exception will be caught by client code that supports such exception based mechanisms. As a result, the mechanisms allow for an immediate interruption after undoing and purging the aborted command consequences, as well as preventing subsequent client code commands from being executed.

With respect to FIG. 19C, responsive to a runtime process (block 1930), runtime logical execution block, line of code, etc. (e.g., interruption may be checked and implemented in a runtime, and thus the processes/logical blocks of the runtime, with as much granularity as desired, by inserting checkpoints at the desired level of granularity), the runtime checks for an interruption (block 1932). In one embodiment, the process of block 1932 calls the logic discussed above in FIG. 19B. Furthermore, as discussed above, FIG. 19B concludes by returning the interruption occurrence status (at block 1922 of FIG. 19B). Control passes, in FIG. 19C, to decision block 1934 whether an abort execution command has occurred (block 1934). If an interruption has occurred, the process terminates.

If an interruption was not detected at block 1934, control passes to block 1936. That is, so long as an interruption has not occurred, the runtime will continue to execute the runtime process, in the runtime's normal fashion. Subsequent to executing the process, the block's execution status is returned (block 1938). Again the runtime determines whether an interruption has occurred. If the bock execution status equals aborted, indicating that an interruption has occurred (1940), the process ends.

However, if there are other blocks to be executed by the runtime, such blocks are executed (block 1942). In FIG. 19C, the style of dashed line indicates that "executing" a runtime process, according to the steps of 1936 and 1942, further includes iterations of the processes illustrated by processing blocks 1930 to 1942. The pseudo code (presented below) illustrates the concept that it is not uncommon for methods to call methods to call methods, etc. The pseudocode is presented as an example of how the logical processing of the runtime's native interrupt execution abilities, illustrated in FIGS. 19B and 19C, could be implemented in software code. However, the exemplary pseudocode presented below does not represent the exclusive means by which native abort execution abilities may be carried out by the runtime.

```
RUNTIME LOGICAL PROCESS BLOCK{
......
LOCAL_VARIABLE_ABORTED = CHECK FOR INTERRUPTION( )
IF(LOCAL_VARIABLE_ABORTED==FALSE)
LOCAL_VARIABLE_ABORTED = BLOCK 1( )
IF(LOCAL_VARIABLE_ABORTED==FALSE)
LOCAL_VARIABLE_ABORTED = CHECK FOR INTERRUPTION( )
IF(LOCAL_VARIABLE_ABORTED==FALSE)
LOCAL_VARIABLE_ABORTED = BLOCK 2( )
IF(LOCAL_VARIABLE_ABORTED==FALSE)
LOCAL_VARIABLE_ABORTED = CHECK FOR INTERRUPTION( )
IF(LOCAL_VARIABLE_ABORTED==FALSE)
LOCAL_VARIABLE_ABORTED = BLOCK 3( )
....
RETURN LOCAL_VARIABLE_ABORTED}
RUNTIME LOGICAL BLOCK 2{
LOCAL_VARIABLE_ABORTED = CHECK FOR INTERRUPTION( )
IF(LOCAL_VARIABLE_ABORTED==FALSE)
LOCAL_VARIABLE_ABORTED = SUB_BLOCK 2.1( )
IF(LOCAL_VARIABLE_ABORTED==FALSE)
LOCAL_VARIABLE_ABORTED = CHECK FOR INTERRUPTION( )
IF(LOCAL_VARIABLE_ABORTED==FALSE)
LOCAL_VARIABLE_ABORTED = SUB_BLOCK 2.2( )
RETURN LOCAL_VARIABLE_ABORTED
}
CHECK FOR INTERRUPTION( ){
INTERRUPTION = CHECK IF INTERRUPTION
IF(INTERRUPTION){
PERFORM AN UNDO UNTIL PREVIOUS RUN
PURGE ALL UNDONE COMMANDS UNTIL PREVIOUS RUN}
IF (INTERRUPTION)
      RETURN TRUE
ELSE
      RETURN FALSE
}
```

When an interruption occurs, regardless of whether the interruption occurs at a Root Process, such as RUNTIME LOGICAL PROCESS BLOCK, or within a function/method called by a root process, such as RUNTIME LOGICAL BLOCK 2, embodiments of the present invention cease processing all commands after the interruption and undo the processes that have occurred as a result of the command being interrupted. In one embodiment, the runtime resets the global interruption variable at the and of each client code command (when directly called by client code, e.g., such as client code that specifies a new producer with producers of interest, override, unoverride, output, etc.), and not when called by the runtime. Furthermore, the runtime ensures that the client code command returns the interruption execution status so that it can be checked by the client code, so that the client code avoids executing subsequent commands that should be aborted.

In view of the pseudocode, embodiments of the invention illustrated in FIGS. 19B and 19C and as discussed herein, the abort execution function will cease processing a current process, and all subsequent processes in order to return to the root command (i.e., that method/function/process that initiated the current process—runtime logical block). The result is that from the point where the interruption is detected by the runtime, either at 1934 or 1940, the runtime will not process any functions, methods, client code commands, etc. until the root command has terminated. Then, when combined with FIG. 19B (which performs an undo and purge until the previous run), the consequences, and processes performed by the runtime up to the execution interruption, of the root command have also been undone. Conceptually, when an abort execution command is received by the runtime, future processing of runtime processes and client code commands is prevented from occurring and the past processing is undone so that a software application and the runtime return to a prior state as if the aborted command had never occurred. Thus, the application continues to be run by the runtime, without a loss of data, in the state the application existed prior to the aborted "root command".

FIG. 19D illustrates the purge last undone command process, which is utilized in the processes of FIG. 15A and FIG. 19B. Conceptually, the purge last undone command process cleans the tracking structures subsequent to an undone command. In particular, the command stack, audit stack, and the undone element's corresponding tracking structure are all updated to reflect the purge of the undone command.

Responsive to a purge last undone command (block 1950), a determination is made as to whether or not the cursor position equals the last position in the command stack (block 1952). The cursor position equaling the last position in the command stack indicates that there have been no undo commands, and the process ends. But when the cursor position does not equal the last position in the command stack, an undo command has occurred, and control is passed to block 1954.

In block 1954, the runtime locates and removes the last entry from the command stack. Based on the command ID from the removed command, the first entry in the audit stack with the command ID is located (block 1956). Furthermore, if the Insertion or Removal column of FIG. 12B of the element removed from the audit stack equals an insertion (block 1958), control passes to block 1960. In block 1960, the element is then removed from its corresponding tracking structure(s). Furthermore, the element has already been marked as deleted in the corresponding tracking structure based on log element number read from the audit stack. The element is then removed from the audit stack (block 1962). As decision block 1958 illustrates, even if the command nature for the element does not equal an insertion, the element is still removed from the audit stack (block 1962).

In either case, control then passes to block 1964, where it is determined whether another element with the same command ID is located in the audit stack (block 1964). If there are no elements remaining in the audit stack with the same command ID, the purge last undone command process ends. However, if there are one or more remaining elements in the audit stack with the same command ID, the process returns control to blocks 1958-1962, until such element no longer exist in the audit stack. As such, FIG. 19D cleans the stacks and tracking structures subsequent to an undo command.

Alternative Embodiments

While the flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. An apparatus for executing an application written in object-oriented code, said apparatus comprising:
    a processor and a storage device including a runtime that interprets producer dependency declarations in the object-oriented code for methods in the object-oriented code, said producer dependency declarations identify at run time a set of zero or more producers, wherein a producer is a runtime instantiatable construct that includes a combination of a single instance of a class and a single method which is of that class, wherein each of said producers includes only one such combination, said runtime includes,
- an automated producer graph generation module to receive a designation of a producer of interest, to add the producer of interest as part of a producer graph, and to automatically generate a remainder of the producer graph through linking, and instantiation as necessary, of other producers based on the producer dependency declarations of the methods of the producers already in the producer graph,
- a producer graph execution module to execute the producers in the producer graph in the order indicated by the producer graph, wherein execution of each producer results in the method of the producer being executed on the instance of the producer,
- a client code tracking module to track client code commands being executed by the runtime,
- a runtime tracking module to track processes performed by the runtime, including processes performed by the automated producer graph generation module and the producer graph execution module, in response to the client code commands being tracked and executed by the runtime, and
- a module, coupled to the client code tracking module and the runtime tracking module, to cause the runtime to reverse client code commands and consequential processes performed by the runtime to return a state of the application to a prior state, wherein the prior state of the application is a state of the application prior to the runtime's execution of one or more client code commands and one or more processes performed by the runtime in response to the one or more client code commands.

2. The apparatus of claim 1, wherein the module is to cause the runtime to reverse client code commands and consequential processes performed by the runtime in response to an undo client code command.

3. The apparatus of claim 1, wherein the prior state is a state resulting from a RUN command.

4. The apparatus of claim 1, further comprising:
the module, of the runtime, to cause the runtime to advance the state of the application, wherein the advanced state of the application is a state of the application prior to the runtime reversal of one or more client code commands and one or more consequential processes performed by the runtime in response to the one or more client code commands.

5. The apparatus of claim 4, wherein the module is to cause the runtime to advance the state of the application in response to a redo client code command.

6. The apparatus of claim 5, wherein the advanced state is a state resulting from a RUN command.

7. The apparatus of claim 1, further comprising:
an abort execution module, of the runtime, to abort the execution of a client code command, and to cause the module to reverse at least one client code command and consequential processes performed by the runtime in response to the at least one client code command, and further to cause the runtime to cease processing any successive client code commands received for execution by the runtime and consequential processes performed by the runtime in response to the successive client code commands, until each successive client code command is aborted.

8. The apparatus of claim 7, wherein the abort execution module is to abort the execution of the at least one client code command in response to an interrupt execution command, wherein said interrupt execution command is to return the application to a state prior to the interrupted at least one client code command while the runtime continues to run said application.

9. The apparatus of claim 1, wherein said client code tracking module and said runtime tracking module track each client code command, including a RUN command, and each process performed by the runtime in response to each client code command except runtime processes performed as a consequence of the RUN command.

10. The apparatus of claim 1, wherein the set of producers that will be identified at run time by at least one of said producer dependency declarations includes at least one producer to be executed before the execution of the producer that includes the method of that producer dependency declaration.

11. The apparatus of claim 1, wherein the producer graph execution module includes:
a dynamic dependencies module to resolve any dynamic producer dependencies, wherein each producer dependency declaration may include a dynamic producer dependency, wherein dynamic producer dependencies cause the runtime to dynamically select the set of zero or more producers the producer dependency declaration identifies during run time, and wherein the dynamic selection can cause the selection of different producers for the set during different executions of the producer graph.

12. The apparatus of claim 11, wherein the dynamic producer dependencies include contingent producer dependencies, wherein contingent producer dependencies are dependencies on dependency determination producers that themselves are dependent on the output or one or more other producers.

13. The apparatus of claim 11, wherein the dynamic producer dependencies includes subscriptions, wherein subscriptions identify criteria by which producers are compared to determine if they are trigger producers, wherein subscriptions identify dependencies on trigger producers.

14. The apparatus of claim 13, wherein some of said subscriptions are absorbing subscriptions, wherein absorbing subscriptions cause the runtime to dynamically include any trigger producers in the set of zero or more producers the producer dependency declaration identifies during run time.

15. The apparatus of claim 13, wherein some of said subscriptions are sticky subscriptions, wherein sticky subscriptions also identify characteristics for parent producers, and wherein sticky subscriptions cause the runtime, for each trigger producer located, to instantiate a parent producer meeting the identified characteristics and include it in the producer graph as having a producer dependency on that trigger producer.

16. The apparatus of claim 1, wherein some of the producers are dependency determination producers whose execution returns identifications of direct input to output dependencies of producers on each other.

17. The apparatus of claim 1, wherein at least some of said producer dependency declarations include upwardly declared dependencies.

18. The apparatus of claim 1, wherein at least some of said producer dependency declarations include downwardly declared dependencies.

19. The apparatus of claim 1, wherein at least some of said producer dependency declarations include both downwardly and upwardly declared dependencies.

20. The apparatus of claim 1, wherein the automated producer graph generation module is also to store the current producer graph in a producer graph structure, and wherein the producer graph execution module caches the current outputs of the producers in the producer graph structure to allow for automated synchronization, wherein automated synchronization is a determination that the appropriate time for the execution of a parent producer is when all of its child producers have been executed and their outputs have been cached.

21. The apparatus of claim 1, wherein, for each of the methods, the producer dependency declaration for that method identifies at run time the set of producers on one end of a set of zero or more links, the other end of all of the links in the set of links being a single different producer whose combination is not identified by this producer dependency declaration, the single different producer's method being that method for which this producer dependency declaration was included, and the single different producer's instance being identified by something other than this producer dependency declaration.

22. The apparatus of claim 1, wherein each of the producer dependency declarations include zero or more producer dependencies, and the producer dependencies identify the set of zero or more producers, and wherein a shorthand technique is supported for the producer dependency declaration statements such that: 1) if a class is not provided for a given producer dependency, then the same class as the parent producer is used; and 2) if a class and instance are not provided for a given producer dependency, then the same class and instance as the parent producer are used.

23. A computer implemented method for executing an application written in object-oriented code, said method comprising:
   executing said object-oriented code in a runtime, wherein the object-oriented code includes methods and producer dependency declarations, wherein the producer dependency declaration for a given method identifies a set of zero or more producers, wherein a producer is a runtime instantiable construct that includes a combination of a single instance of a class and a single method which is of that class, wherein each of said producers includes only one such combination,
   wherein said executing includes,
   tracking client code commands;
   instantiating a producer of interest designated by one of the tracked client code commands; adding the producer of interest as part of a producer graph;
   automatically generating a remainder of the producer graph through linking, and instantiation as necessary, of other producers based on the producer dependency declarations of the methods of the producers already in the producer graph;
   tracking a set of one or more processes performed by the runtime in response to a set of one or more of the client code commands; and
   reversing a most recent set of one or more of the tracked client code commands and consequential ones of the tracked processes to return a state of the application to a prior state, wherein the prior state of the application is a state of the application prior to the runtime's execution of the most recent set of the tracked client code commands and the ones of the tracked processes performed by the runtime in response to the most recent set of the tracked client code commands.

24. The method of claim 23, wherein the reversing is performed by the runtime in response to an undo client code command.

25. The method of claim 23, wherein the prior state is a state resulting from a RUN command.

26. The method of claim 23, further comprising:
   advancing the state of the application, wherein the advanced state of the application is a state of the application prior to the runtime's reversal of the one or more reversed client code commands and the consequential ones of the tracked processes.

27. The method of claim 26, wherein the advancing is performed by the runtime in response to a redo command.

28. The method of claim 26, wherein the advanced state is a state resulted from a RUN command.

29. The method of claim 23, further comprising:
   aborting the execution of a client code command, wherein the aborting includes,
      reversing the tracked processes performed by the runtime as a consequence of the aborted client code command,
      bypassing any remaining processes to be performed by the runtime as a consequence of the aborted client code command and any remaining client code commands, until there are no remaining client code commands to be processed by the runtime, and
      continuing to run said application.

30. The method of claim 29, wherein aborting the execution of a client code command is performed in response to an interrupt execution command.

31. The method of claim 23, wherein the tracking includes tracking a client code RUN command without tracking the processes performed by the runtime as a consequence of the RUN command.

32. The method of claim 23, further comprising:
   storing the current producer graph in a producer graph structure;
   caching the current outputs of the producers in the producer graph structure; and
   automating synchronization through determination that the appropriate time for execution of each parent producer is when all of its child producers have been executed and their outputs have been cached.

33. The method of claim 23, wherein, for each of the methods, the producer dependency declaration for that method identifies at run time the set of producers on one end of a set of zero or more links, the other end of all of the links in the set of links being a single different producer whose combination is not identified by this producer dependency declaration, the single different producer's method being that method for which this producer dependency declaration was included, and the single different producer's instance being identified by something other than this producer dependency declaration.

34. The method of claim 23, wherein each of the producer dependency declarations include zero or more producer dependencies, and the producer dependencies identify the set of zero or more producers, and wherein a shorthand technique is supported for the producer dependency declaration statements such that: 1) if a class is not provided for a given producer dependency, then the same class as the parent producer is used; and 2) if a class and instance are not provided for a given producer dependency, then the same class and instance as the parent producer are used.

35. The method of claim 23, wherein the set of processes includes all processes performed by the runtime in response to the set of the tracked client code commands.

36. A non-transitory tangible machine-storage medium that provides:
   a runtime to execute object-oriented code including a plurality of class definitions, each of the plurality of class definitions including, a set of one or more fields, a set of one or more methods, a producer dependency declaration for each method of said set of methods, wherein the producer dependency declaration for a given one of said methods is used at run time to identify a set of zero or more producers with outputs that are an input to the given method, wherein a producer is a runtime instantiatable construct that includes a combination of a single instance of one of the plurality of classes at runtime and a single method which is of that class, wherein each of said producers includes only one such combination; and the runtime including an automated producer graph generation module to receive a designation of a producer of interest, to add the producer of interest as part of a producer graph, and to automatically generate a remainder of the producer graph through linking, and instantiation as necessary, of other producers based on the producer dependency declaration of the methods of the producers already in the producer graph;

the runtime including a producer graph execution module to execute the producers in the producer graph in the order indicated by the producer graph, wherein execution of each producer results in the method of the producer being executed on the instance of the producer;

the runtime including a client code tracking module and a runtime tracking module to track one or more client code commands executed by the runtime, and to track processes performed by the runtime in response to the client code commands being tracked and executed by the runtime; and the runtime including a module to reverse client code commands and consequential ones of the tracked processes to return a state of an application to a prior state, wherein the application is the execution of the object-oriented code by the runtime and the prior state of the application is a state of the application prior to the runtime's execution of one or more client code commands and the ones of the tracked processes performed by the runtime in response to the one or more client code commands.

37. The machine-storage medium of claim 36, wherein the client code tracking module is operable to automatically store tracking data indicative of each client code command, including a RUN command, and the runtime tracking module is operable to track processes performed by the runtime in response to the client code commands but not processes performed by the runtime as a consequence of the RUN command.

38. The machine-storage medium of claim 36, wherein the module is responsive to an undo command.

39. The machine-storage medium of claim 38, wherein the prior state is a state resulting from a RUN command.

40. The machine-storage medium of claim 36, wherein the module is also, responsive to a redo command to cause the runtime, to advance the state of the application, wherein the advanced state of the application is a state of the application prior to the runtime's reversal of one or more client code commands and one or more consequential ones of the tracked processes performed by the runtime.

41. The machine-storage medium of claim 40, wherein the advanced state is a state resulting from a RUN command.

42. The machine-storage medium of claim 36, wherein the runtime further includes:

an abort execution module, responsive to an interrupt execution command, to cause the runtime to abort the execution of a client code command, and to cause the runtime to reverse at least one client code command and consequential processes performed by the runtime in response to the at least one client code command, and further to cause the runtime to cease processing any successive client code commands received for execution by the runtime, and consequential processes performed by the runtime in response to the successive client code commands, until each successive client code command is aborted and the runtime can resume execution of the application.

43. The machine-storage medium of claim 36, wherein, for each of the methods, the producer dependency declaration for that method identifies at run time the set of producers on one end of a set of zero or more links, the other end of all of the links in the set of links being a single different producer whose combination is not identified by this producer dependency declaration, the single different producer's method being that method for which this producer dependency declaration was included, and the single different producer's instance being identified by something other than this producer dependency declaration.

44. The machine-storage medium of claim 36, wherein each of the producer dependency declarations include zero or more producer dependencies, and the producer dependencies identify the set of zero or more producers, and wherein a shorthand technique is supported for the producer dependency declaration statements such that: 1) if a class is not provided for a given producer dependency, then the same class as the parent producer is used; and 2) if a class and instance are not provided for a given producer dependency, then the same class and instance as the parent producer are used.

* * * * *